US012659363B2

(12) United States Patent
Kammachi Sreedhar et al.

(10) Patent No.: US 12,659,363 B2
(45) Date of Patent: Jun. 16, 2026

(54) METHOD, AN APPARATUS, A COMPUTER PROGRAM PRODUCT FOR PDUS AND PDU SET HANDLING

(71) Applicant: Nokia Technologies Oy, Espoo (FI)

(72) Inventors: Kashyap Kammachi Sreedhar, Tampere (FI); Sujeet Shyamsundar Mate, Tampere (FI); Saba Ahsan, Espoo (FI); Miska Matias Hannuksela, Tampere (FI); Igor Danilo Diego Curcio, Tampere (FI); Lauri Aleksi Ilola, Tampere (FI); Serhan Gül, Berlin (DE)

(73) Assignee: Nokia Technologies Oy, Espoo (FI)

( * ) Notice: Subject to any disclaimer, the term of this patent is extended or adjusted under 35 U.S.C. 154(b) by 9 days.

(21) Appl. No.: 18/420,994

(22) Filed: Jan. 24, 2024

(65) Prior Publication Data

US 2024/0259454 A1     Aug. 1, 2024

Related U.S. Application Data

(60) Provisional application No. 63/441,279, filed on Jan. 26, 2023.

(51) Int. Cl.
*H04L 65/70*          (2022.01)
*H04L 65/65*          (2022.01)

(52) U.S. Cl.
CPC .............. *H04L 65/70* (2022.05); *H04L 65/65* (2022.05)

(58) Field of Classification Search
CPC ............. H04W 28/0268; H04W 28/06; H04W 28/0278; H04L 47/32; H04L 47/28
See application file for complete search history.

(56) References Cited

U.S. PATENT DOCUMENTS

| | | | | |
|---|---|---|---|---|
| 2022/0279621 A1* | 9/2022 | Sillanpaa | ................ | H04W 4/90 |
| 2022/0393806 A1* | 12/2022 | Zhang | .................... | H04L 1/1887 |
| 2024/0022941 A1* | 1/2024 | Jeong | .................... | H04W 24/10 |
| 2024/0064190 A1* | 2/2024 | Yang | ................... | H04L 65/1069 |
| 2024/0121663 A1* | 4/2024 | Malik | ..................... | H04L 47/32 |
| 2024/0147477 A1* | 5/2024 | Rao | ........................ | H04W 72/20 |
| 2024/0163711 A1* | 5/2024 | Mondet | ............. | H04W 28/0268 |
| 2024/0196265 A1* | 6/2024 | Starsinic | ........... | H04W 28/0289 |
| 2024/0406956 A1* | 12/2024 | Tsai | ..................... | H04L 1/1812 |

OTHER PUBLICATIONS

3GPP TSG-SA2 Meeting #154-AH-e, S2-2300xxx, Electronic Meeting, Jan. 16-20, 2023 (revision of C3-22xxxx), Change Request 23.501, CR xxxx rev—Current version: 18.0.0 (Year: 2023).*

(Continued)

*Primary Examiner* — Chirag R Patel

(74) *Attorney, Agent, or Firm* — McCarter & English, LLP; Joseph C. Drish

(57) ABSTRACT

An apparatus includes at least one processor; and at least one non-transitory memory storing instructions that, when executed by the at least one processor, cause the apparatus at least to: encode a protocol data unit set into or along a stream, wherein the protocol data unit set contains at least one protocol data unit; and encode an importance field within a header extension; wherein the importance field indicates whether there is at least one dependency between the protocol data unit set and at least one other protocol data unit set.

31 Claims, 25 Drawing Sheets

(56)             References Cited

OTHER PUBLICATIONS

3GPP tR 23.700-60 V2.0.0 (Nov. 2022) "3rd Generation Partnership Project, Technical Specification Group Services and System Aspects; Study on XR (Extended Reality) and media services (Release 18)", Nov. 2022, 266 pages.

"LS on N6 PDU Set identification", 3GPP TSG SA WG-4 Meeting #121, S4-221244, Nov. 2022, 2 pages.

"Discussion on the usage of RTP/SRTP header and header extension for PDU set/frame identification", Intel, 3GPP TSG-SA4 Meeting #121, S4-221253, Nov. 2022, 5 pages.

"Low Latency, Low Loss, and Scalable Throughput (L4S) Internet Service: Architecture RFC 9330", https://datatracker.ietf.org/doc/draft-ietf-tsvwg-l4s-arch/, Dec. 2023, 28 pages.

"Discussion on cross layer optimization for immersive real-time communication", Qualcomm Inc., TSG S4 Meeting #118-e, S4-220477, Apr. 2022, 3 pages.

"Real-time Transport Control Protocol (RTCP)—Based Feeback (RTP/AVPF)", RFC 4585 Network Working Group, J. Ott et al., Jul. 2006, 51 pages.

"A Transport Protocol for Real-Time Applications", RFC 3550 Network Working Group, H. Schulzrinne et al., Jul. 2003, 104 pages.

"[5G_RTP] RTP Header Extension for PDU Set Marking", Qualcomm Inc., TSG SA4 RTC SWG Post #121 Ad-hoc Call, S4aR230009, Dec. 2022, 3 pages.

Mate, Sujeet Shyamsundar, et al., "Priority Application And Network Bits for PDU Handling", U.S. Appl. No. 63/441,222, filed Jan. 26, 2023, 138 pages.

* cited by examiner

600

700

Figures 16A, 16B:
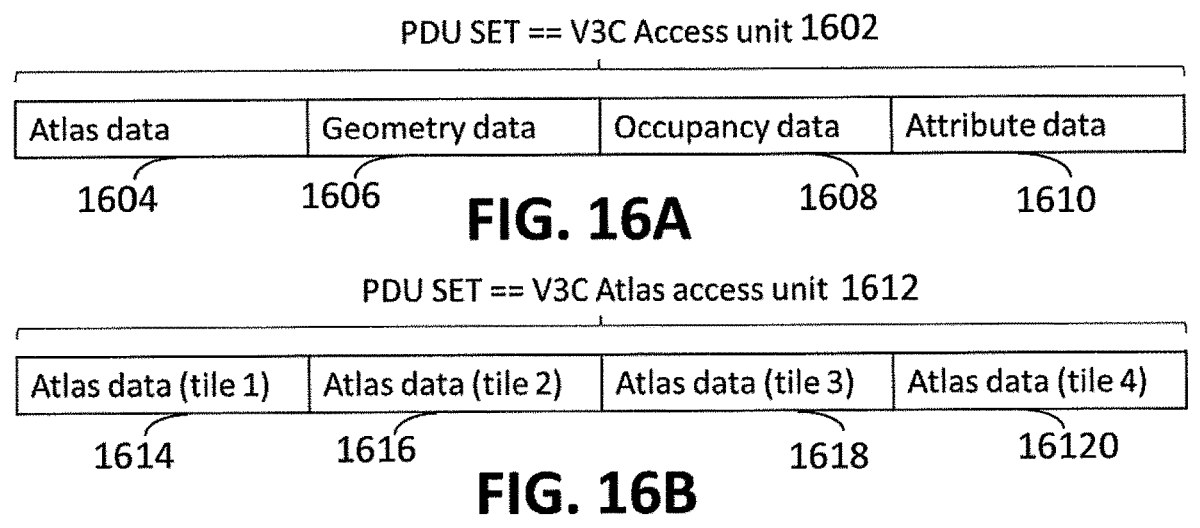

PDU SET == V3C Access unit 1602

| Atlas data | Geometry data | Occupancy data | Attribute data |
|---|---|---|---|

PDU SET == V3C Atlas access unit 1612

| Atlas data (tile 1) | Atlas data (tile 2) | Atlas data (tile 3) | Atlas data (tile 4) |
|---|---|---|---|

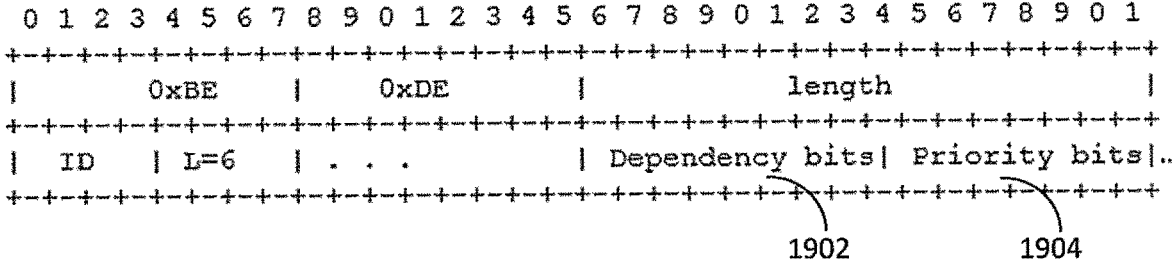
```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      OxBE     |     OxDE     |              length              |
+-+-+-+-+-+-+-+-+-+-+-+-+-+-+-+-+-+-+-+-+-+-+-+-+-+-+-+-+-+-+-+-+
|  ID  |  L=6  |  . . .       | Dependency bits| Priority bits|...
+-+-+-+-+-+-+-+-+-+-+-+-+-+-+-+-+-+-+-+-+-+-+-+-+-+-+-+-+-+-+-+-+
                                       1902          1904
```
FIG. 19A
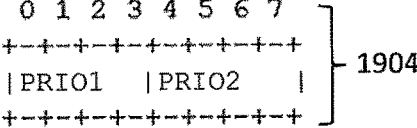
```
 0 1 2 3 4 5 6 7
+-+-+-+-+-+-+-+-+
|0 0 0 0 0|I|F|A|     1902
+-+-+-+-+-+-+-+-+
```
FIG. 19B
```
 0 1 2 3 4 5 6 7
+-+-+-+-+-+-+-+-+
|PRIO1   |PRIO2  |     1904
+-+-+-+-+-+-+-+-+
```
FIG. 19C

2300

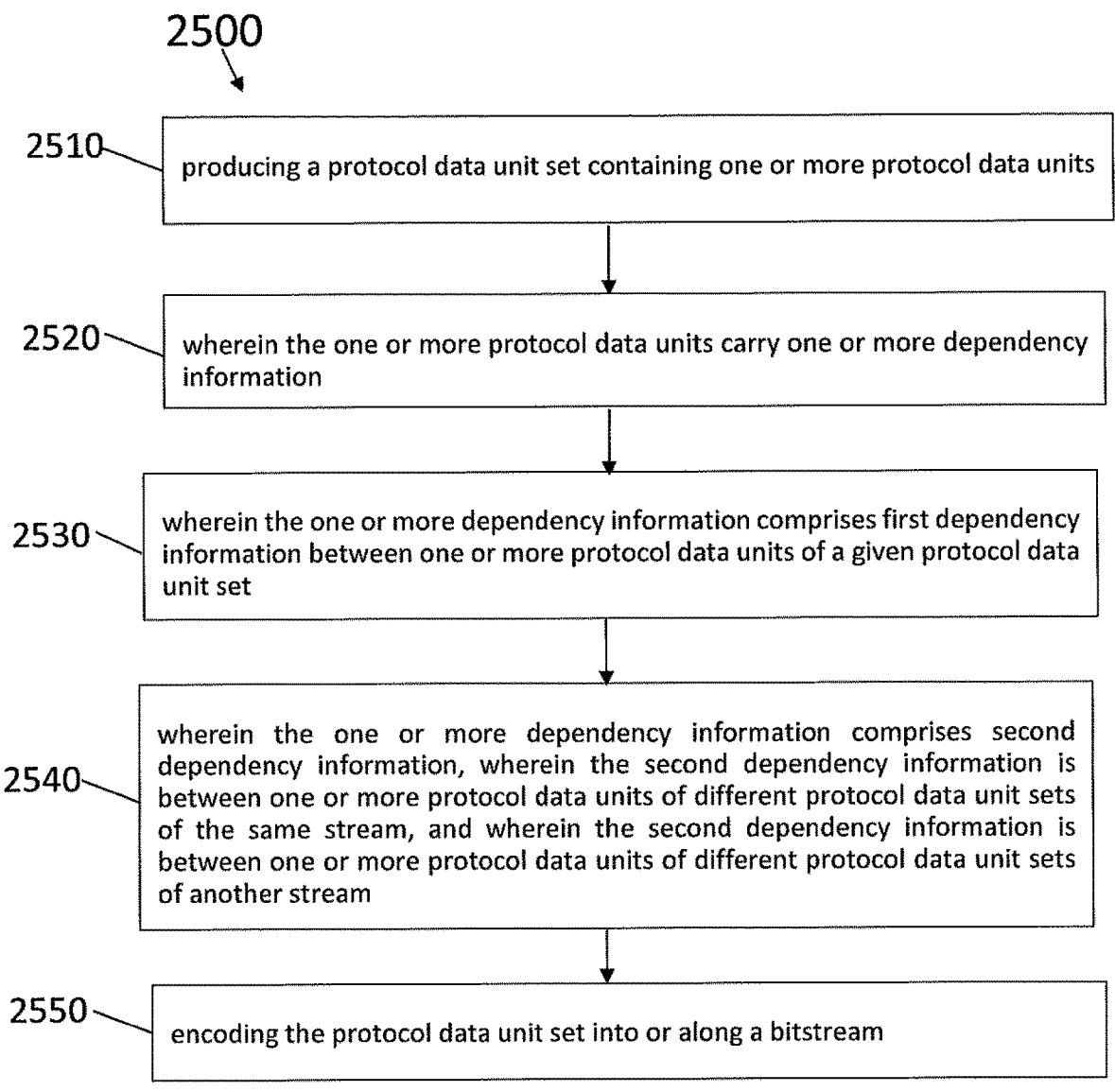

2500

2510 — producing a protocol data unit set containing one or more protocol data units 2520 — wherein the one or more protocol data units carry one or more dependency information 2530 — wherein the one or more dependency information comprises first dependency information between one or more protocol data units of a given protocol data unit set 2540 — wherein the one or more dependency information comprises second dependency information, wherein the second dependency information is between one or more protocol data units of different protocol data unit sets of the same stream, and wherein the second dependency information is between one or more protocol data units of different protocol data unit sets of another stream 2550 — encoding the protocol data unit set into or along a bitstream

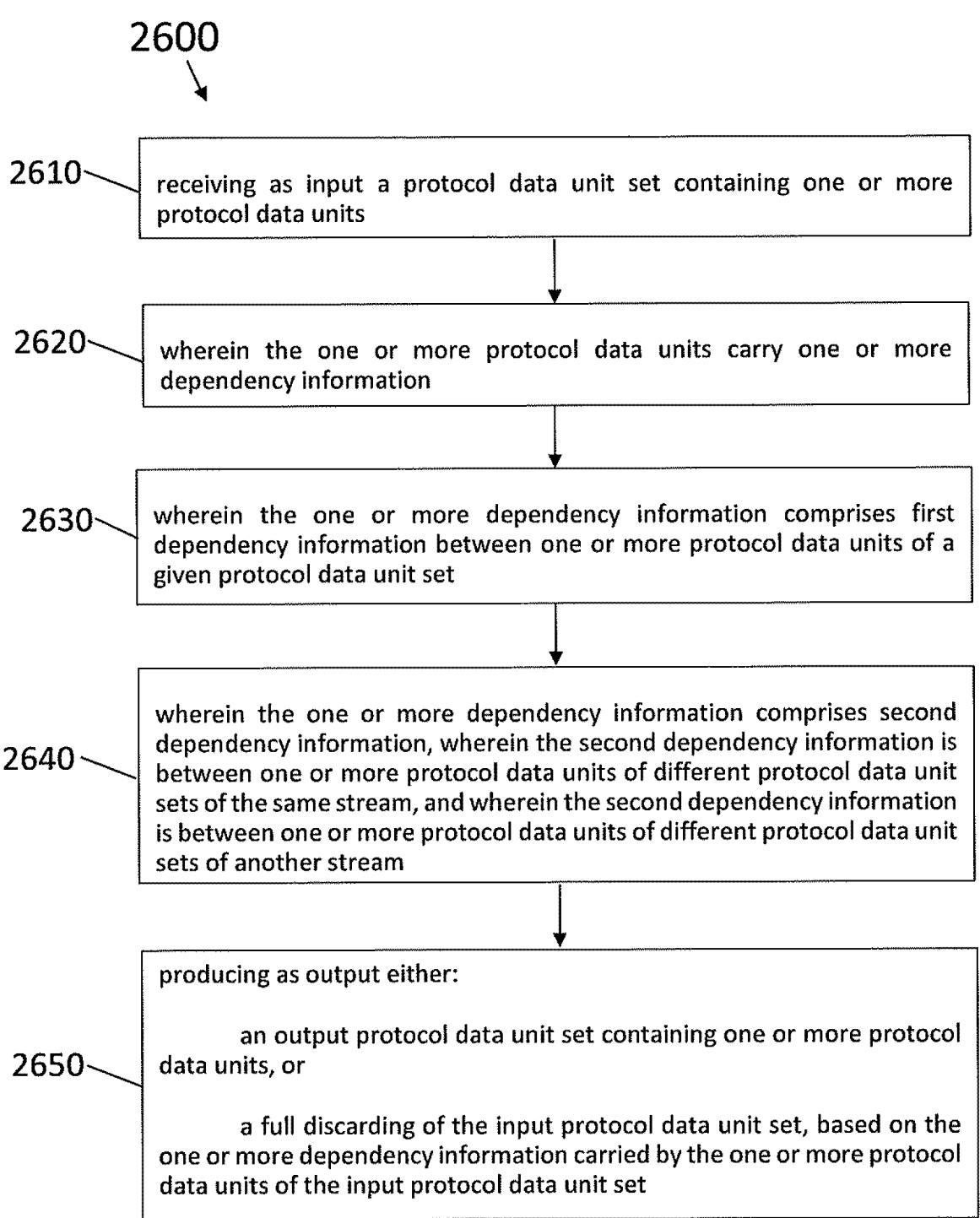

2610 — receiving as input a protocol data unit set containing one or more protocol data units 2620 — wherein the one or more protocol data units carry one or more dependency information 2630 — wherein the one or more dependency information comprises first dependency information between one or more protocol data units of a given protocol data unit set 2640 — wherein the one or more dependency information comprises second dependency information, wherein the second dependency information is between one or more protocol data units of different protocol data unit sets of the same stream, and wherein the second dependency information is between one or more protocol data units of different protocol data unit sets of another stream 2650 — producing as output either:

an output protocol data unit set containing one or more protocol data units, or a full discarding of the input protocol data unit set, based on the one or more dependency information carried by the one or more protocol data units of the input protocol data unit set

FIG. 26

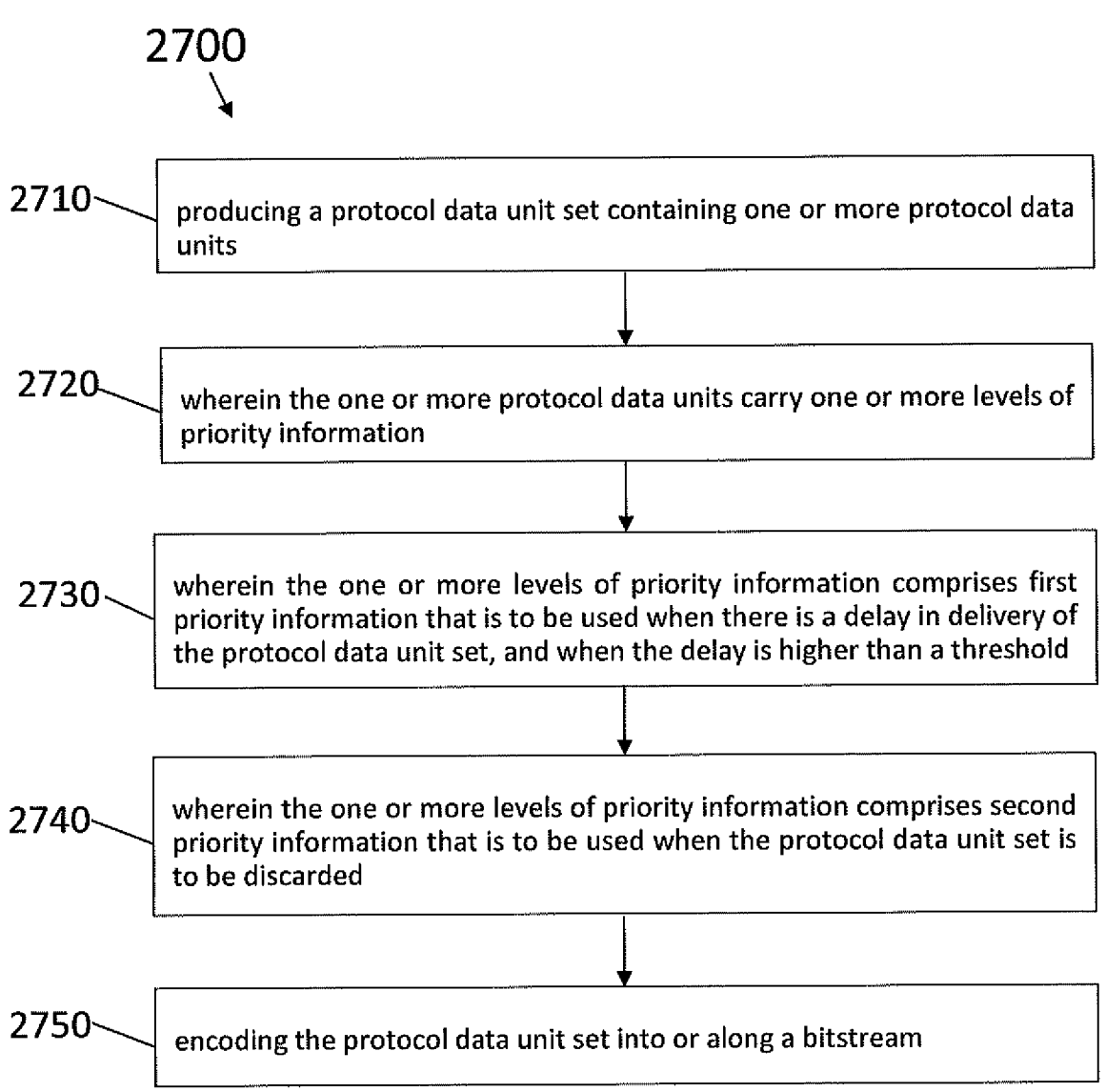

2700

2710 — producing a protocol data unit set containing one or more protocol data units 2720 — wherein the one or more protocol data units carry one or more levels of priority information 2730 — wherein the one or more levels of priority information comprises first priority information that is to be used when there is a delay in delivery of the protocol data unit set, and when the delay is higher than a threshold 2740 — wherein the one or more levels of priority information comprises second priority information that is to be used when the protocol data unit set is to be discarded 2750 — encoding the protocol data unit set into or along a bitstream

FIG. 27

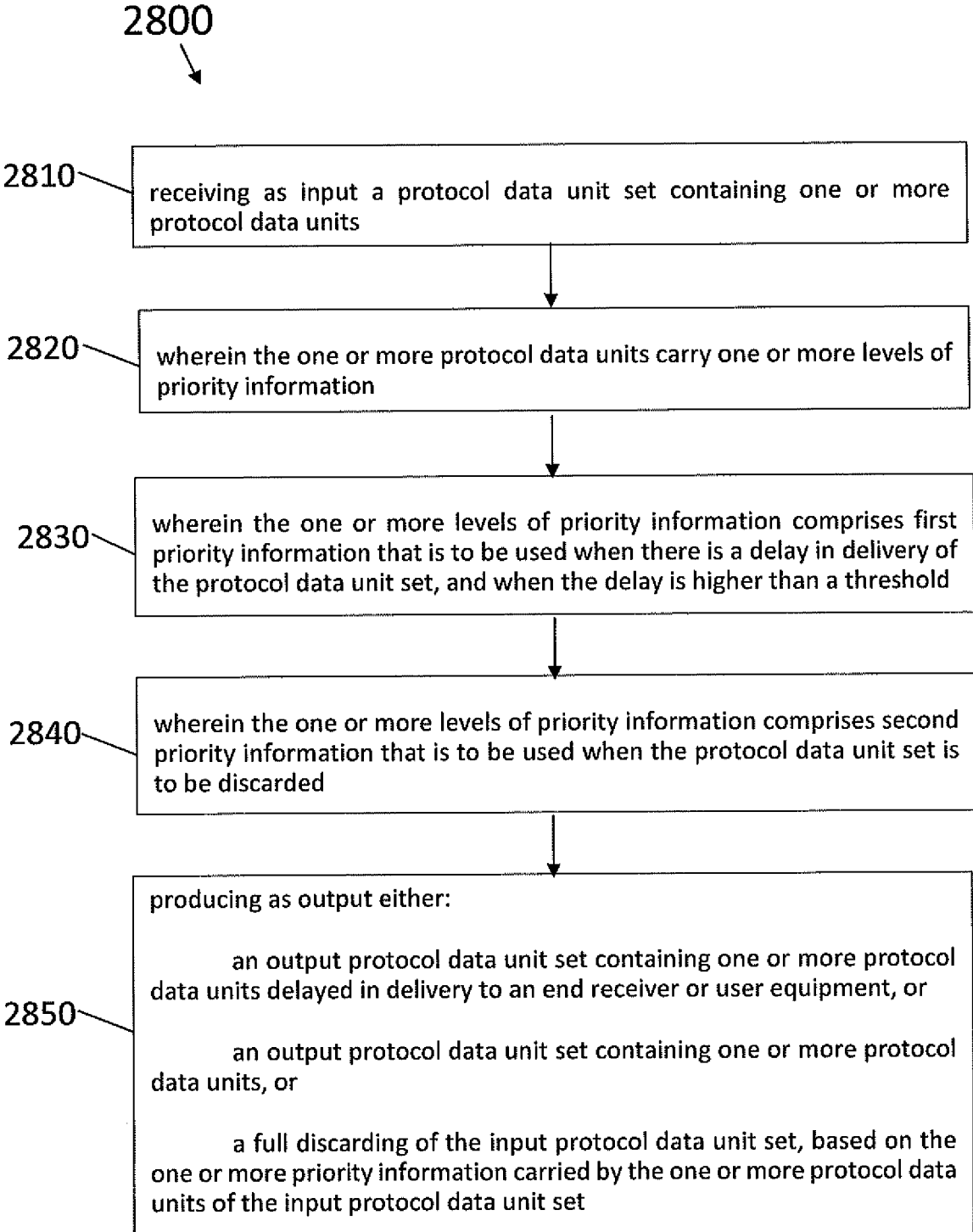

2800

2810 — receiving as input a protocol data unit set containing one or more protocol data units 2820 — wherein the one or more protocol data units carry one or more levels of priority information 2830 — wherein the one or more levels of priority information comprises first priority information that is to be used when there is a delay in delivery of the protocol data unit set, and when the delay is higher than a threshold 2840 — wherein the one or more levels of priority information comprises second priority information that is to be used when the protocol data unit set is to be discarded 2850 — producing as output either:

an output protocol data unit set containing one or more protocol data units delayed in delivery to an end receiver or user equipment, or an output protocol data unit set containing one or more protocol data units, or a full discarding of the input protocol data unit set, based on the one or more priority information carried by the one or more protocol data units of the input protocol data unit set

3010　encoding a protocol data unit set into or along a stream, wherein the protocol data unit set contains at least one protocol data unit 3020　encoding an importance field within a header extension 3030　wherein the importance field indicates whether there is at least one dependency between the protocol data unit set and at least one other protocol data unit set

3100

3110 — decoding a protocol data unit set from or along a stream, wherein the protocol data unit set contains at least one protocol data unit 3120 — decoding an importance field from a header extension 3130 — wherein the importance field indicates whether there is at least one dependency between the protocol data unit set and at least one other protocol data unit set

METHOD, AN APPARATUS, A COMPUTER PROGRAM PRODUCT FOR PDUS AND PDU SET HANDLING

RELATED APPLICATION

This application claims priority to U.S. Provisional Application No. 63/441,279, filed Jan. 26, 2023, which is hereby incorporated by reference in its entirety.

TECHNICAL FIELD

The examples and non-limiting example embodiments relate generally to video coding and, more particularly, to a method, an apparatus, and a computer program product for PDUs and PDU set handling.

BACKGROUND

It is known to encode and decode video in a communication network.

SUMMARY

In accordance with an aspect, an apparatus includes at least one processor; and at least one non-transitory memory storing instructions that, when executed by the at least one processor, cause the apparatus at least to: encode a protocol data unit set into or along a stream, wherein the protocol data unit set contains at least one protocol data unit; and encode an importance field within a header extension; wherein the importance field indicates whether there is at least one dependency between the protocol data unit set and at least one other protocol data unit set.

In accordance with an aspect, an apparatus includes at least one processor; and at least one non-transitory memory storing instructions that, when executed by the at least one processor, cause the apparatus at least to: decode a protocol data unit set from or along a stream, wherein the protocol data unit set contains at least one protocol data unit; and decode an importance field from a header extension; wherein the importance field indicates whether there is at least one dependency between the protocol data unit set and at least one other protocol data unit set.

In accordance with an aspect, a method includes encoding a protocol data unit set into or along a stream, wherein the protocol data unit set contains at least one protocol data unit; and encoding an importance field within a header extension; wherein the importance field indicates whether there is at least one dependency between the protocol data unit set and at least one other protocol data unit set.

BRIEF DESCRIPTION OF THE DRAWINGS

The foregoing aspects and other features are explained in the following description, taken in connection with the accompanying drawings.

FIG. 16A shows a PDU set for a V3C access unit.

FIG. 16B shows a PDU set for a V3C atlas access unit.

FIG. 19A illustrates the PDU handling RTP HE comprising dependency bits and the priority bits.

FIG. 19B illustrates dependency bits.

FIG. 19C illustrates priority bits.

FIG. 25 is an example method implementing the examples described herein.

FIG. 26 is an example method implementing the examples described herein.

FIG. 27 is an example method implementing the examples described herein.

FIG. 28 is an example method implementing the examples described herein.

DETAILED DESCRIPTION OF EXAMPLE EMBODIMENTS

Figure 1:
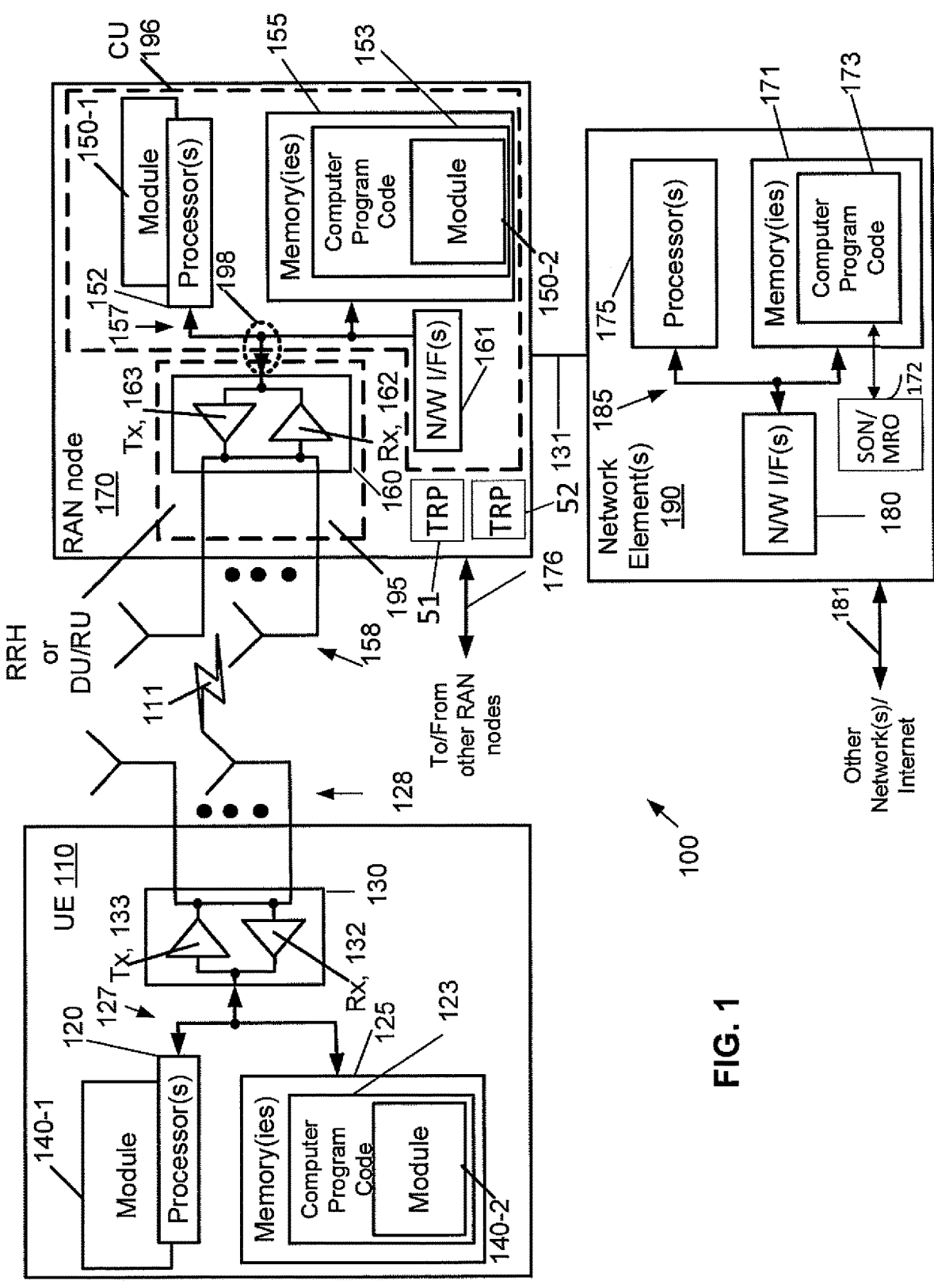
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 1 shows that the RAN node 170 comprises two TRPs, TRP 51 and TRP 52. The RAN node 170 may host or comprise other TRPs not shown in FIG. 1.

A relay node in NR is called an integrated access and backhaul node. A mobile termination part of the IAB node facilitates the backhaul (parent link) connection. In other words, the mobile termination part comprises the functionality which carries UE functionalities. The distributed unit part of the IAB node facilitates the so called access link (child link) connections (i.e. for access link UEs, and backhaul for other IAB nodes, in the case of multi-hop IAB). In other words, the distributed unit part is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 via a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (mobility management entity)/SGW (serving gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172.

The wireless network 100 may implement network virtualization, which is the process of combining hardware and software network resources and network functionality into a single, software-based administrative entity, or a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory.

The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback devices having wireless communication capabilities, internet appliances including those permitting wireless internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, a UAV such as e.g. a drone, or a UE mounted in a UAV. The user equipment 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein, including a method, apparatus, and computer program product for PDUs and PDU set handling. Thus, computer program code 123, module 140-1, module 140-2, and other elements/features shown in FIG. 1 of UE 110 may implement user equipment related aspects of the examples described herein. Similarly, computer program code 153, module 150-1, module 150-2, and other elements/features shown in FIG. 1 of RAN node 170 may implement gNB/TRP and network node/element related aspects of the examples described herein. Computer program code 173 and other elements/features shown in FIG. 1 of network element(s) 190 may be configured to implement network element related aspects of the examples described herein.

Having thus introduced a suitable but non-limiting technical context for the practice of the example embodiments, the example embodiments are now described with greater specificity.

The examples described herein are related to the work occurring in the 3GPP SA4 group where specification is being developed under the 5G_RTP Work Item within the 3GPP Rel. 18 timeframe. The SA2 group under 3GPP produced a technical report (TR) on the study of XR (extended reality) and media services [3GPP TR 23.700-60 V2.0.0 (2022-11) 3rd Generation Partnership Project; Technical Specification Group Services and System Aspects; Study on XR (Extended Reality) and media services (Release 18)]. From the TR the group aims to study enhancements of network exposure to support interaction between 5GS and applications. As part of this study, the following two objectives have been identified to be realized jointly with the SA4 group:

1. PDU (protocol data unit) set integrated packet handling
2. Differentiated PDU Set Handling Where, a PDU Set is defined as being composed of one or more PDUs carrying the payload of one unit of information generated at the application level (e.g. a frame or video slice for XRM services). In some implementations all PDUs in a PDU set are needed by the application layer in order to use the corresponding unit of information. In other implementations, the application layer can still recover parts or all of the information unit, when some PDUs are missing.

Based on the objective set by the TR, it is desired to meet the following requirements:

1. Which types of PDU set (e.g. frame/video slice) shall be supported for PDU set integrated packet handling by the 5G network.
2. What information should be provided to the 5GS regarding a PDU set for integrated packet handling, and how such information should be provided.
3. How the 5GS identifies that a PDU belongs to a specific PDU set.
4. Whether and how to enhance the QoS model and policy control for PDU set integrated packet handling.
5. Whether and how to perform the PDU set integrated packet handling in the UE, RAN and/or UPF (user plane function).
6. What information needs to be provided to the RAN and/or UPF to support PDU Set integrated packet handling in both the downlink direction and uplink direction.
7. Whether and how to provide information to the UE for PDU set integrated packet handling.
8. How does the 5GS identify the PDUs of one PDU set.
9. How does the 5GS determine the importance information for a given PDU set and/or dependency information between different PDU sets.
10. Which network entity needs the importance/dependency information associated with the PDU set and how it receives it.
11. Whether and how to enhance the QoS model and policy control for the importance/dependency information associated with a given PDU set.
12. Definition of the importance/dependency information enabling differentiated PDU set handling.

The examples described herein provide a PDU set design which meets some of the requirements listed above.

Study on XR (Extended Reality) and Media Services

The technical report studies issues, solutions and conclusions on the support of advanced media services, e.g. high data rate low latency (HDRLL) services, AR/VR/XR services, and tactile/multi-modality communication services. The objectives include:

Enhancements for supporting multi-modality service:

Study whether and how to enable delivery of related tactile and multi-modal data (e.g. audio, video and haptic data related to a specific time) with an application to the user at a similar time, focusing on the need for policy control enhancements (e.g. QoS policy coordination).

Enhancements of network exposure to support interaction between 5GS and application:

Study whether and how interaction between AF (application function) and the 5GS is needed for application synchronization and QoS policy coordination among multiple UEs or between multiple QoS flows per UE.

Study exposure of 5GS QoS information (e.g. QoS capabilities) and network conditions to the application to enable quick codec/rate adaptation help to provide desired QoE (e.g. such as assist in alleviating 5GS congestion).

Study whether and how the following QoS and policy enhancements for XR service and media service transmission are performed:

Study the traffic characteristics of media service enabling improved network resources usage and QoE.

Enhance QoS framework to support PDU set granularity (e.g. video/audio frame/tile, application data unit, control information), where a PDU set consists of PDUs that have the same QoS requirements.

Support differentiated QoS handling considering different importance of PDU sets, e.g. eligible drop packets belong to a less important PDU set to reduce the resource wasting.

Whether and how to support uplink-downlink transmission coordination to meet RTT (round-trip time) latency requirements between the UE and N6 termination point at the UPF.

Potential policy enhancements to minimize the jitter, focusing on e.g. requirement provisioning from the AF, and extension of PCC (policy and charging control) rule.

Study potential enhancements of power management considering traffic pattern of media services:

Power saving enhancement e.g. support trade-off of throughput/latency/reliability considering device battery life, whether and how to enhance CDRX (connected mode discontinuous reception), considering XR/media traffic patterns.

In order to meet some of these objectives, the SA2 group sent a liaison letter to the SA4 group of the 3GPP with the following [S4-221244, LS on N6 PDU Set identification].

SA2 have further discussed the different examples of applications that can map onto the concept of PDU set (PDU set or sets may, throughout this disclosure, be also referred to as PDU Set or Sets) indicated by SA4 in their liaison statement S2-2203658/S4-220505 and several solutions have been proposed for identifying at the UPF the PDU sets generated by the AS (application server). Among the proposed solutions, some can be summarized in these two options:

Option 1. Use available fields in the header described in existing IETF RFCs and drafts of the RTP protocol.

Option 2. Define new protocol (e.g., RTP/SRTP) header extensions by taking into account network abstraction layer (NAL) units, RTP payload type (e.g., H.264/5/6 and VP9/AV1), etc., to identify PDU sets in DL (downlink), including, e.g., PDU set sequence number, PDU set size in bits, PDU set length in number of PDUs, and/or PDU sequence number within the PDU set.

The purpose of option 2 is to simplify the extraction of PDU set related information. SA2 believes that option 2 falls under SA4's responsibility and has kindly asked them to investigate and, if necessary, define new mechanisms to identify PDU sets between the AS and the UPF and also provide a timeline information so that SA2 can decide whether option 2 can be considered within SA2 Rel-18 normative work (e.g., within Q1/Q2 2023).

RTP—Real-Time Transport Protocol

RTP is intended for an end-to-end, real-time transfer of streaming media and provides facilities for jitter compensation and detection of packet loss and out-of-order delivery. RTP allows data transfer to multiple destinations through IP multicast or to a specific destination through IP unicast. The majority of the RTP implementations are built on top of the user datagram protocol (UDP). Other transport protocols may also be utilized. RTP is used together with other protocols such as H.323 and real time streaming protocol (RTSP).

The RTP specification describes two protocols: RTP and RTCP. RTP is used for the transfer of multimedia data, and its companion protocol (RTCP) is used to periodically send control information and QoS parameters.

RTP sessions are typically initiated between a client and server or between a client and another client (or a multi-party topology) using a signaling protocol, such as H.323, the session initiation protocol (SIP), or RTSP. These protocols typically use the session description protocol (RFC 8866) to specify the parameters for the sessions.

RTP—RTP Session

An RTP session is established for each multimedia stream. Audio and video streams may use separate RTP sessions, enabling a receiver to selectively receive components of a particular stream. The RTP specification recommends even port numbers for RTP, and the use of the next odd port number for the associated RTCP session. A single port can be used for RTP and RTCP in applications that multiplex the protocols.

Each RTP stream consists of RTP packets, which in turn consist of RTP header and payload pairs.

SDP—Session Description Protocol

The session description protocol (SDP) is a format for describing multimedia communication sessions for the purpose of announcement and invitation. Its predominant use is in support of streaming media applications. SDP does not deliver any media streams itself but is used between endpoints for negotiation of network metrics, media types, bandwidth requirements and other associated properties. The set of properties and parameters is called a session profile. SDP is extensible for the support of new media types and formats. SDP is widely deployed in the industry and is used for session initialization by various other protocols such as SIP or WebRTC related session negotiation.

The session description protocol describes a session as a group of fields in a text-based format, one field per line. The form of each field is as follows.

<character>=<value><CR><LF> where <character> is a single case-sensitive character and <value> is structured text in a format that depends on the character. Values are typically UTF-8 encoded. Whitespace is not allowed immediately to either side of the equal sign.

Session descriptions consist of three sections: session, timing, and media descriptions. Each description may contain multiple timing and media descriptions. Names are only unique within the associated syntactic construct.

Fields must appear in the order shown; optional fields are marked with an asterisk V=(protocol version number, currently only 0)

o=(originator and session identifier: username, id, version number, network address)

s=(session name: mandatory with at least one UTF-8-encoded character)

i=* (session title or short information)

u=* (URI of description)

e=* (zero or more email address with optional name of contacts)

p=* (zero or more phone number with optional name of contacts)

C=* (connection information—not required if included in all media)

b=* (zero or more bandwidth information lines)

One or more time descriptions ("t=" and "r=" lines; see below)

z=* (time zone adjustments)

k=* (encryption key)

a=* (zero or more session attribute lines)

Zero or more Media descriptions (each one starting by an "m=" line; see below)

Time Description (Mandatory)

t=(time the session is active)

r=* (zero or more repeat times)

Media Description (Optional)

m=(media name and transport address)

i=* (media title or information field)

c=* (connection information—optional if included at session level)

b=* (zero or more bandwidth information lines)

k=* (encryption key)

a=* (zero or more media attribute lines—overriding the Session attribute lines)

Below is a sample session description from RFC 4566. This session is originated by the user "jdoe", at IPv4 address 10.47.16.5. Its name is "SDP Seminar" and extended session information ("A Seminar on the session description protocol") is included along with a link for additional information and an email address to contact the responsible party, Jane Doe. This session is specified to last for two hours using NTP timestamps, with a connection address (which indicates the address clients must connect to or—when a multicast address is provided, as it is here—subscribe to) specified as IPv4 224.2.17.12 with a TTL of 127. Recipients of this session description are instructed to only receive media. Two media descriptions are provided, both using the RTP audio/video profile. The first is an audio stream on port 49170 using RTP/AVP payload type 0 (defined by RFC 3551 as PCMU), and the second is a video stream on port 51372 using RTP/AVP payload type 99 (defined as "dynamic"). Finally, an attribute is included which maps RTP/AVP payload type 99 to format h263-1998 with a 90 kHz clock rate. RTCP ports for the audio and video streams of 49171 and 51373, respectively, are implied.

V=0 o=jdoe 2890844526 2890842807 IN IP4 10.47.16.5

S=SDP Seminar i=A Seminar on the session description protocol u=http://www.example.com/seminars/sdp.pdf e=j.doe@example.com (Jane Doe)

c=IN IP4 224.2.17.12/127 t=2873397496 2873404696 a=recvonly m=audio 49170 RTP/AVP 0 m=video 51372 RTP/AVP 99 a=rtpmap: 99 h263-1998/90000

SDP—Attributes

SDP uses attributes to extend the core protocol. Attributes can appear within the session or media sections and are scoped accordingly as session-level or media-level. New attributes can be added to the standard through registration with IANA. A list of all registered attributes can be found at https://www.iana.org/assignments/sdp-parameters/sdp-parameters.xhtml#sdp-att-field. A media description may contain any number of "a=" lines (attribute-fields) that are media description specific. Session-level attributes convey additional information that applies to the session as a whole rather than to individual media descriptions.

Attributes are either properties or values:

a=<attribute-name> a=<attribute-name>:<attribute-value>

Examples of attributes defined in RFC8866 are "rtpmap" and "fmtp". "rtpmap" attribute maps from an RTP payload type number (as used in an "m=" line) to an encoding name denoting the payload format to be used. It also provides information on the clock rate and encoding parameters. Up to one "a=rtpmap:" attribute can be defined for each media format specified. Thus, the following may be implemented:

m=audio 49230 RTP/AVP 96 97 98
    a=rtpmap: 96 L8/8000
    a=rtpmap: 97 L16/8000
    a=rtpmap: 98 L16/11025/2

In the example above, the media types are "audio/L8" and "audio/L16" are audio data sample formats. Refer to RFC 3551, clauses 4.5.10 and 4.5.11. Parameters added to an "a=rtpmap:" attribute should only be those required for a session directory to make the choice of appropriate media to participate in a session. Codec-specific parameters should be added in other attributes, for example, "fmtp".

"fmtp" attribute allows parameters that are specific to a particular format to be conveyed in a way that SDP does not have to understand them. The format must be one of the formats specified for the media. Format-specific parameters, semicolon separated, may be any set of parameters required to be conveyed by SDP and given unchanged to the media tool that are to use this format. At most one instance of this attribute is allowed for each format. An example is:

a=fmtp:96 profile-level-id=42e016;max-mbps=108000; max-fs=3600

For example RFC7798 defines the following sprop-vps, sprop-sps, sprop-pps, profile-space, profile-id, tier-flag, level-id, interop-constraints, profile-compatibility-indicator, sprop-sub-layer-id, recv-sub-layer-id, max-recv-level-id, tx-mode, max-lsr, max-lps, max-cpb, max-dpb, max-br, max-tr, max-tc, max-fps, sprop-max-don-diff, sprop-depack-buf-nalus, sprop-depack-buf-bytes, depack-buf-cap, sprop-seg-mentation-id, sprop-spatial-segmentation-idc, dec-parallel-cap, and include-dph.

Overview of WebRTC

WebRTC was originally created for real-time communication for the Web. This IETF/W3C standard supports video, audio, and data streaming. It is built into all modern browsers across desktop and mobile devices, and is increasingly used today for real time streaming of premium content.

WebRTC is evolving to include premium content, and is integrating with the premium streaming ecosystem via a variety of inputs, codecs, data sources, and consumers.

WebRTC is a set of W3C and IETF standards that allows the delivery of real-time content to users, with an end-to-end latency under half a second. Support for WebRTC is built into all modern browsers across desktop and mobile devices, and it allows for streaming of video, audio, and data.

While the original focus of WebRTC was on video conferencing, it is increasingly used today for real-time streaming of premium content because its ultra-low latency enables a number of user experiences, especially those that involve user interactivity, that are not possible with traditional broadcast or streaming delivery protocols.

Web real-time communication or as we know it WebRTC is a collection of Web APIs that allow developers to build audio, video, and generic data streaming applications over peer-to-peer connections within web browsers. It is built on an open web standard, thus having abundant support from developers. It is not tied to any specific browser, any web browser vendor can implement the specification. Because WebRTC runs on the web, it makes it easier to write a single application that runs on any device with a modern browser. WebRTC is built primarily on peer to peer connections, it can be used to build decentralized streaming applications, and thus reducing complexity when building applications that run across multiple devices that make use of audio, video, and camera APIs by providing its own set of universal APIs.

Where other competitors are limited to multimedia streams, WebRTC provides more than just audio and video streaming. With WebRTC it is possible to send arbitrary bytes over the wire, leaving the interpretation and processing of these bytes as an implementation detail. This makes WebRTC more flexible in comparison to other multimedia streaming methods. One does not need external libraries, software, or applications to be able to use WebRTC. In most cases, one just needs a browser with WebRTC support.

WebRTC is supported in several programming languages and frameworks. Some of them include: JavaScript, Java (Android), Node.js Rest, Node.js WebSocket, Go, PHP, Python, React, Native, REST, Ruby, Swift (IOS).

Under the hood WebRTC is just a collection of JavaScript APIs. Before WebRTC, most audio/video streaming applications were implemented using a client-server architecture, where a browser or a native app is the client and it connects to a server of sorts to request data. The server then responds with a data stream.

WebRTC sends data across browsers. It uses NAT traversal mechanisms such as STUN and TURN for browsers to reach one another. Sometimes browsers need to connect to a relay server. Separated are media and signaling. Peer-to-peer is the default approach, one can add servers to store and forward media data between peers.

Figure 2:
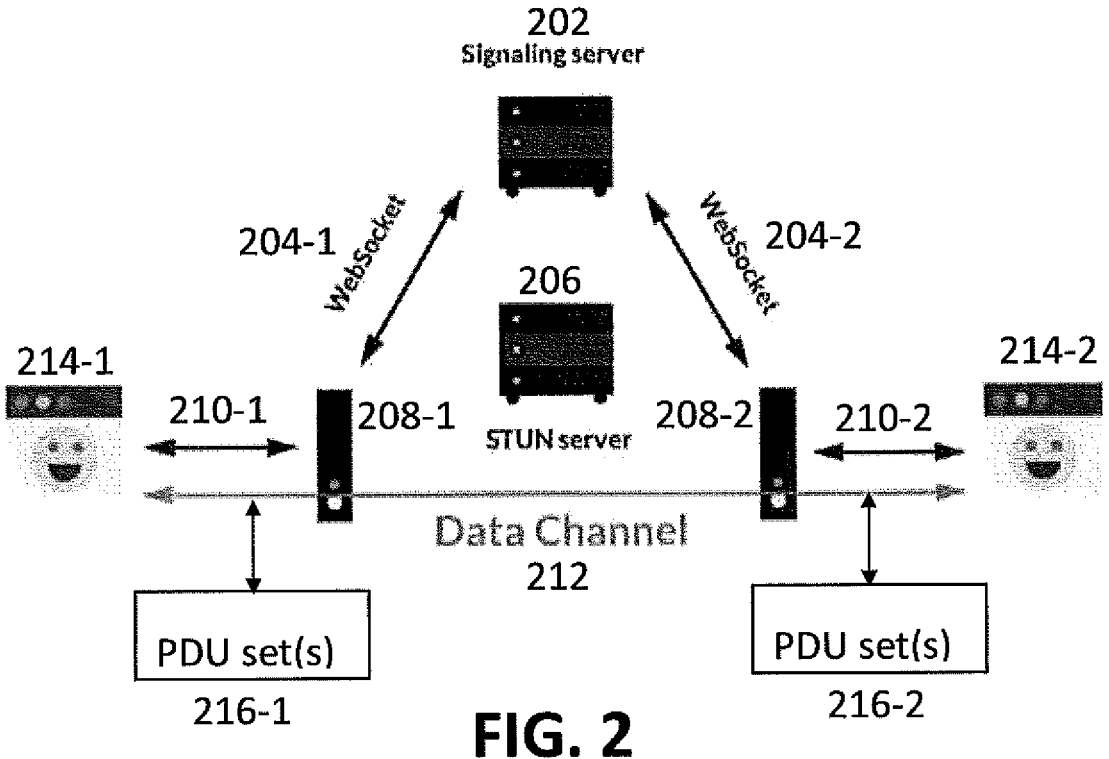
FIG. 2 is an example architecture of peer to peer communication according to WebRTC (taken from the DASH-IF report on WebRTC).

FIG. 2 is an example architecture of peer to peer communication according to WebRTC (taken from the DASH-IF report on WebRTC). Peers (214-1, 214-2) communicate over data channel 212 via intermediate channels (210-1, 210-2) and relay servers (208-1, 208-2). Signaling server 202 provides data to the relay servers (208-1, 208-2) via web-sockets (204-1, 204-2) and STUN server 206. In accordance with the examples described herein, one or more PDU sets (216-1, 216-2) are transmitted and received over the data channel 212.

Figures 3, 4, 5:
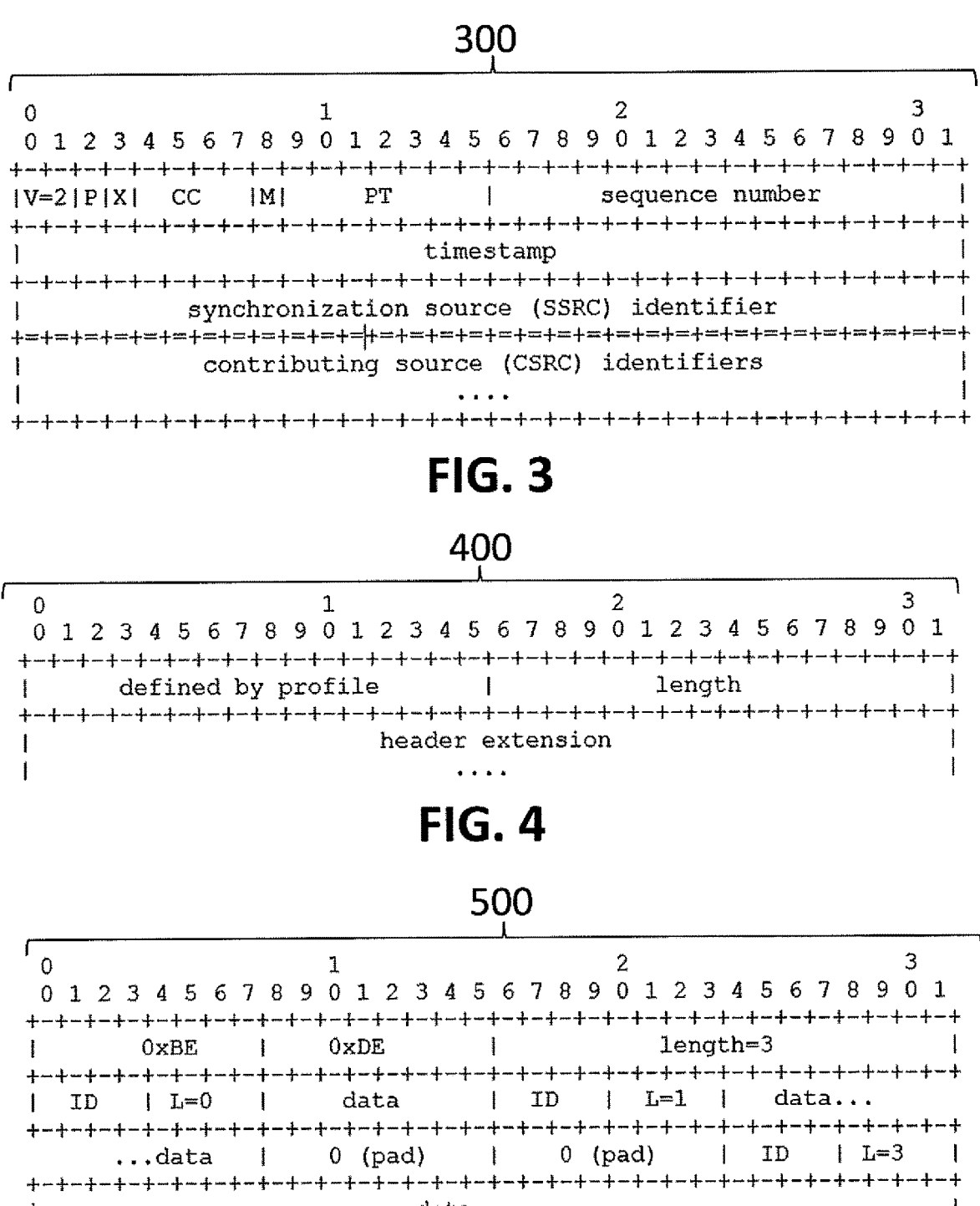
FIG. 3 shows an example format of an RTP header.
FIG. 4 illustrates an example RTP header extension.
FIG. 5 is an example of a one-byte header RTP extension.

RTP Header and Header Extension:

The RTP header 300 has the following format (RFC 3550) as shown in FIG. 3.

The first twelve octets are present in every RTP packet, while the list of CSRC identifiers is present only when inserted by a mixer. The fields have the following meaning:

Version (V): 2 Bits

This field identifies the version of RTP. The version defined by this specification is two (2). (The value 1 is used by the first draft version of RTP and the value 0 is used by the protocol initially implemented in the "vat" audio tool.).

Padding (P): 1 Bit

If the padding bit is set, the packet contains one or more additional padding octets at the end which are not part of the payload. The last octet of the padding contains a count of how many padding octets should be ignored, including itself. Padding may be needed by some encryption algorithms with fixed block sizes or for carrying several RTP packets in a lower-layer protocol data unit.

Extension (X): 1 Bit

If the extension bit is set, the fixed header MUST be followed by exactly one header extension.

CSRC Count (CC): 4 Bits

The CSRC count contains the number of CSRC identifiers that follow the fixed header.

Marker (M): 1 Bit

The interpretation of the marker is defined by a profile. It is intended to allow significant events such as frame boundaries to be marked in the packet stream. A profile MAY define additional marker bits or specify that there is no marker bit by changing the number of bits in the payload type field (see Section 5.3).

Payload Type (PT): 7 Bits

This field identifies the format of the RTP payload and determines its interpretation by the application. A profile MAY specify a default static mapping of payload type codes to payload formats. Additional payload type codes MAY be defined dynamically through non-RTP means (see Section 3). A set of default mappings for audio and video is specified in the companion RFC 3551 [Schulzrinne, H. and S. Casner, "RTP Profile for Audio and Video Conferences with Minimal Control", RFC 3551, July 2003.]. An RTP source MAY change the payload type during a session, but this field SHOULD NOT be used for multiplexing separate media streams (see Section 5.2).

A receiver MUST ignore packets with payload types that it does not understand.

Sequence Number: 16 Bits

The sequence number increments by one for each RTP data packet sent, and may be used by the receiver to detect packet loss and to restore packet sequence. The initial value of the sequence number SHOULD be random (unpredictable) to make known-plaintext attacks on encryption more difficult, even if the source itself does not encrypt according to the method in Section 9.1, because the packets may flow through a translator that does. Techniques for choosing unpredictable numbers are discussed in [Eastlake 3rd, D., Crocker, S. and J. Schiller, "Randomness Recommendations for Security", RFC 1750, December 1994.]

Timestamp: 32 Bits

The timestamp reflects the sampling instant of the first octet in the RTP data packet. The sampling instant MUST be derived from a clock that increments monotonically and linearly in time allow synchronization and jitter calculations. The resolution of the clock MUST be sufficient for the desired synchronization accuracy and for measuring packet arrival jitter (one tick per video frame is typically not sufficient). The clock frequency is dependent on the format of data carried as payload and is specified statically in the profile or payload format specification that defines the format, or MAY be specified dynamically for payload formats defined through non-RTP means. If RTP packets are generated periodically, the nominal sampling instant as determined from the sampling clock is to be used, not a reading of the system clock. As an example, for fixed-rate audio the timestamp clock would likely increment by one for each sampling period. If an audio application reads blocks covering 160 sampling periods from the input device, the timestamp would be increased by 160 for each such block, regardless of whether the block is transmitted in a packet or dropped as silent.

An RTP header extension 400 (RFC 3550 and RFC 8285) is defined as shown in FIG. 4. If the X bit in the RTP header 300 is one, a variable-length header extension MUST be appended to the RTP header, following the CSRC list if present. The header extension contains a 16-bit length field that counts the number of 32-bit words in the extension, excluding the four-octet extension header (therefore zero is a valid length). Multiple RTP header extensions can be appended to the RTP data header in accordance with RFC8285. To allow multiple interoperating implementations to each experiment independently with different header extensions, or to allow a particular implementation to experiment with more than one type of header extension, the first 16 bits of the header extension are left open for distinguishing identifiers or parameters. The format of these 16 bits is to be defined by the profile specification under which the implementations are operating. This RTP specification does not define any header extensions itself.

Figure 6:
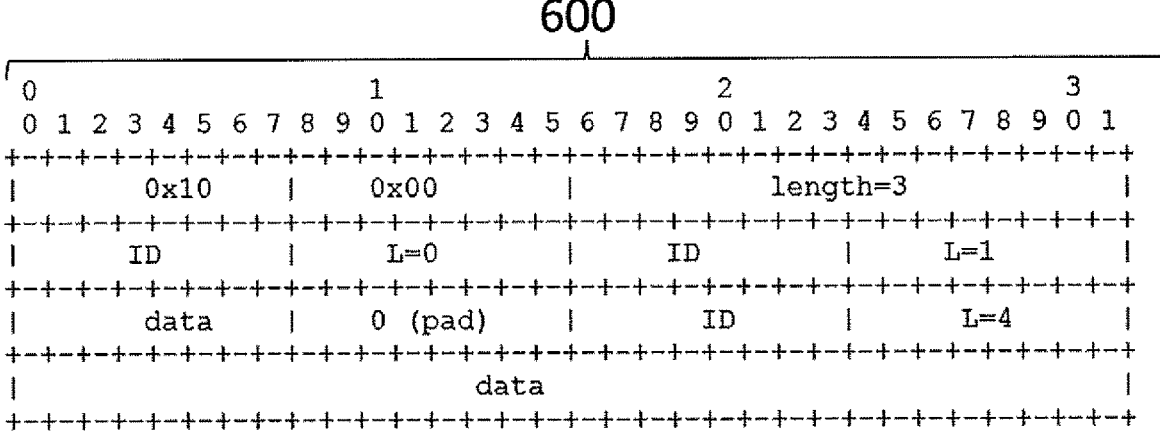
FIG. 6 is an example of a two-byte header RTP extension.

An example of a one-byte header RTP extension 500 is shown in FIG. 5. An example of a two-byte header RTP extension 600 is shown in FIG. 6.

RTCP Feedback

Figure 7:
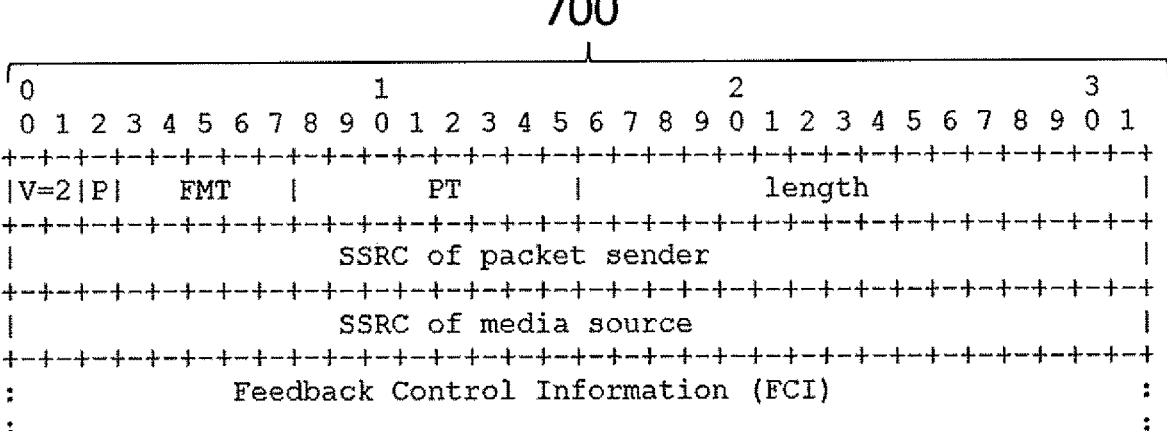
FIG. 7 shows an example common packet format for RTCP feedback messages.

RFC 4585 defines an extension to AVP (audio/video profile) that allow receivers to provide more immediate RTCP feedback to the senders and thus allows for short-term adaptation and efficient feedback-based repair mechanisms to be implemented. The RFC defines an immediate feedback mode: a mode of operation in which each receiver of a media stream is, statistically, capable of reporting each event of interest immediately back to the media stream sender. It also defines early RTCP mode: the mode of operation in that a receiver of a media stream is often (but not always) capable of reporting events of interest back to the sender close to their occurrence. The common packet format for RTCP FB (feedback) messages (700) is depicted in FIG. 7.

RTP consists of header and payload pairs, where the payload may be encrypted in the case of SRTP. Encrypted transmission is very common in the industry as media streams are rarely intended for unauthorized usage. In case of encrypted payloads, the network elements handling the transmission of RTP packets have little to no visibility to the type of information that is carried in the payload. Some rudimentary processing may be performed based on the RTP header, which remains unencrypted. E.g. this could include processing based on the marker (M) bit, sequence number and timestamp.

The prior-art discloses mechanisms under discussion in SA4 and SA2, which intend to provide additional flexibility for network elements to process RTP packets based on the PDU set concept using a header extension to RTP packet. The information in the header extension would remain visible to the network elements even if the payload is encrypted. The proposed PDU set concept does not include mechanisms for indicating decoding dependency among different PDUs in a PDU set or among different PDUs in different PDU sets.

Based on the liaison statement on N6 PDU set identification from the SA2 group, the following options are possible.

Option 1. Use available fields in the header described in existing IETF RFCs and drafts of the RTP protocol.

Option 2. Define new protocol (e.g., RTP/SRTP) header extensions by taking into account Network Abstraction Layer (NAL) units, RTP Payload type (e.g., H.264/5/6 and VP9/AV1), etc., to identify PDU sets in DL, including, e.g., PDU set sequence number, PDU set size in bits, PDU set length in number of PDUs, and PDU sequence number within the PDU set.

TR 23.700-60 Study on XR (Extended Reality) and Media Services

This document outlines several solutions for handling PDU set integrated handling and PDU set differentiated handling. Some of the text from clause 6.12 and 6.14 is given below.

For interactive media services, e.g. Cloud XR, cloud gaming, real-time video based remote control, each frame/ video slice is delivered via multiple PDUs in the 5GS. For example, an I-Frame of 4K video can be more than 1 MB which means around 1000 IP packets are needed to deliver it. Considering the frame/video slice can only be decoded in case all packets (or most of the packets, if FEC (forward error correction) is used during encoding) are successfully received. The 5G system should be aware of the PDU set and handle packets of one PDU set in an integrated manner. When one or some PDUs fail to be transmitted, the whole PDU set can be dropped.

In this solution, the following aspects are included:

1. Optionally, the AF provides PCF (policy control function) with the PDU set level QoS requirements and the flow description for the target media service data flow.

2. The PCF may generate the PCC rule with PDU set level QoS parameters and also the detection rules for the PDU set.

3. The PCF sends the PCC rule to the SMF (session management function). The SMF distributes these QoS parameters/policy to the RAN/UPF and instructs the UPF to detect a PDU set during the PDU session establishment/modification procedures.

4. Once the application service has started, the UPF identifies the PDUs of each PDU set and marks PDU set info in the GTP-U header of DL packets to the RAN. The details of how to identify the PDUs within a PDU set is in clause 6.12.3.2. Where GTP is the GPRS Tunnelling Protocol and the GTP-U is the GPRS Tunnelling Protocol for User Plane.

5. The RAN identifies the PDUs of a PDU set based on the PDU set info in the GTP-U headers. The RAN performs the PDU set integrated packet processing to deliver the PDU set to UE.

PDU set integrated packet handling. A high level procedure of PDU set integrated packet handling can be shown in FIG. 8.

Figure 8:
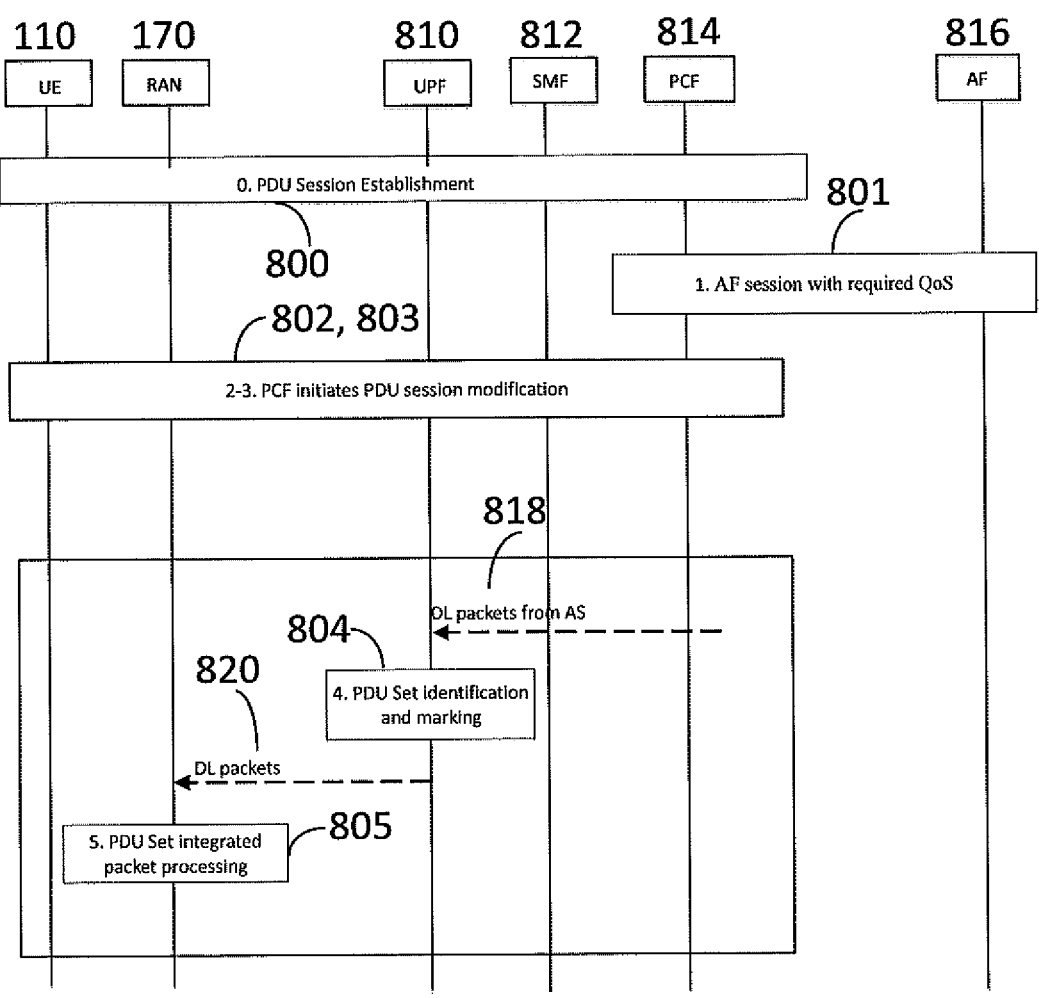
FIG. 8 is a high-level procedure of PDU set integrated packet handling.

As shown in FIG. 8, a schematic diagram of the modification process of the PDU session for the XR service is given. The process includes the following steps:

0. At 800, the UE 110 establishes a PDU session as defined in clause 4.3.2.2.1 of TS 23.502 [3GPP TS 23.502: "Procedures for the 5G System; Stage 2"]. A network slice type for an XR service can be used for such a PDU Session.

1. At 801, optionally, as defined in clause 4.15.6.6 of TS 23.502 [3GPP TS 23.502: "Procedures for the 5G System; Stage 2".], the AF 816 may invoke the Nnef_AFsession WithQoS_Create request to set up an AF session with the required QoS. In step 1 (801), the AF 816 may send the following information to PCF 814:

Flow description of the target media service data flows for PDU set handling,

Burst periodicity, or

The PDU set level packet handling/treatment requirements. The PDU set level packet handling/treatment requirements are optional and may include e.g. PDU set error rate, PDU set delay budget, maximum PDU set loss rate/number, media protocol info (e.g. which RFC is used in user data) etc.

2. At 802, PCF 814 may initiate the PDU session modification procedure as defined in clause 4.3.3.2 of TS 23.502 [3GPP TS 23.502: "Procedures for the 5G System; Stage 2".]. The PCF 814 generates appropriate PCC rules based on the information from AF 816 as mentioned in step 1 (801), e.g. 5QI, PER and PDB. The PDU set level packet handling/treatment requirements may be considered during the PCC rule generation. The PCC rules may also include the detection rules of service data flow, PDU set level packet handling/treatment policy, or PDU set identification rules. The PDU set identification rules may contain the RTP header identification method, and/or the RTP payload identification method for H.264, H.265 and H.266. The PCF 814 sends the PCC rules to SMF 812.

3. At 803, SMF 812 generates the QoS profiles and N4 rules based on the PCC rules from PCF 814, which may include the packet handling/treatment policy. SMF 812 sends the N4 rules to UPF 810 via the N4 rule, which may include the identification and marking rule for the PDU set. Besides, SMF 812 also sends the QoS profiles to the RAN node 170 via AMF 816, and instructs RAN 170 to perform PDU set integrated QoS handling. NOTE 1: Based on media protocol info included in the PDU set level packet handling/ treatment requirements or based on pre-configuration, SMF 812 generates N4 rules accordingly to instruct UPF 810 to identify the PDU sets of corresponding protocols.

4. At 804, based on received N4 rules or local configuration on the UPF 810, the UPF 810 identifies the PDU set and marks PDU set info in the GTP—U layer in the DL packets (818, 820), including start/end indication of the PDU set and the PDU set ID.

5. At 805, the RAN 170 identifies the PDU set based on the PDU set info in the GTP-U header and transmits PDUs within the PDU set in an integrated manner, e.g. the RAN 170 may drop the PDU set as a whole in case of poor network condition, and execute packet handling/treatment policy.

PDU Set Identification and Marking on UPF

UPF (e.g. 810) can identify the PDUs of one PDU set via different ways, e.g. the RTP headers/payloads in case RTP is used, or the traffic periodicity. The UPF then add marks in the GTP-U headers of DL packets to assist the RAN for the PDU set identification, e.g. the start/end indication of the PDU set and PDU set ID. The identification of the PDU set depends on what the PDU set represents, e.g. a video frame or a video slice.

Figure 9:
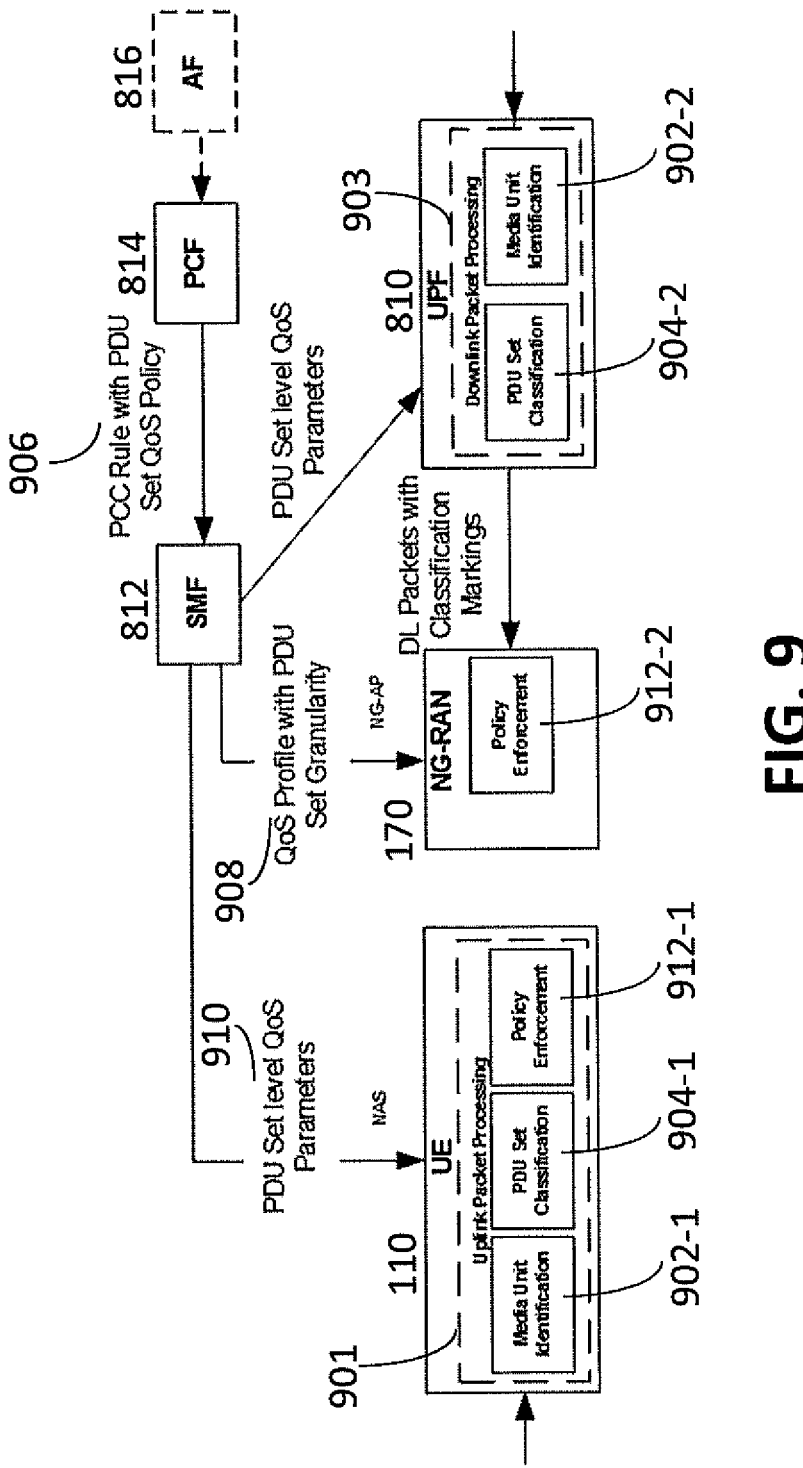
FIG. 9 illustrates 5GS support for PDU family integrated packet handling.

To support PDU set integrated packet handling, this solution proposes the decomposition and mapping of functionality shown in FIG. 9.

This solution assumes the following definition:

Media unit identification (902-1, 902-2). Media unit identification detects media specific properties of packets according to the PDU families to which they belong. Media unit identification may utilize techniques such as DPI, and examination of RTP headers to determine the media units associated with a packet. Media unit identification (902-1, 902-2) may be performed at the UE 110 (for uplink 901) or the UPF 810 (for downlink 903). Media unit identification may be implemented differently in the UE 110 and UPF 810. At the UE 110 media unit identification 902-1 may be integrated with functionality described by SA4 in TR 29.998 (e.g. for 5G STAR UE or EDGAR UE). Information needed to detect the media units is configured on the SMF/UPF (812/810), or in the case of RTP headers, the AF 816 may provide information regarding the RTP header to be detected. When RTP is not used, media unit detection may not be possible for encrypted traffic.

Packet classification (904-1, 904-2). Packet classification (904-1, 904-2) uses media unit identification information (902-1, 902-2) to associate packets with a PDU set in one or more PDU Families. Classification (904-1, 904-2) captures media layer attributes that can impact QoS treatment. This may include dependence of packet treatment on the successful handling other packets (e.g. treatment of a packet carrying a P-Frame fragment is dependent on the successful handling of packets carrying I-Frame fragments) or treatment of a packet carrying an enhancement layer is dependent on the successful handling of packets carrying a base layer. Classification 904-2 is conveyed from the UPF 810 to the NG-RAN 170 via markings added to a GTP-U header extension, and hence 3GPP standardization of classification is adopted.

In addition, optionally, assistance information describing media and traffic characteristics not required per-packet such as RTP header type (for media where an RTP header is used), number of temporal and spatial media layers, group of pictures (GOP) structure, temporal and spatial layer periodicities and inter-dependencies, etc. may be provided by an AF 816 or configured in the 5GS.

Enhanced QoS policy—in the 5GS, how packets are treated is based on QoS policy determined at the PCF 814. While packet classification markings indicate PDU set associations and media unit properties (for example, indicating that the packet carries a fragment of an I-Frame from a spatial enhancement layer that is dependent on a base layer for an H.26x video stream) they do not specify how the packet is treated in the 5GS. To align with the current 5GS QoS framework, QoS policy is enhanced to provide PDU set granularity QoS information indicating how packets should be treated. The enhanced policy information is sent to the SMF 812 in a PCC rule and sent to the NG-RAN 170 and, UE 110 using existing mechanisms (respectively 906, 908, 910) as shown in FIG. 9.

Enhanced policy (908, 910) sent from the SMF 812 to the NG-RAN 170 (via the QoS Profile) and/or UE 110 may comprise of the following:

1 Changes to the QoS flow priority level according to the classification of a PDU as belonging to a PDU set in one or more PDU families (see example in Table 1 below).

2 Changes to QoS Flow PER according to the classification of a PDU as belonging to a PDU set in one or more PDU families.

3 Changes to QoS Flow PDB according to the classification of a PDU as belonging to a PDU set in one or more PDU families.

4 PDU set validity time, which indicates for each PDU set type, the maximum delay for a given PDU set instance to be delivered to the recipient. Beyond the validity time, the PDU set instance is not considered valid, and thus all packets of the PDU set that were not transmitted can be discarded at the RAN. The PDU set validity time defines an upper bound time limit that the combined set of packets in a PDU set instance may be delayed between the UE 110 and the N6 termination point at the UPF 810.

Note for example that for an I-Frame PDU set, the validity time may take into account the usefulness of I-Frames for subsequent P-Frame decoding, which may occur at a later time than is required to render the I-Frame. Similar scenarios apply for PDU sets in the temporal and spatial layer PDU families where an enhancement layer PDU set may be dependent on a base layer PDU set. When there is one packet in the PDU set, the validity time may be greater than the PDB to reflect the usefulness of the PDU set for this purpose.

NOTE: neither the RAN 170 nor UE 110 are aware of media layer details. RAN behavior to enforce policy is up to RAN WGs. The details of UE behavior is up to UE implementation.

Policy Enforcement PDU set level packet treatment (respectively 912-2, 912-1) in the NG-RAN 170 and UE 110 is achieved by matching all PDU set packet classification markings with the enhanced QoS policy information provided in the QoS profile and PDU SetLevel QoS parameters.

Functional Description

PDU Families and Packet Classification

As described in the Key Issues [3GPP TR 23.700-60 V2.0.0 (2022-11) 3rd Generation Partnership Project; Technical Specification Group Services and System Aspects; Study on XR (Extended Reality) and media services (Release 18)], a "group of packets (that) belongs to a same PDU set will be handled in an integrated manner". In media streams, groups of packets handled in an integrated manner occur at different levels. These levels include:

Level 1 PDU Family—Media Frame or Media Frame Slice: Packets that comprise fragments of a media frame (e.g. an I-Frame/Slice or a P-Frame/Slice where a slice is an independently encoded region of a frame and is also the minimum media unit of transmission over the network) may be handled in an integrated manner since, for example only by sending all packets of a frame or a frame slice can the frame/slice be successfully decoded. Hence the set of PDUs that comprise a specific media frame or media frame slice should be considered a PDU set in the media frame or media frame slice PDU family. Differentiated QoS handling may be provided for PDUs that are members of different PDU sets in these families (e.g. a packet that is a member of I-Frame PDU set is given priority over a packet that is a member of a P-Frame PDU set).

Level 2 to Level N PDU Family—additional media frame sets: Groups of packets can comprise higher level media units that are processed in an integrated manner (as a PDU set), particularly for scalable/layered media. For example, packets that comprise a temporal base layer may be processed in an integrated manner and hence be members of a temporal base layer PDU set in the Temporal Layer Family while different packets that comprise a temporal enhancement layer-1 may be considered as members of a Temporal Enhancement Layer-1 PDU set in the same PDU Family. Similarly packets that comprise a spatial base layer may be processed in an integrated manner and hence be members of a Spatial Base Layer PDU set in the Spatial Layer Family while different packets that comprise a spatial enhancement layer-1 may be considered as members of a Spatial Enhancement Layer-1 PDU set in that same PDU Family. In addition to having different layers, a video frame may further be divided into tiles that represent different regions of the overall wide (e.g. full 360 degree) view, where tiles belonging to or close to the current user viewport may be sent with a different quality than the other tiles. Additional PDU Families may be considered for this type of media.

Level N+1 PDU Family—Application Type/Media Stream/Sub-Flow—5GS QoS Flows can carry multiple application flow instances of the same type (e.g. two H.26x video streams) as well as application flow instances of different types (e.g. H.26x video and AAC Audio). To distinguish between these application flows within a QoS Flow, packets associated with an application instance may comprise a PDU set in the Application Type/Media Stream/Sub-Flow PDU Family. Differentiated QoS handling may be provided to PDUs according to the Application Type/Media Stream/Sub-Flow PDU set to which they belong (e.g. audio has higher priority than video). Alternatively application flow instances may be mapped to separate QoS Flows, in which case Application Type QoS differentiation can be provided by existing QoS.

A PDU may be classified as belonging to a PDU set in just one PDU Family (e.g. an I-Frame PDU set in a Media Frame/Slice Family), or as belonging to a PDU set in each of several PDU Families (particularly for scalable/layered media).

A GTP-U extension header field is defined for each PDU Family. Note that since an individual PDU may be a member of multiple PDU Families, a field for each may be included in the extension header. Proposed PDU Families are:

1. Frame/Slice
2. Temporal Layer
3. Spatial Layer
4. Application/Media Stream/Sub-Flow For each PDU Family/GTP-U field, sub-fields contain the following information:

The PDU set Type

A rolling counter to sequentially number each PDU set instance within a PDU Family (one counter for all PDU sets within the PDU Family)

Dependency, which is the rolling-counter value previously assigned to the PDU set instance on which the PDU set is dependent.

In addition a sub-field with a PDU set Start/End Indicator is provided for the Frame/Slice PDU family so the RAN can take advantage of time between frames for power saving.

The rolling counter distinguishes between PDUs belonging to two instances of the same PDU set Type (e.g. two sequential P-Frames) and is used to indicate dependency of a PDU set instance on another PDU set Instance (e.g. a P-Frame's dependency on a specific I-Frame instance, or an enhancement Layer's dependency on a specific base layer instance).

For example, for Packets classified in PDU Family #1 (Media Frame/Slice), all packets carrying fragments of a particular I-Frame instance may be assigned a rolling counter value=3. Packets carrying P-Frames that are dependent on that I-Frame instance would have "3" indicated in their "Dependency" field. In another example, for packets classified in PDU Family #2 (Temporal Layer), all packets carrying fragments of a particular Temporal Base Layer instance may be assigned a rolling counter value=7. Packets carrying Temporal Enhancement Layers that are dependent on that base layer instance would have "7" indicated in their "Dependency" field.

Figure 10:
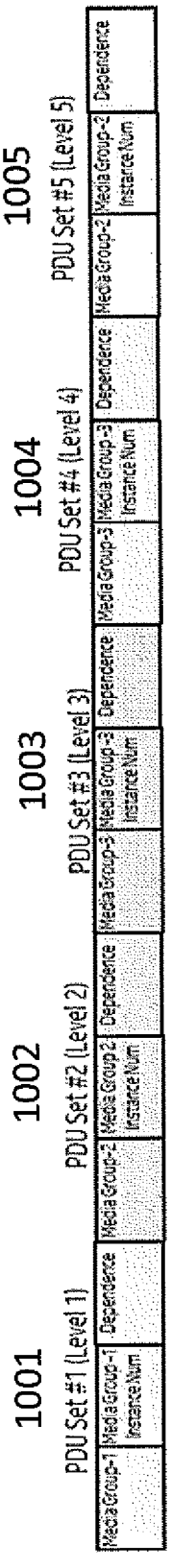
FIG. 10 is an example GTP-U packet header.

Referring to FIG. 10, packets can belong to a PDU set in one or more of the PDU Families as described above. The PDU set Types represented at each level are defined via configuration. For example, for H.26x video one may have levels PDU Families and PDU set Types defined as:

Level 1 (1001): PDU Family #1=Media Frame/Slice, with Media Types.
Not Assigned
Independent or Random-access Frame or Slice ("I-Frame")
Referenced Frame or Slice ("P-Frame" with forward references)
Non-referenced Frame or Slice ("P-Frame" with no forward references)

Level 2 (1002): PDU Family #2=Temporal Media Layers, with PDU Set Types
Not Assigned
Base Layer
Enhancement Layer 1
Enhancement Layer 2

Level 3 (1003): PDU Family #4=Spatial Media Layers, with PDU Set Types
Not Assigned
Base Layer
Enhancement Layer 1
Enhancement Layer 2

Level 4 (1004): PDU Family #4=Application/Media Stream/Sub-Flow, with PDU Set Types
Not Assigned
H.26x video
AAC Audio Values for the "PDU Set Type" portion of the GTP-U extension header for each PDU Family fields and an example packet marking is shown in Table below. packet from an H.264 video flow identified as carrying an I-Frame fragment in Temporal Enhancement Layer 2 and a Spatial Base layer would be marked in the "PDU Set Type" GTP-U sub-header fields defined for the levels as shown in the 4th column of table 1:

TABLE 1

Example PDU Set Type GTP-U Extension Header with
PDU Family Classification Marking for a Packet

| PDU Set Type | Field Name | PDU SetTypes (values and definition) | Example Packet Marking (PDU Set Type) | Interpretation of Example PDU Set Type |
|---|---|---|---|---|
| 1 | PDU Family #1 | 0 = Not Assigned<br>1 = Random-access (I) frame<br>2 = Referenced (P) frame<br>3 = Non-referenced (P) frame | 1 | Random-access (I) Frame |
| 2 | PDU Family #2 | Temporal Layers:<br>0 = Not Assigned<br>1 = Base Layer<br>2 = Enhancement Layer 1<br>3 = Enhancement Layer 2 | 3 | Temporal Enhancement Layer #2 |
| 3 | PDU Family #3 | Spatial Layers:<br>0 = Not Assigned<br>1- Base Layer<br>2 - Enhancement Layer 1<br>3 - Enhancement Layer 2 | 1 | Spatial Base Layer |

TABLE 1-continued

| Example PDU Set Type GTP-U Extension Header with PDU Family Classification Marking for a Packet | | | | |
|---|---|---|---|---|
| PDU Set Type | Field Name | PDU SetTypes (values and definition) | Example Packet Marking (PDU Set Type) | Interpretation of Example PDU Set Type |
| 4 | PDU Family #4 | Application/ Media Stream/ Sub-Flow: 0 = Not Assigned 1 = H.264 video 2 = AAC Audio | 1 | H.264 Video |

This structure provides flexibility for cases where Media Unit Identification is available for only a sub-set of PDU Families. For example, if Media Detection can only distinguish packets associated an I-Frame and a P-Frame, or alternatively as associated with a base layer and an enhancement layer, the UPF may classify and mark those Packets accordingly and leave the other fields "not assigned". Policy that differentiates packet handling, for example of packets associated with a "base layer" vs "enhancement layer" may then be applied even if for example the frame-type/slice remains unidentified.

The resultant, complete classification header markings for each packet would be as shown in FIG. 10. Shown also is level 5 (1005), PDU Set #5.

Example entries are shown in parentheses in each sub-field in FIG. 10. The markings are for a PDU carrying an I-Frame for Temporal Enhancement Layer #1 and Spatial Enhancement Layer #1 of an H.264 video stream. Here both enhancement layers are dependent on base layer instances as indicated by the Level 2 and Level 3 dependency fields.

Policy for PDU Families

Packets are classified according to the PDU sets in PDU Families to which they belong so differentiated QoS that considers PDU Family and PDU set classification can be applied according to policy provisioned on the SMF or conveyed from the PCF. As per clause 5.7.3 of TS 23.501, currently Priority Level indicates a priority in scheduling resources among QoS Flows. PER and PDB are also assigned per QoS Flow. In this solution it is assumed that each QoS Flow is still assigned a pre-configured or standardized Priority Level, PER and PDB as in standardized 5QI characteristics table (see clause 5.7.4 of TS 23.501), or a priority level, PER or PDB for the QoS Flow is signaled over NGAP. This is the Reference Priority level, PER and PDB for all the packets within the QoS Flow.

To vary Priority Level, PER and PDB according to how a packet is classified, a per-packet adjustment to the Reference Priority Level can be determined according to new Parameteradjustment information provided in QoS information that is pre-configured, associated with a standardized 5QI or sent from the PCF to the NG-RAN, and/or UE. The Parameteradjustment information contains per PDU Family/ PDU set Type adjustments to the Reference ParameterLevels. For each PDU Family and PDU set type to which a packet belongs, the ParameterAdjustment information provides a value that is added to the Reference Parameter. The resultant sum for all adjustments to the Reference Priority determines the priority of the packet.

To illustrate using the Priority Level QoS parameter, as per Table 5.7.4-1 of TS 23.501, a standardized 5QI=89 (Visual content for cloud/edge/split rendering) with a default (Reference) Priority=25 could be selected to transport H.26x video. The priority level adjustment information provided to the NG-RAN corresponding to the packet classification illustrated in Table 1 could be as shown in Table 2 (note a reduced priority level means higher priority).

Packets received at the NG-RAN with GTP-U markings as described above in clause 6.14.2.1 would have their reference parameters adjusted according to the PDU Family and PDU Set Type to which they are associated. For instance, if the reference Priority Level is 25, packets classified as belonging to PDU Set Type #1 (I-Frame) in PDU Family #1 (Media Frame/Slice) would have their priority level decreased by "2"

TABLE 2

| Priority Level Adjustment for H.26x Video for PDU Sets shown in Table 1 above | | | | |
|---|---|---|---|---|
| | PDU Family #1 (Frame Type) | PDU Family #2 (Media Layer 1) | PDU Family #3 (Media Layer 2) | PDU Family #4 (Application Type) |
| PDU Set Type #0 (not assigned) | 0 | 0 | 0 | 0 |
| PDU Set Type #1 | −2 | −2 | −1 | +1 |
| PDU Set Type #2 | +2 | 0 | +1 | −1 |
| PDU Set Type #3 | | +1 | +2 | |
| PDU Set Type #4 | | | | |

23

24

To further illustrate, the QoS Flow Reference Priority Level=25 would be decreased by 2 if the packet carries an I-Frame (PDU Family #1, Media Type #1), increased by 1 if the packet carries a Temporal Enhancement Layer 2 (PDU Family #2, Type #3), decreased by 1 if it is in the base Spatial Layer (PDU Family #4, Type #1), and increased by 1 because it is an H.264 video application (PDU Family #5, Type #1) so the resultant priority for the example packet is 24.

Similar tables may provide adjustments to the reference level for PER and PDB. These tables would be provided to the, NG-RAN, and/or UE, for example to the NG-RAN in an expanded QoS Profile so the, RAN, and/or UE can treat packets with corresponding classification markings with the appropriate priority.

In addition, for each PDU Set Type in each PDU Family, a PDU Set Validity Time as described above may be provided. The PDU Set Validity Time may be used by the NG-RAN to decide whether to transmit or drop the PDUs of a PDU set instance.

Additional QoS differentiation may be provided with additional policy information similar to Table 2 for other QoS Parameters. For example, ARP may be varied depending on whether a packet belongs to a base vs an enhancement layer.

Tdoc S4-221253—Discussion on the Usage of RTP/SRTP Header and Header Extension for PDU Set/Frame Identification The solution presented in the document can be categorized into two groups of using:

i. IETF RTP [RFC 3550, RTP: A Transport Protocol for Real-Time Applications]/SRTP [RFC 6904, Encryption of Header Extensions in the Secure Real-time Transport Protocol (SRTP)] header ii. IETF framemarking [draft-ietf-avtext-framemarking-13, Frame Marking RTP Header Extension, Latest revision 2021-11-11] (using RTP header extension [RFC 8285, RTP Generic Header Extension] mechanism).

The above-mentioned solution (i) is mainly targeted for video codecs including H264/H265/H266/VP8/VP9 using IETF payload format specification. Solution (ii) is merely useful for H.264/H.265 or VP8/9, with the assumption that IETF framemarking working group draft [draft-ietf-avtext-framemarking-13, Frame Marking RTP Header Extension, Latest revision 2021-11-11] is to be published in due time.

An insight of using solutions (i)(ii) for PDU boundary identification is when a non-encrypted RTP protocol is being used, not SRTP. With non-encrypted RTP, the assumption is the following. UPF can identify the PDUs of one PDU set via different ways, e.g. the RTP headers/payloads in case RTP is used, the traffic periodicity. The UPF then add marks in the GTP-U headers of DL packets to assist RAN for the PDU set identification, e.g. the start/end indication of the PDU set and PDU set ID. The identification of PDU set depends on what the PDU set represents, e.g. a video frame or a video slice.

Figure 11:
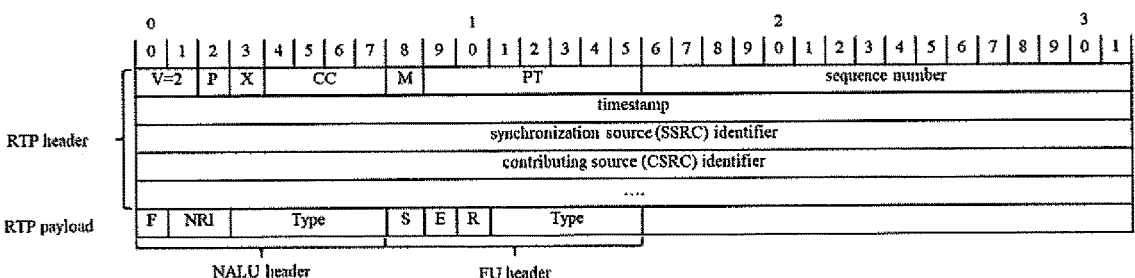
FIG. 11 illustrates an example RTP header extension format.

Set up PDU set identification and marking on UPF video frame identification: solution #12 of 23700-60 [3GPP TR 23.700-60 V2.0.0 (2022-11) 3rd Generation Partnership Project; Technical Specification Group Services and System Aspects; Study on XR (Extended Reality) and media services (Release 18)] proposed using, referring to FIG. 11 which corresponds to FIG. 6.12.3.2-2: RTP header extension format:

1) "the marking bit of RTP header for the very last packet of the frame indicated by the RTP timestamp"

2) "draft-ietf-avtext-framemarking [draft-ietf-avtext-framemarking-13, Frame Marking RTP Header Extension, Latest revision 2021-11-11], the extended RTP header format is shown as below. The "S" bit and "E" bit in the Frame Marking RTP header extension respectively represent the start and the end of a video frame. UPF can identify the start and end of a PDU set/frame according to the "S" and "E" bits".

3) "the UPF can also use the periodicity information as frame traffic pattern to identify the PDU set/frame. The traffic pattern may also be detected by UPF"

Figure 12:
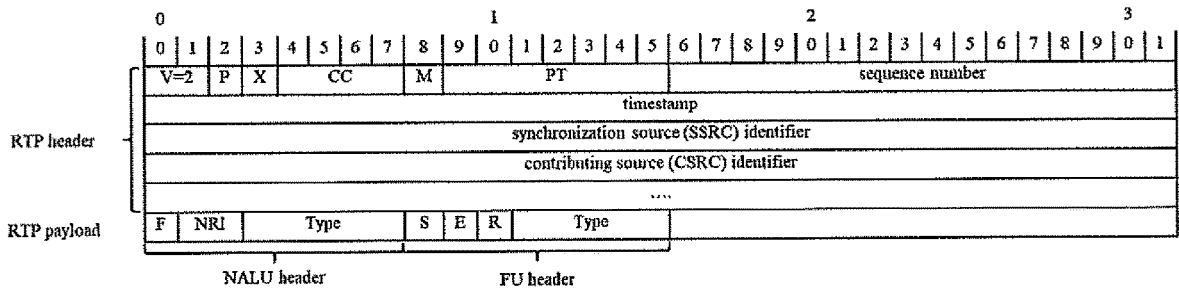
FIG. 12 illustrates an example NAL unit header format for H.264.

Video Slice identification for H264: solution #12 of 23700-60 [3GPP TR 23.700-60 V2.0.0 (2022-11) 3rd Generation Partnership Project; Technical Specification Group Services and System Aspects; Study on XR (Extended Reality) and media services (Release 18)] proposed using, referring to FIG. 12 which corresponds to FIG. 6.12.3.2-3: NAL unit header format for H.264:

1) "According to RFC 6184, within the RTP packet, the payload starts from a one-byte header structured for a Network Abstraction Layer (NAL) Unit encapsulating the slice output of encoded stream and the following is the encoded video content for one, part of or multiple video slices. The 5-bit NAL unit type in the NAL unit header can indicate the content of NAL unit, e.g. coded slice of an I frame, coded slice of a P frame. Besides, it can also indicate the possible structures of the RTP payload, e.g. single NAL unit packet, aggregation packet and fragmentation unit (FU). The NAL unit type for different RTP packet structure is shown below." NOTE: the similar approach is also being proposed for H265/H266 in 23700-60 [3GPP TR 23.700-60 V2.0.0 (2022-11) 3rd Generation Partnership Project; Technical Specification Group Services and System Aspects; Study on XR (Extended Reality) and media services (Release 18)].

Set Up PDU Set Importance/Dependency Information Identification on UPF

Solution #24 of 23700-60 [3GPP TR 23.700-60 V2.0.0 (2022-11) 3rd Generation Partnership Project; Technical Specification Group Services and System Aspects; Study on XR (Extended Reality) and media services (Release 18)] takes a slightly different approach by setting importance/dependency information of PDU set as a video frame and slice. "To support differentiated QoS handling for PDU sets in 5GS, the UPF should firstly identify the PDU sets (corresponding to a frame or video slice), then identify the importance/dependency of different PDU Set"

Figure 13:
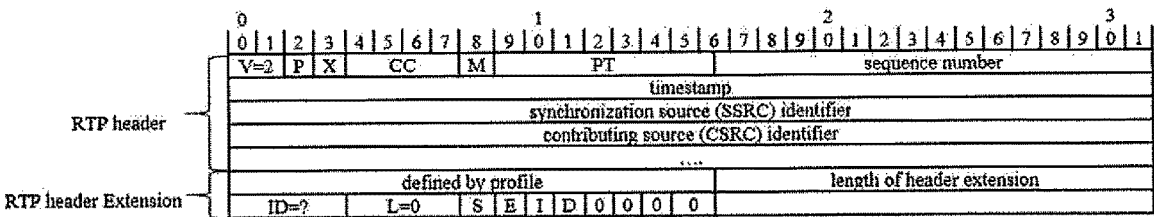
FIG. 13 is an example frame marking RTP header extension for non-scalable streams.

Video frame identification based on framemarking: In order to identify an "important" PDU set/frame for non-scalable streams, 6.24.3.2.1 of 23700-60 proposed the following, referring to FIG. 13 which corresponds to FIG. 6.24.3.2.1-1: Frame Marking RTP header extension for non-scalable streams:

"In the above RTP header extension (see clause 3.1 of draft-ietf-avtext-framemarking [draft-ietf-avtext-framemarking-13, Frame Marking RTP Header Extension, Latest revision 2021-11-11]):

The I field named as Independent Frame reflects whether a frame can be decoded independent of temporally prior frames or not. 1 means this frame can be decoded independent of temporally prior frames, e.g. intra-frame, IDR frame of H.264/H.265 or VP8/9 keyframe.

The D field named as Discardable Frame which reflects whether a frame is droppable or not. 1 means the sender knows this frame can be discarded, and still provide a decodable media stream.

UPF can based the above I field or D field to identify the important PDU Set/frame."

Figure 14:
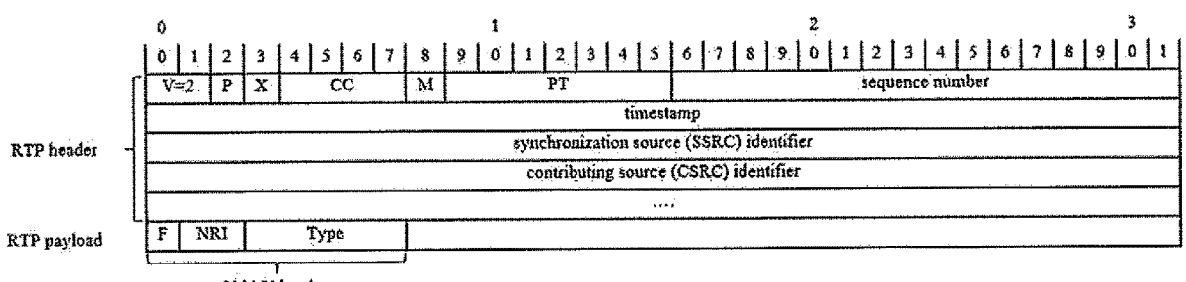
FIG. 14 is an example H.264 NAL unit header format.

Video frame identification based on H264 NAL unit header: Solution #24 also proposed to support PDU set/frame identification for H.264 based on its NAL unit header, referring to FIG. 14 which corresponds to FIG. 6.24.3.2.1-3: H.264 NAL unit header format:

"For each RTP packet, a H.264 NAL unit header is included following RTP header. For RTP payload carrying H.264 video slices, according to RFC 6184, the H.264 NAL unit header is as following:

In the NAL unit header, the NRI value indicates the relative transport priority, as determined by the encoder. According to clause 5.3 of RFC6184, a value of 00 indicates that the content of the NAL unit is not used to reconstruct reference pictures. Such NAL units can be discarded without risking the integrity of the reference. Values greater than 00 indicate that the decoding of the NAL unit is required to maintain the integrity of the reference pictures. The highest transport priority is 11, followed by 10, and then by 01; finally, 00 is the lowest.

Figure 15:
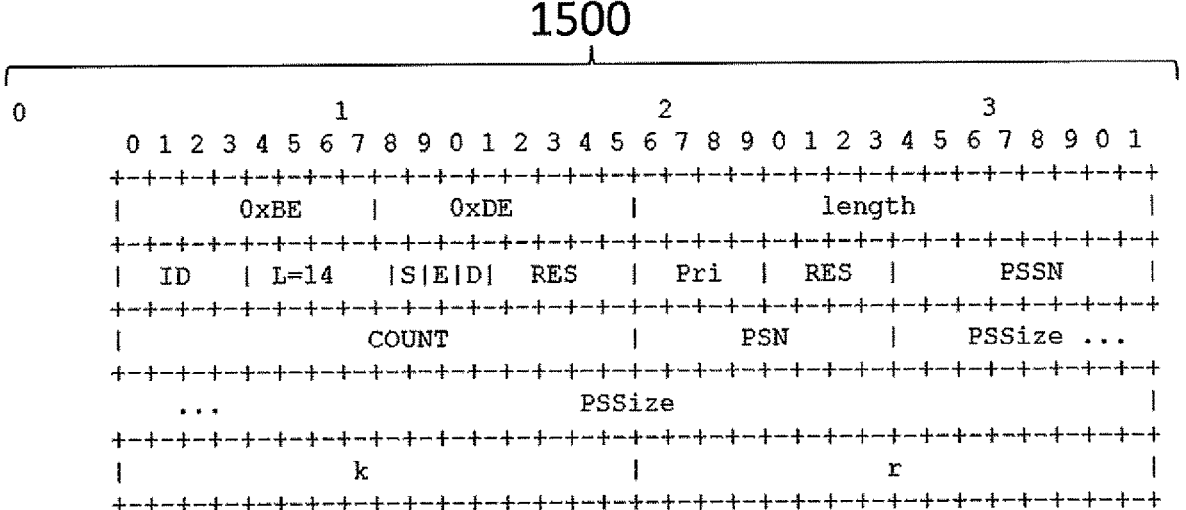
FIG. 15 is an example RTP header extension for PDU set marking.

Therefore, UPF can use the NRI value to identify the importance information of NAL unit carrying the PDU set/slice. In case the frame includes only one slice, the method can be used to detect the importance of the frame." Tdoc S4aR230009 [5G_RTP] RTP Header Extension for PDU SET Marking Referring to FIG. 15, the defined extension 1500 must follow the general mechanism for defining RTP header extensions as defined in RFC8285. It is preferable that the RTP header extension 1500 be of fixed size and the extension element for the PDU set marking be placed as the first element in the RTP header extension, to simplify their detection and processing by the UPF.

The semantics of the fields are as follows:

ID: identifier of the one-byte extension element. This identifier shall be negotiated using the SDP extmap attribute.

L: length minus one of the extension element. This value shall be set to 14.

S: this flag shall be set to one for the first PDU of the PDU set.

E: this flag shall be set to one for the last PDU of the PDU set.

D: this flag shall be sent to 1 if it is known to the sender that the PDU may be discarded without significant impact to the reconstructed media.

Pri: the priority field indicates the importance of this PDU set compared to other PDU sets within the same stream. The default value shall be 8. Lower values indicate a higher importance PDU set.

PSSN: the sequence number of the PDU set to which the current PDU belongs. This value wraps around at 255, however, using the RTP packet sequence number and PSSN pair may be used to uniquely distinguish PDU sets.

COUNT: the number of PDUs in this PDU set. The value 0 is used to indicate that the number of PDUs in this PDU set is not known.

PSN: the sequence number of the current PDU within the PDU set. A receiver shall use the RTP packet sequence number together with the PSN to detect PDU sets that contain more than 255 PDUs PSSize: the size in bytes of all PDUs of the PDU set, excluding RTP headers and header extensions, effectively conveying the size of the media data of that PDU set. If unknown, the PSSize field shall be set to 0.

k, r: If FEC is used, k and n-k shall convey the number of source and repair packets of the FEC block to which the PDU set belongs. If FEC is not used, these fields shall be set to 0. Accordingly, k corresponds to the number of source packets of the FEC block to which the PDU set belongs, and r corresponds to the number of repair packets of the FEC block to which the PDU set belongs.

It is suggested that the PDU set marking header extension registers the following extension URI with IANA: urn:3gpp:pdu-set-marking.

The solutions described above do not cover all the requirements set the SA2 group in TR 23700-60.

Solutions based on option 1 i.e., using the available fields from the RTP headers may need the network elements to maintain a context for each modality and each codec within those modalities. For example, audio and video modalities and the codecs supported for those media types, audio—EVS, AMR etc., and video—AVC, HEVC, AV1 Etc. This could increase the complexity of the network elements and may also increase the delay in processing for such cases.

Currently discussed solutions based on option 2 do not cover all the requirements set by the SA2 group for example defining dependency between PDU sets. Furthermore, priority field description in the prior work is limited. The priority field description does not provide any clear dependency or any application specific media requirements information.

Hence there is a need for designing a solution which satisfy some of the following conditions.

PDU set information needs to be agnostic of codecs.

PDU set information needs to be agnostic of the application.

The PDU set may be different for different applications even when using the same codec.

The network handling of the PDU set information should be uniform;

the application should know how each field would affect the packet handling in the network A PDU set is a unit of information generated at the application level (e.g., a frame or video slice for XRM Services, a frame for speech or audio). A PDU set is defined as being composed of one or more PDUs, where the PDUs carry the payload of unit of information. The PDU set dependency signaling may be carried using the RTP header extension(s). The examples described herein define solutions for handling PDU set dependency.

Intra Dependency—PDU Impact on Processing the Current PDU Set

In an embodiment, one or more PDUs within a PDU set may be necessary for the processing of the PDU set to which it belongs to by the receiver/UE. In an embodiment, the PDUs in a PDU set carry the information (for example as part of the RTP header extension) that can be necessary for the processing of other PDUs in a PDU set.

For example, an intra-coded picture (e.g., AVC, HEVC, VVC, etc.) or self-contained audio frames (e.g., AMR-WB, EVS, etc.) may use PDU sets dependency information.

Inter Dependency—PDU Impact on Processing Current and Subsequent PDU Set(s)

In an embodiment, one or more PDUs belonging to a PDU set may be necessary for the processing of the PDU set to which they belong to and additionally be necessary for the processing of one or more PDU sets following the current PDU set in the transmission order or the increasing PDU sequence number. Alternatively, in an embodiment, if one or more PDUs belonging to a PDU set are erroneous or discarded by the network element or missing, then the whole PDU set to which they belong becomes unusable at the receiver/UE, and can be discarded. Additionally, one or more PDU sets following the current PDU set in the transmission order or the increasing PDU sequence number becomes unusable at the receiver/UE, if there is any PDU in the current PDU set that is required for decoding the current and subsequent PDU sets. A previous inter-PDU-set-dependency flag may be used to indicate dependency of the current PDU set to the previous inter PDU set. This will enable the network element to identify all the PDU sets that depend on the earlier reference picture carrying PDU set. For example, if a PDU corresponding to reference picture is dropped leading to an incorrect reference picture, the subsequent PDU sets become unusable as well. Consequently, it would be useful to indicate which all subsequent PDU sets depend on the previous reference picture. This would work for a single RTP stream for the same PT.

In another embodiment, one or more PDUs belonging to a PDU set may be necessary for the processing of the PDU set to which they belong and additionally be necessary for the processing of one or more PDU sets preceding or following the current PDU set in the transmission order. For example, this might be relevant for H.264 B frames.

A method, an apparatus and a computer program product is defined (for example a sender user equipment) which produces PDUs comprising dependency information as described the following way: a PDU set containing one or more PDUs, wherein the one or more PDUs carry one or more dependency information, wherein the first dependency information is between one or more PDUs of a given PDU set, wherein the second dependency information is between one or more PDUs of different PDU sets.

A method, an apparatus and a computer program product is defined (for example a network element in 5G system) which takes the following PDUs comprising dependency information as input: a PDU set containing one or more PDUs, wherein the one or more PDUs carry one or more dependency information, wherein first dependency information is between one or more PDUs of a given PDU set, wherein second dependency information is between one or more PDUs of different PDU sets. The method, apparatus, and/or computer program product produce the following as output: either a PDU set containing one or more PDUs, wherein the PDUs of the output PDU set is the same as the PDUs of the input PDU set (no discarding), or wherein some of the PDUs of the input PDU set are discarded based on the dependency information (partial discarding), or the whole PDU set is discarded based on the one or more dependency information carried by the one or more PDUs of the input PDU set (full discarding).

Multi-Level Priority Information

Network elements can address resource constraints in different types of actions. This can include delaying or dropping a media packet (e.g., PDU sets). Depending on the application, media modality or service requirements, delaying or dropping a packet can have different impact on QoE (Quality of Experience). The examples described herein define solutions for handling PDU set priority information. In an embodiment, a multi-level (of different types of priorities) priority field is defined to enable graceful degradation in the network. A first level of priority is used when the network foresees packet delay (e.g., higher than the transfer delay or packet delay budget (PDB) or PDU set delay budget (PSDB) that have been set in the UE or 5G network for the session). A second level of priority is used when the network is expected to discard packets. In an embodiment, the multi-level priority information can be set by the application depending on the expected adverse impact due to delaying or dropping a PDU.

A method, an apparatus and a computer program product is defined (for example a user equipment) which produces the following PDUs comprising multilevel priority information: a PDU set containing one or more PDUs, wherein the one or more PDUs carry one or more levels of priority information, wherein the first priority information is to be used when there is a delay higher than a given threshold in the PDU delivery, wherein the second priority information is to be used when the PDU is to be discarded.

A method, an apparatus and a computer program product is defined (for example a network element in a 5G system) which takes the following PDUs comprising multilevel priority information as input: a PDU set containing one or more PDUs, wherein the one or more PDUs carry one or more levels of priority information, wherein the first priority information is to be used when there is a delay higher than a given threshold in the PDU delivery, wherein the second priority information is to be used when the PDU is to be discarded. The method, apparatus, and/or computer program product produce one of the following as output: a PDU set containing one or more PDUs is delayed in its delivery to the end receiver/UE, or a PDU set containing one or more PDUs, wherein the PDUs of the output PDU set is the same as the PDUs of the input PDU set (no discarding or delay) or wherein some of the PDUs of the input PDU set are discarded based on the priority information (partial discarding), or the whole PDU set is discarded based on the one or more priority information carried by the one or more PDUs of the input PDU set (full discarding).

In an embodiment, using multi-level priority fields can enable the application to differentiate the priority level based on packet handling. For example, some PDU/PDU sets may be at a low priority because late delivery has a lower impact on user experience but may be a part of a stream that cannot afford packet loss (e.g., metadata). On the other hand, some packets may be at a higher priority to ensure timely delivery, but when packets are being dropped, discarding them may have a lower impact (e.g., predicted picture video packets).

In another embodiment using multi-level priority fields can enable the application to differentiate the priority level based on same and other stream. For example, a first priority level indicates priority of the PDU set within the stream, and a second priority level indicates priority of the PDU set relative to the PDU sets in another stream. In yet another embodiment, using multi-level priority fields can enable the application to differentiate the priority level based on the type of handling of earlier packets/PDUs/PDU sets. For example, a priority level indicates priority when loss rate experienced by the stream is above or below a threshold and another priority level indicates priority when the number of streams in the XR experience is above or below a number.

In an implementation, the UPF or AF may indicate the type of priority levels that will be used in a multilevel priority implementation based on the packet handling supported in the network. UPFs with increased understanding of application and codecs can further share a manifest of the types of PDU sets that the UPF handles differently. For example, a UPF may indicate that instead of just defining a priority, the application indicates the category of a PDU set, e.g., I-Frame, Metadata, GDR etc.

In an embodiment, the priority bits are used in the RTP HE without any PDU set information. In this case, the UPF or any other network entity capable of packet handling, can use the priority information to decide how to handle the packet.

Further Defining the Scope of the Examples Described Herein

A unit of information generated at the application level depend on the use case of the application and the different modalities used by the application.

A PDU set is defined as being composed of one or more PDUs, where the PDUs carry the payload of unit of information. A PDU set may be identified by an ID for example PDU sequence number. The sequence number may increase from one PDU set to the next in the transmission order. The increment could be in steps of one or other positive integer values. All the PDUs carrying the same PDU set sequence number belong to the same PDU set. PDUs in a PDU set may carry the count of number of PDUs in the PDU set.

The first PDU in a PDU set may additionally carry information, for example as part of the RTP header extension. This information may be a marker bit in the RTP header extension which is set only for the first PDU in the PDU set. The last PDU in a PDU set may additionally carry information, for example as part of the RTP header extension. This information may be a marker bit in the RTP header extension which is set only for the last PDU in the PDU set.

In an example embodiment, a unit of information forming a PDU set for a video media type may be a segment with group of pictures or a video frame or a video slice or a video tile (e.g., one slice per tile) or a subpicture (as defined in VVC) or a NAL unit or an OBU unit (open bitstream units as defined in AV1) or an access unit, where an access unit may contain one or more video frames from each video layer or a unit of information mapped to a single timestamp.

In an example embodiment, a unit of information forming a PDU set for an audio media type may be an audio frame.

In an example embodiment, a unit of information forming a PDU set for the V3C case may be an atlas frame or an occupancy frame or a geometry frame or an attribute frame. In which case one or more PDUs in a PDU set could contain a spatial scalability feature such as tile of atlas data, or slice of occupancy, geometry or attribute video data.

In an example embodiment, a unit of information forming a PDU set for the V3C case may be an atlas frame, an occupancy frame, a geometry frame, an attribute frame belonging to the same temporal unit, where each component of the V3C is packed to one or more PDUs within the PDU set.

In an example embodiment, a unit of information forming a PDU set for the V3C case may be a frame consisting of one or more components (an atlas component, an occupancy component, a geometry component, an attribute component) belonging to the same temporal unit, where each component of the V3C is packed to one or more PDUs within the PDU set.

Identifying PDUs in a PDU Set

In an example use case the first PDU in the PDU set may optionally carry the value of PDU count or PDU sequence number in the PDU set information, for example as part of the RTP header extension. The PDUs following the first PDU in a PDU set may carry the PDU count in a decreasing order of the count value. For example, a PDU set has N PDUs, the first PDU carries the value of N for the PDU count and the second PDU carries the value of N−1 for the PDU count until the last PDU which carries the value of 1 for the PDU count. In an alternate example, a PDU set has N PDUs, the first PDU carries the value of N−1 for the PDU count and the second PDU carries the value of N−2 for the PDU count until the last PDU which carries the value of 0 for the PDU count.

In an example implementation the network element may identify the first and last PDUs of a given PDU set using the PDU count value.

The first PDU in a PDU set may carry information, for example as part of the RTP header extension, of the size of the PDU set in bytes. This information may be optionally present in the RTP header extension which is present only in the first PDU of the PDU set.

In an example implementation, the PDUs in a PDU set may carry the length information of the PDU headers, for example the length of the PDU set RTP header extension. In an embodiment, the length of the RTP header extension may be fixed. In an alternate example implementation, the length of the RTP header extension may be dynamic with the length varying based on the presence or absence of the optional data in the RTP header extension (HE). For the dynamic length case, the length depends on the specific fields used in the RTP HE. These can be indicated using an extension attribute in the SDP as defined in RFC 8285. The extension attribute is negotiated during SDP exchange and the length remains fixed for the duration of the session or at least until another SDP exchange takes place to change the length. In another embodiment, the length of the RTP HE is dynamic during the session and the receiver must always check the length field of the RTP HE to identify which fields are included. The fields can be defined such that a specific length always corresponds to a specific set of fields which are known to receivers and senders that support the RTP HE for PDU set information.

The dependency information between PDUs is defined in the following ways:

Intra Dependency—PDU Impact on Processing the Current PDU Set

In an embodiment, one or more PDUs within a PDU set may be necessary for the processing of the PDU set to which it belongs to by the receiver/UE. In an embodiment, the PDUs in a PDU set carry the information (for example as part of the RTP header extension) that can be necessary for the processing of other PDUs in a PDU set.

In an embodiment, if one or more PDUs in a PDU set are erroneous or discarded by the network element or missing, then the whole PDU set becomes unusable at the receiver/UE.

In an example embodiment, a video frame forms a PDU set. The video frame is an intra coded frame encoded with multiple slices. The data equivalent of a single slice is packed within a PDU, with multiple slices in multiple PDUs. If the network element discards one or more of the PDUs in this PDU set, then the receiver/UE cannot decode the whole video frame and the whole PDU set may be deemed as unusable.

In an embodiment, if the network element decides to discard a PDU which has a flag that indicates that the PDU is necessary for the processing of other PDUs in a PDU set, set to true, then it may decide to discard all the PDUs belonging to that PDU set.

In an embodiment, the first PDU of the PDU set may have information as part of a flag or bit in the RTP header extension indicating that all the PDUs of the current PDU set are necessary for the processing of the PDU set. This information may be optionally present only in the first PDU of the PDU set and not present in the remaining PDUs of the PDU set.

One or more PDUs within a PDU set may not affect the processing of the remaining PDUs in the PDU set by the receiver/UE. Consequently, when one or more PDUs in a PDU set are erroneous or discarded by the network element or missing, then the receiver/UE can still process the remaining PDUs in the PDU set or recover the PDU set.

In an example, a multi-layer access unit forms a PDU set. The video frames from different layers are encoded independently of each other. The data equivalent of a single video frame from a single layer is packed within a single PDU, with video frames from different layers in multiple PDUs. If the network element discards PDUs of the video frames of a single layer in this PDU set, then the receiver/UE can still decode the video frames from the remaining layers and the PDU set may still be recovered or usable.

In an example, a multi-layer access unit forms a PDU set. The video frames from different layers are encoded independently of each other. The data equivalent of a single video frame from multiple layers is packed within a single PDU set. If the network element discards PDUs of the video frames of a single layer in this PDU set, then the receiver UE can still decode the video frames from the remaining layers and the PDU set may still be recovered or usable.

Referring to FIG. 16A, in another example, a V3C access unit may form a PDU set 1602. Different components of the V3C access unit, i.e. atlas 1604, geometry 1606, occupancy 1608 and attribute 1610, may be packed into separate PDUs of the PDU set 1602. PDUs containing atlas data are required to make sense of the other components.

Referring to FIG. 16B, in a yet another example, a single component of a V3C access unit may be packed into a PDU set 1612. Collectively all PDUs of a PDU set constitute full representation of the access unit corresponding to the single V3C component. In this case a PDU may contain for example a tile of atlas data (1614, 1616, 1618, 1620), or a slice or sub-picture of video component data (geometry, attribute, occupancy). FIG. 16A and FIG. 16B illustrate the two concepts.

In an example, a PDU set is formed by a set of 3D points representing the physical structure of a real-world environment and their (the 3D points) associated visual feature descriptors, which together constitute a spatial map. The spatial map may be first constructed at an XR spatial description server and then sent over the network to the receiver UE. If the network element discards some of the PDUs (i.e. some of the 3D points or their associated feature descriptors), the receiver may become unable to relocalize itself and perform registration and tracking of AR objects at runtime.

The PDUs in a PDU set may carry the information (for example as part of the RTP header extension) whether they can be discardable without impacting other PDUs in that PDU set.

The information on whether a PDU can be discardable without impacting other PDUs in the PDU set or whether a PDU is necessary for the processing of other PDUs in the PDU set can be signaled either through a flag in the RTP header extension or through a priority value signaled in the RTP header extension.

Inter Dependency—PDU Impact on Processing Current and Subsequent PDU Set(s)

In an embodiment, one or more PDUs belonging to a PDU set may be necessary for the processing of the PDU set to which they belong to and additionally be necessary for the processing of one or more PDU sets following the current PDU set in the transmission order or the increasing PDU sequence number. Alternatively, in an embodiment, if one or more PDUs belonging to a PDU set are erroneous or discarded by the network element or missing, then the whole PDU set to which they belong to becomes unusable at the receiver/UE, and can be discarded. Additionally, one or more PDU sets following the current PDU set in the transmission order or the increasing PDU sequence number becomes unusable at the receiver/UE, if any PDU in the current PDU set is required for decoding the current and subsequent PDU sets.

In an example embodiment, a video frame forms a PDU set. The video frame is a coded frame encoded with multiple slices and is additionally used as reference frame for the encoding of the following video frames. The data equivalent of a single slice is packed within a PDU, with multiple slices in multiple PDUs. If the network element discards one or more of the PDUs in this PDU set, then the receiver/UE cannot decode the whole video frame and the whole PDU set may be deemed as unusable. In addition, since the current PDU set carries a video frame which is used as a reference for the encoding of other video frames in the decoding order, the discarding of the PDUs in the current PDU set make the PDUs in the following PDU set unusable, where the following PDU set carries the video frame which can be decoded only after the decoding of the video frame in the current PDU set.

In another example embodiment, if the network element decides to discard PDUs of a PDU set which carries the common atlas data of a V3C bitstream, the impact of such a behavior affect the processing of all the PDU sets following the current PDU set, as the common atlas data information is used for the decoding of all the components of a V3C bitstream. In such a case, the receiver/UE has to renegotiate the whole session which increases the delay and lowers the QoE of the user.

In an embodiment, the PDUs in a PDU set may carry the information (for example as part of the RTP header extension) whether they can be discardable without impacting other PDUs in the following PDU set. In an alternate embodiment, the PDUs in a PDU set may carry the information (for example as part of the RTP header extension) whether they can be necessary for the processing of other PDUs in the following PDU set.

In an embodiment, if the network element decides to discard a PDU which has a flag that indicates that the PDU is necessary for the processing of other PDUs in the following PDU set, set to true, then it may decide to discard all the PDUs belonging to the current PDU set and the PDUs belonging to the following PDU set.

Multi-level Priority

In an embodiment, a multi-level (of different types of priorities) priority field is defined to enable graceful degradation in the network. A first level of priority (Prio 1) is used when the network foresees packet delay (e.g., higher than the transfer delay or packet delay budget (PDB) or PDU set delay budget (PSDB) that have been set in the UE or 5G network for the session). A second level of priority (Prio 2) is used when the network intends to discard packets.

In an embodiment, using multilevel priority fields can enable the application to differentiate the priority level based on packet handling. In an example embodiment, some PDU/PDU sets may be at a low priority because late delivery has a lower impact on user experience, but may be a part of a stream that cannot afford packet loss (e.g., metadata). In another example embodiment, some packets may be at a higher priority to ensure timely delivery, but when packets are being dropped, discarding them may have a lower impact (e.g., video packets in an audio/video conference call).

Figures 17A, 17B, 17C, 17D:
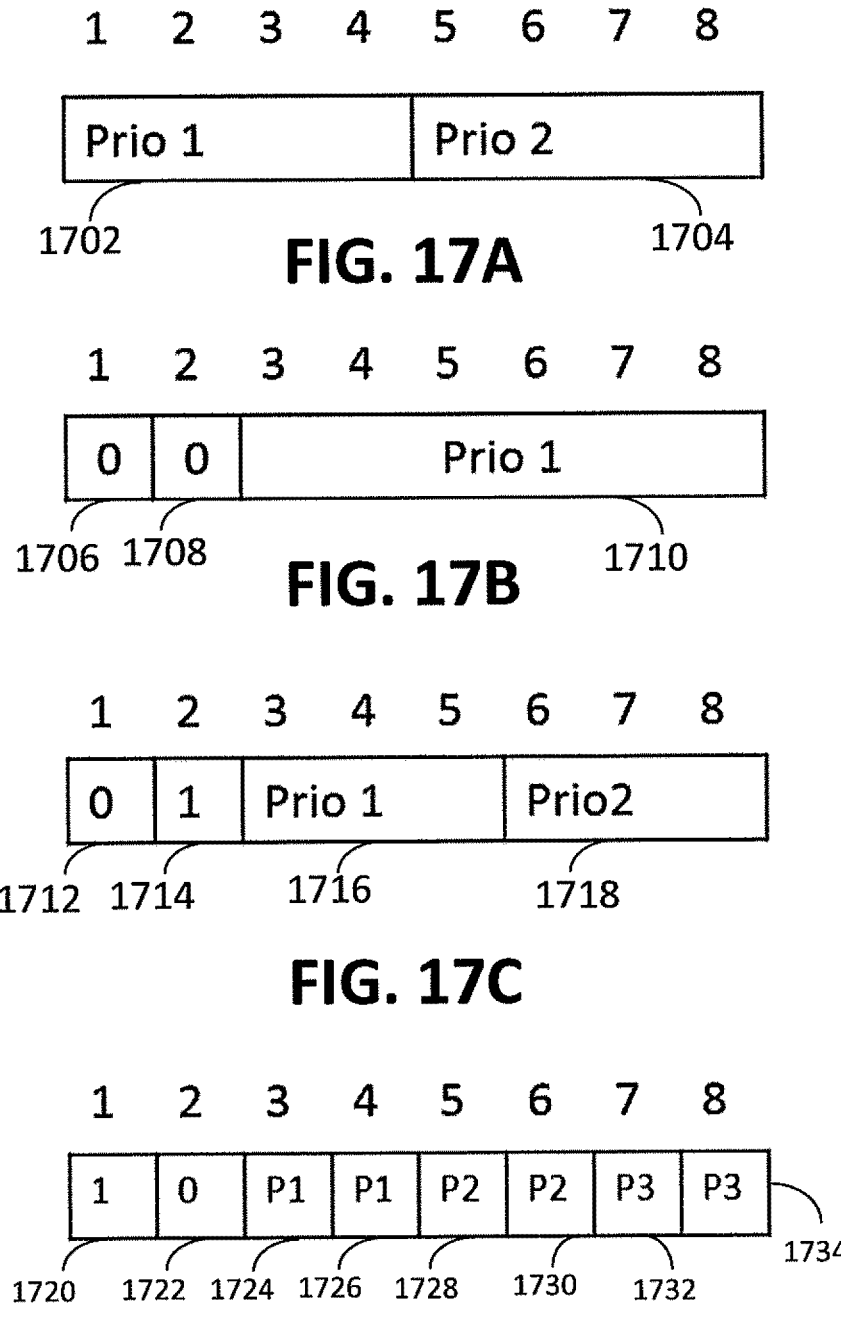
FIG. 17A shows an RTP header extension such that the first four bits indicate the first priority level and the last four bits indicate the second priority level.
FIG. 17B shows an RTP header extension with one priority field level.
FIG. 17C shows an RTP header extension with two priority field levels.
FIG. 17D shows an RTP header extension with three priority field levels.

In an implementation embodiment, multiple levels of priority are defined using one byte, for example in a RTP header extension such that the first four bits indicate the first priority level 1702 and the last four bits indicate the second priority level 1704 as shown in FIG. 17A.

In another implementation embodiment, multiple levels of priority are defined using one byte, for example in a RTP header extension such that the first two bits indicate the levels of priority fields defined. FIG. 17B, FIG. 17C and FIG. 17D show the case where 1, 2, and 3 levels are defined respectively.

In FIG. 17B, bits 1706 and 1708 indicate one level of priority 1710. In FIG. 17C, bits 1712 and 1714 indicate two levels of priority, priority 1 1716 and priority 2 1718. In FIG. 17C, bits 1720 and 1722 indicate three levels of priority, priority 1 (1724, 1726), priority 2 (1728, 1730), and priority 3 (1732, 1734).

In an embodiment, for the case of prio 2 packets, a single bit is used to indicate that the packet drop in case of delays is not performed for contiguous packets. This specifically helps in error concealment and playback timeline extension. If a burst of 5 consecutive packets is lost, the degradation is worse compared to 5 packets lost over a period of 10 packets.

Recovery Indication for PDUs in a PDU Set

In an embodiment, a recovery indicator is defined. In an embodiment, one or more PDUs in a PDU set may be indicated to be needed for recovery or not needed for recovery of the PDU set. In an embodiment, when one or more PDUs are needed for recovery of the PDU set, it is considered essential to ensure recovery from one or more PDU loss that appeared earlier.

In an embodiment a recovery indicator may additionally comprise:

Indication of a last PDU needed for recovery of the PDU set. After the last PDU, the PDU set is recovered such that a full-quality presentation can be achieved.

Indication of a first PDU needed for recovery of the PDU set. It enables to determine a start of a new recovery period.

Indication of recovery PDU counter. It enables to determine if all PDUs needed for recovery of the PDU set are received.

In an implementation embodiment, the following options are used for the recovery indicator.

In an embodiment, a recovery bit (RB) is signaled. When RB is set to 1, it indicates that the PDU is needed for recovery of the PDU set; when RB is set to 0, it indicates that PDU is not needed for recovery of the PDU set.

In an embodiment, a recovery bit and a recovery end bit is signaled. When both the recovery bit and the recovery end bit are set to 1, it indicates that this PDU is the last PDU needed for recovery of the PDU set.

In an embodiment, a recovery bit, recovery start bit, and recovery end bit is signaled. When both the recovery bit and the recovery start bit are set to 1 it indicates that this PDU is the first PDU needed for recovery of the PDU set. All the three recovery bit, recovery start bit, and recovery end bit cannot be set to 1 for a given PDU. A PDU cannot have only the recovery start bit or recovery end bit set to 1 and recovery bit set to 0.

In an embodiment, a recovery counter (N bits) is signaled. When recovery counter is set to 0, it indicates that the PDU is not needed for recovery; when recovery counter is set to 1, it indicates that this PDU is the last PDU needed for recovery; within a recovery period, the counter is decremented by 1 for each PDU needed for recovery.

In an embodiment, both the recovery bit and the recovery counter (N bits) are signaled. The recovery counter may be incremented by 1. The number of PDUs needed for recovery need not be known at the time marking the first PDU for recovery.

The following example implementation embodiment illustrates the use of the recovery indicator.

Figure 18A:
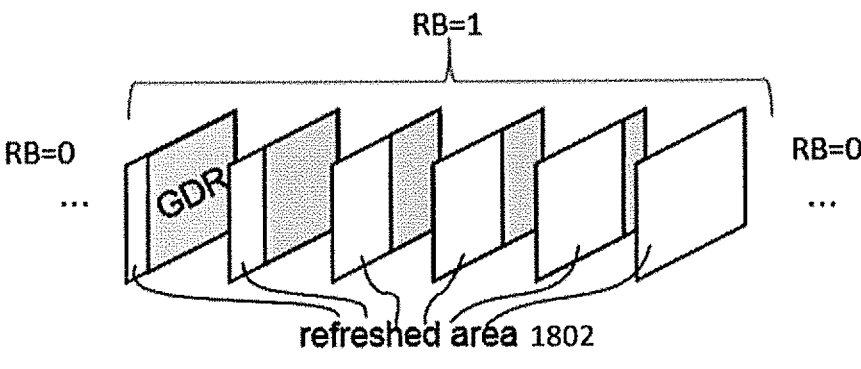
FIG. 18A provides an example scenario of gradual decoding refresh (GDR) where a video stream is refreshed gradually from left to right.

FIG. 18A provides an example scenario of gradual decoding refresh (GDR) where a video stream is refreshed gradually from left to right. Each frame including the slices belonging to the refresh area 1802 and the slices belonging to the dirty area of the GDR stream forms a PDU of the PDU set. A PDU set covers all the frames in the refresh period. The PDUs which are necessary for the GDR period are marked by setting the recovery bit (RB) to 1.

Gradual Decoding Refresh (GDR) often refers to the ability to start decoding at a picture that is not completely intra-coded and to recover decoded pictures that are correct in content after decoding a certain number of pictures. GDR, which is also known as Gradual Random Access (GRA) or Progressive Intra Refresh (PIR), alleviates the delay issue with intra coded pictures. Instead of coding an intra picture at a random access point, GDR progressively refreshes pictures by spreading intra coded regions (groups of intra coded blocks) over several pictures.

A GDR picture may be defined as a random access picture that, when used to start the decoding process, enables recovery of exactly or approximately correct decoded pictures starting from a specific picture, known as the recovery point picture. It is possible to start decoding from a GDR picture.

In some video coding formats, such as VVC, all Video Coding Layer (VCL) Network Abstraction Layer (NAL) units of a GDR picture may have a particular NAL unit type value that indicates a GDR NAL unit.

In some video coding formats, a supplemental enhancement information (SEI) message, a metadata open bitstream unit (OBU) or alike with a particular type, such as a recovery point SEI message of HEVC, may be used to indicate a GDR picture and/or a recovery point picture.

A recovery point may be indicated within a GDR picture, e.g., as a picture order count (POC) difference compared to the POC of the GDR picture. When the decoding started from the GDR picture, the decoded recovery point picture and all subsequent decoded pictures in output order are correct in content.

Pictures between the GDR picture (exclusive) and the recovery point picture (exclusive), in decoding order, may be referred to as recovering pictures. Recovering pictures may be partially correct in content, when the decoding started from the GDR picture.

It may be allowed that the recovery point picture is the same picture as the GDR picture (and consequently there are no recovering pictures). In this case, there may be pictures that follow the GDR picture in decoding order and precede the GDR picture in output order that are not correctly decodable when the decoding is started from the GDR picture.

A GDR period (also referred to as "refresh period") may be defined, depending on the context, in one of the following ways:

A GDR period includes the recovering pictures, but excludes the GDR picture and the recovery point picture.

A GDR period includes the GDR picture and the recovering pictures, but excludes the recovery point picture.

A GDR period includes the GDR picture, the recovering pictures, and the recovery point picture.

The GDR picture and the recovering pictures may be considered to have at least two regions (which may also or alternatively be called areas and/or portions), a refreshed region (a.k.a. a clean region) and an unrefreshed region (a.k.a. a dirty region). The refreshed region can be exactly or approximately correctly decoded when the decoding is started from the GDR picture, while the decoded unrefreshed region might not be correct in content when the decoding is started from the GDR picture. A GDR picture may consist of a clean region and a dirty region, where the refreshed region may be intra-coded. Inter prediction used for encoding of a refreshed region in a recovering picture may be constrained so that the refreshed region may only be inter-predicted from the refreshed region of the reference pictures within the same refresh period from the GDR picture to the recovery point picture, i.e., sample values of the unrefreshed region are not used in inter prediction of the refreshed region. Since the refreshed region in a picture may be larger than the refreshed region in the previous pictures, the intra coding may be used for the coding block locations that are newly added in the refreshed region compared to the refreshed regions of earlier pictures in the same refresh period. In some implementations, a clean region in a recovering picture may comprise a forced intra-coded area for the coding block locations that are newly added in the refreshed region compared to the refreshed regions of earlier pictures in the same refresh period, while in other implementations, rate-distortion-optimized mode selection may be applied for the newly added coding block locations too as long as inter prediction constraints discussed above are obeyed.

It needs to be understood that the GDR period may or may not comprise consecutive pictures. For example, when several temporal sublayers are in use, the GDR period may only comprise pictures in the lowest temporal sublayer, while the pictures of the GDR period may be interleaved by pictures in other temporal sublayers, in decoding and/or output order.

In an example, an encoder indicates, in or along a bitstream, either or both of: i) a first slice contains coded data of a clean area only (i.e. contains no coded data of a dirty area); ii) a second slice contains coded data of a dirty area only (i.e. contains no coded data of a clean area). In an example, the indication(s) are included in slice header(s) of the first slice and/or the second slice. In an example, the indication(s) are included in slice header(s) of the first slice and/or the second slice conditioned by the picture type or NAL unit type being indicative of a GDR picture. In an example, the first slice in a GDR picture has a NAL unit type indicative of GDR and/or the second slice in a GDR picture has a NAL unit type that is not indicative of GDR and may, for example, be of type TRAIL (trailing picture or subpicture). A picture header may indicate that the first slice and the second slice belong to a GDR picture.

In an example, an encoder indicates in or along a bitstream, such as in a supplemental enhancement information (SEI) message or in a metadata OBU, that slice-based GDR is in use. In an example, the SEI message or the metadata OBU or alike may indicate either or both of: i) a first slice contains coded data of a clean area only (i.e. contains no coded data of a dirty area); ii) a second slice contains coded data of a dirty area only (i.e. contains no coded data of a clean area). The first and/or second slices may be indicated in the SEI message or a metadata OBU or alike e.g., by a slice address syntax element with a value equal to the slice address syntax element value in the first and/or second slices, respectively.

In an example, a decoder or another entity concludes one or both of the following: i) a clean area is represented in a first slice that contains only intra-coded data and is present in a GDR picture; ii) a dirty area is represented in a second slice that contains inter-coded data and is present in a GDR picture.

In an example, a decoder or another entity concludes one or both of the following: i) a clean area is represented in a first slice that covers the slice containing the clean area in a previous picture in the GDR period (e.g., the GDR picture); ii) a dirty area is represented in a second slice that is covered by the slice containing the dirty area in a previous picture in the GDR period (e.g., the GDR picture).

In an example, a decoder or another entity decodes indications of one or both of the following: i) a clean area is represented in a first slice that is present in a GDR or recovering picture; ii) a dirty area is represented in a second slice that is present in a GDR or recovering picture. The indications may be present in or along the bitstream, e.g., in NAL unit types of the first and second slices, in slice header(s) of the first and/or second slice(s), or in an SEI message or a metadata OBU.

Figure 18B:
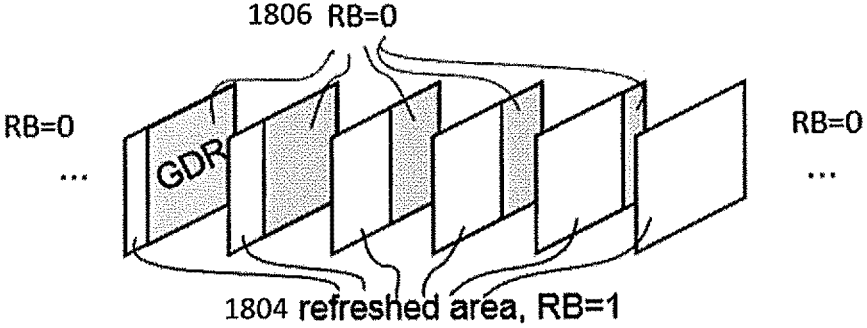
FIG. 18B provides a similar example scenario of gradual decoding refresh (GDR) where a video stream is refreshed gradually from left to right.

FIG. 18B provides a similar example scenario of gradual decoding refresh (GDR) where a video stream is refreshed gradually from left to right. However, in this case the GDR application packs the slices belonging to the refresh area 1804 and the slices belonging to the dirty area 1806 of a GDR frame in two separate PDUs, where a PDU set covers all the frames in the refresh period. In this case, the application sets the recovery bit (RB) to 0 for the PDUs belonging to the dirty area 1806 and sets the recovery bit (RB) to 1 for the PDUs belonging to the refresh area 1804. By setting the recovery bits accordingly, the PDUs containing slices in the dirty area are not necessary for the PDU set recovery for the case of GDR applications.

Figure 18C:
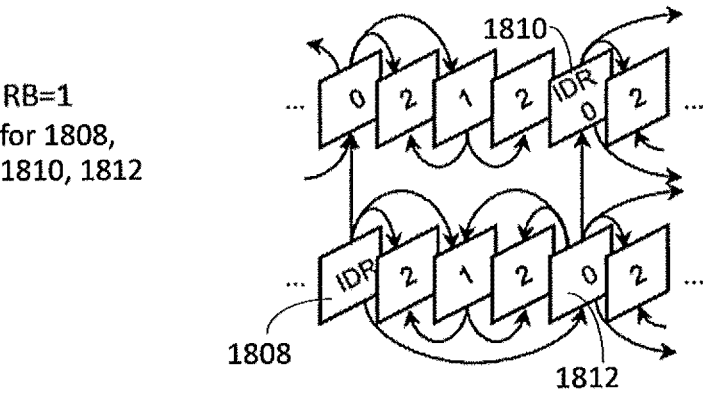
FIG. 18C provides an example scenario of multilayer scalability where non-aligned IDR frames are used.

FIG. 18C provides an example scenario of multilayer scalability where non-aligned IDR frames are used. A PDU set may contain frames from multiple layers belonging to a given time, with each PDU in a PDU set carrying the frames of a single layer. In this case, all the PDUs within the PDU set carrying the IDR frame (1808, 1810, 1812) is marked with recovery bit set to 1 indicating that the PDUs are necessary for PDU set recovery. Additionally, PDUs which carry frames used as reference to other layers are also marked by setting the recovery bit to 1.

A decoder refresh point may be defined as a bit string, packetized in one or more RTP packets, that completely resets the decoder to a known state. Examples for "hard" decoder refresh points are Instantaneous Decoding Refresh (IDR) pictures in H.264 (AVC), H.265 (HEVC) and H.266 (VVC). Pictures that follow an IDR picture in decoding order do not depend on any picture preceding the IDR picture in decoding order. An IDR picture and all pictures following the IDR picture in decoding order may be required to follow, in output order, all pictures that precede the IDR picture, in decoding order.

In another example embodiment, a clean random access (CRA) with leading frames, the PDUs containing the CRA frame and the PDUs containing the first picture following the CRA picture in both output and decoding order have recovery bit set to 1, whereas all the PDUs carrying other frames have recovery bit set to 0.

In HEVC and VVC, a CRA picture may be the first picture in the bitstream in decoding order, or may appear later in the bitstream. CRA pictures allow so-called leading pictures that follow the CRA picture in decoding order but precede it in output order. Some of the leading pictures, so-called random access skipped leading (RASL) pictures, may use pictures decoded before the CRA picture (in decoding order) as a reference. Pictures that follow a CRA picture in both decoding and output order are decodable if random access is performed at the CRA picture, and hence clean random access is achieved similarly to the clean random access functionality of an IDR picture.

RTP Header Extension with PDU Set Dependency and PDU Set Priority

The implementation of RTP header extension for signaling PDU set dependency information and PDU set priority is illustrated in FIG. 19A, FIG. 19B, and FIG. 19C.

FIG. 19A illustrates the PDU handling RTP HE comprising dependency bits 1902 and the priority bits 1904. FIG. 19B illustrates the dependency bits 1902. FIG. 19C illustrates the priority bits 1904. The details of each dependency bit (1902) are described below:

| Flag | Semantics |
|---|---|
| | The first 5 bits are reserved for future extensions |
| I | This value is set to 1 when the PDU is necessary for the processing of other PDUs in the PDU set to which it belongs. |
| F | This value is set to 1 when the PDU is necessary for the processing of some of other PDUs in other PDU sets to which it does not belong. |
| A | This value is set to 1 when the PDU is necessary for the processing of all the other PDUs in other PDU sets to which it does not belong. For example PDUs carrying sequence parameter sets or common atlas data of V3C bitstream |

In an embodiment, the fields F and A apply to PDU sets in the same RTP stream. In another embodiment, they apply to all PDU sets in the PDU session. In another embodiment, the information applies to the PDU sets associated with an application or a group of streams. A group may be identified using SDP or an ID for the group or ID of the application can be signaled using the reserved bits above.

In an embodiment of the examples described herein, the PDU handling the RTP HE comprises the dependency information and the priority information, where: the dependency information is used to judge the impact or scope of dropping or delaying of a PDU for the entire PDU set or across multiple PDU sets, and the priority information indicates the impact of action of the network in delaying or dropping a PDU. Thus this informs the network element about the impact on QOE arising from the network element action.

In an embodiment the dependency information is indicated in the PDU set marking extension header with a two bit field, such that, the value 00 indicates for the PDU that other PDUs within the PDU set are dependent on it, the value 01 indicates that other PDUs in other PDU sets are dependent on it and the value 10 indicates that other PDUs in all other PDU sets are dependent on it.

In an embodiment the dependency information and priority information are indicated using a single field such that the value in the field indicates an increasing or decreasing level of importance for the PDU set. The importance field for non-integrated handling of PDUs in PDU sets (i.e. discarding one PDU in the PDU set does not mean all PDUs in that PDU set should or can be discarded) is defined with the table below. The importance value can be used to indicate to the RAN the relative importance of different PDUs so an optimized decision for discarding PDUs and PDU sets when needed can be taken.

| Importance (Value) | Semantics: PDU is . . . |
|---|---|
| 0 | Undefined. (Field is not used) |
| 1 | Required for other PDUs in this PDU set |
| 2 | Required for other PDU sets in this stream |
| 3 | Required for all PDU sets in this stream |
| 4 | Required for other PDU sets in other streams |
| 5 | Required for all PDU sets in other streams |
| 6 | Reserved |
| 7 | Reserved |

In an embodiment, the importance value is defined such that the semantics apply to not just the PDU but the entire PDU set. Additional levels may be inserted to indicate that a PDU or PDU set is e.g., required for the PDU or PDU sets within this segment duration, or for all segments, where segment duration may be defined by a codec or application or network.

In another embodiment, the importance field may be used when the RTP stream carries multi-modal payload, e.g., audio, video, interactivity data etc. In this case the importance field (X and Y are variables below) can have additional levels to indicate relative importance of the type of payload combined with the relativity information.

| Importance (Value) | Semantics: PDU is . . . |
|---|---|
| 0 | Undefined. (Field is not used) |
| 1 | Required for other PDUs in this PDU set and belongs to payload type with QoS level X |
| 2 | Required for other PDU sets in this stream and belongs to payload type with QoS level X |
| 3 | Required for all PDU sets in this stream and belongs to payload type with QoS level X |
| 4 | Required for other PDU sets in other streams and belongs to payload type with QoS level X |
| 5 | Required for all PDU sets in other streams and belongs to payload type with QoS level X |
| 6 | Required for other PDUs in this PDU set and belongs to payload type with QoS level Y |
| 7 | Required for other PDU sets in this stream and belongs to payload type with QoS level Y |
| 8 | Required for all PDU sets in this stream and belongs to payload type with QoS level Y |
| 9 | Required for other PDU sets in other streams and belongs to payload type with QoS level Y |
| 10 | Required for all PDU sets in other streams and belongs to payload type with QoS level Y |

The details of each priority bit (1904) are described below. In this case, the priority type is indicated using a flag. PRIO in the table below can indicate that the PDU or PDU set is delay sensitive (D), and PRIO2 can indicate that the PDU or PDU set is loss sensitive (L). A UPF may use delay sensitivity to indicate to the RAN that this PDU can be delayed to optimize power consumption at the UE.

| Flag | Semantics |
|---|---|
| PRIO1 | Delay sensitive PDU set. For example, audio packets are more sensitive to delay than occasional drops. |

-continued

| Flag | Semantics |
|------|-----------|
| PRIO2 | Loss sensitive PDU set. For example, video reference picture and parameter sets (SPS, PPS, VPS) are sensitive to loss. |

The details of each priority field when a priority range is used are described below:

| Field | Semantics |
|-------|-----------|
| PRIO1 | A number indicating the priority of the packet when the network is experiencing delay. A lower value indicates higher priority, i.e., the packet should not be delayed if possible. |
| PRIO2 | A number indicating the priority of the packet when the network is experiencing loss. A lower value indicates higher priority, i.e., the packet should not be discarded if possible. |

A UPF can use the RTP timestamp to identify a PDU set. An additional field in the PDU set RTP HE can further distinguish PDU sets that have overlapping timestamps, e.g., slices in a frame, different components of a V3C bitstream etc. Since the number of slices in a frame may need up to 10 bits or more, the RTP HE may be defined to indicate whether temporally overlapping PDU sets are expected or not. To limit the size of the additional field for PDU set identification when temporally overlapping PDU sets exist, a rolling counter can be used. An extension attribute can be used in the SDP to indicate if temporally overlapping fields are used. An extension attribute may indicate the number of bits needed for PDU set identification.

The RTP HE can have a start bit that indicates that the PDU is the first in a PDU set followed by the number of PDUs remaining in the PDU set. For the first PDU in the PDU set, the start bit is set to 1, and the remaining PDU counter is set appropriately. For subsequent PDUs, the start bit is always 0 and the remaining PDU counter is decremented monotonically until it is 0 for the last PDU. This solution does not require consideration for rolling sequence numbers and contains information of first, end and remaining PDUs using a single field. In case of lost packet in the middle of the PDU set, the network is not confused.

In the RTP HE, the RTP sequence number of first and last PDUs in the PDU set can be signaled to indicate the start, end and sequence of the current PDU in the PDU set. The advantage is that no extra counters need to be implemented in the RTP sender or receiver. However, this has a large overhead and if the packet containing the RTP sequence number of the last PDU is lost, then the synchronization across PDU sets is lost and the network has to implement additional logic to guess the end of the PDU set only when a new "Start PDU" packet arrives.

In a different implementation, the RTP HE, the RTP sequence number of the first PDU in the next PDU set can be signaled. Since the RTP sequence number of the current packet is included in the RTP header, indicating the RTP sequence number of the first PDU of the next PDU set can help determine the first PDU, last PDU and sequence number of the current PDU within the PDU set. Using the same 16 bits, the RTP sequence number can accommodate PDU sets with 65535 PDUs in comparison to the 32767 PDUs using the counter+start bit approach. This may require the UPF to keep state to identify the start PDU of a PDU set. It is not clear if PDU sets would need such a high number of PDUs. Moreover, the SN of the first PDU of the next PDU set may not be known at the time of generation of the current RTP packet belonging to the current PDU set because the encoder has not yet generated the SN, since this is in the future of the bit stream.

The following <extensionattributes> can be defined in SDP for the PDU set extension element where the URI can be e.g., urn:3gpp:pdu-set-marking.

| <extensionattribute> | Semantics |
|----------------------|-----------|
| short | The PDU set marking consists of only the basic fields. |
| short-ext | The PDU set marking consists of the basic fields and the extension field for RTP timestamp to differentiate PDU sets with temporally overlapping PDU sets. This field may have further subdivision to indicate the number of bits the extension will have, e.g., short-ext-10 for a 10 bit field, or short-ext-4 for a 4 bit field. |
| short-pss | The PDU set marking basic header followed by a 32 bit field indicating the PDU set size in bytes. The PDU set size may be indicated only in the first PDU of the PDU set or in all PDUs. |
| short-ext-pss | The PDU set marking basic header followed by a timestamp extension for temporally overlapping PDU sets and a PDU set size. |

Figure 20:
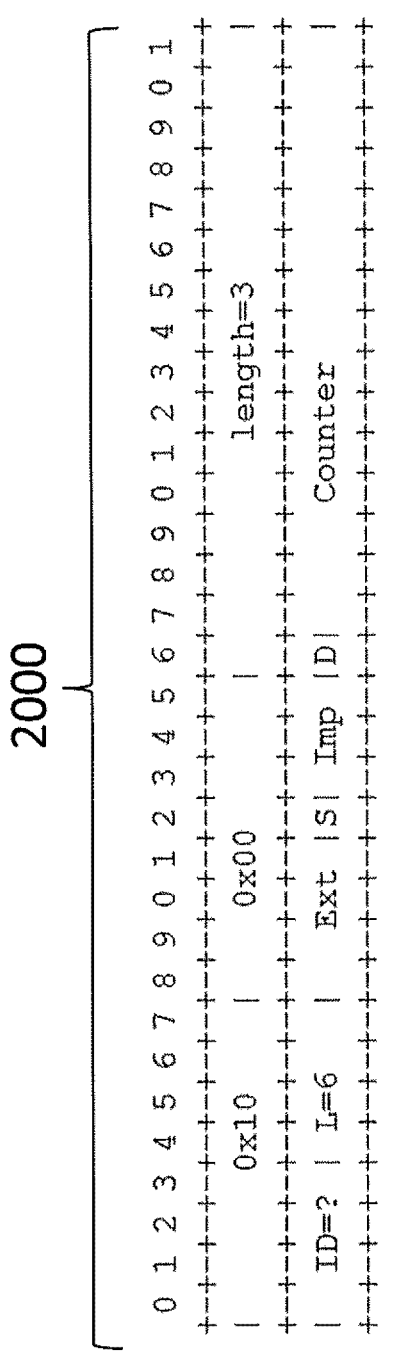
FIG. 20 depicts a one-byte header extension for a basic header (short).

An example PDU set marking extension header 2000 with only the basic fields is shown in FIG. 20. The Ext field is used for extending the timestamp, the S bit indicates that this PDU is the first PDU of the PDU set, the Imp field indicates importance or priority or dependence, the D field indicates that this PDU/PDU set is delay tolerant, and the Counter is a decrementing count of number of PDUs left in the PDU set after this one. In this example, for an extension attribute=short-ext, the Ext bits in the header will be increased.

In an embodiment, if the SDP attribute for extmap for all streams included with a group parameter have the same ID for the PDU set marking extension then the dependency, importance and priority fields as defined herein apply to all the streams in that group. For example, the dependency fields may additionally indicate dependency of PDU sets in other streams, and the priority (also multilevel priority) and importance fields indicate the relative importance of PDU sets across all streams. In another embodiment, an extension attribute is used to indicate that the PDU set dependency, importance and priority information is for all streams within a group.

In an embodiment, the SDP may indicate that the stream consists of PDU sets that require i) integrated handling, ii) non-integrated handling, or iii) both. The type of handling required for the PDU sets can be indicated using an extension attribute for PDU set handling HE's extmap. In an embodiment, the information is indicated using a field in the PDU set handling RTP header extension.

In an embodiment, the SDP can indicate if the PDU sets in the RTP stream or group of streams require i) integrated handling, ii) non-integrated handling or iii) both; the information can be indicated using an extension attribute for the PDU set marking RTP extension header. In an embodiment, the PDU set marking RTP extension header can further carry the information as a field to indicate the type of handling required for that particular PDU set.

Figure 21:
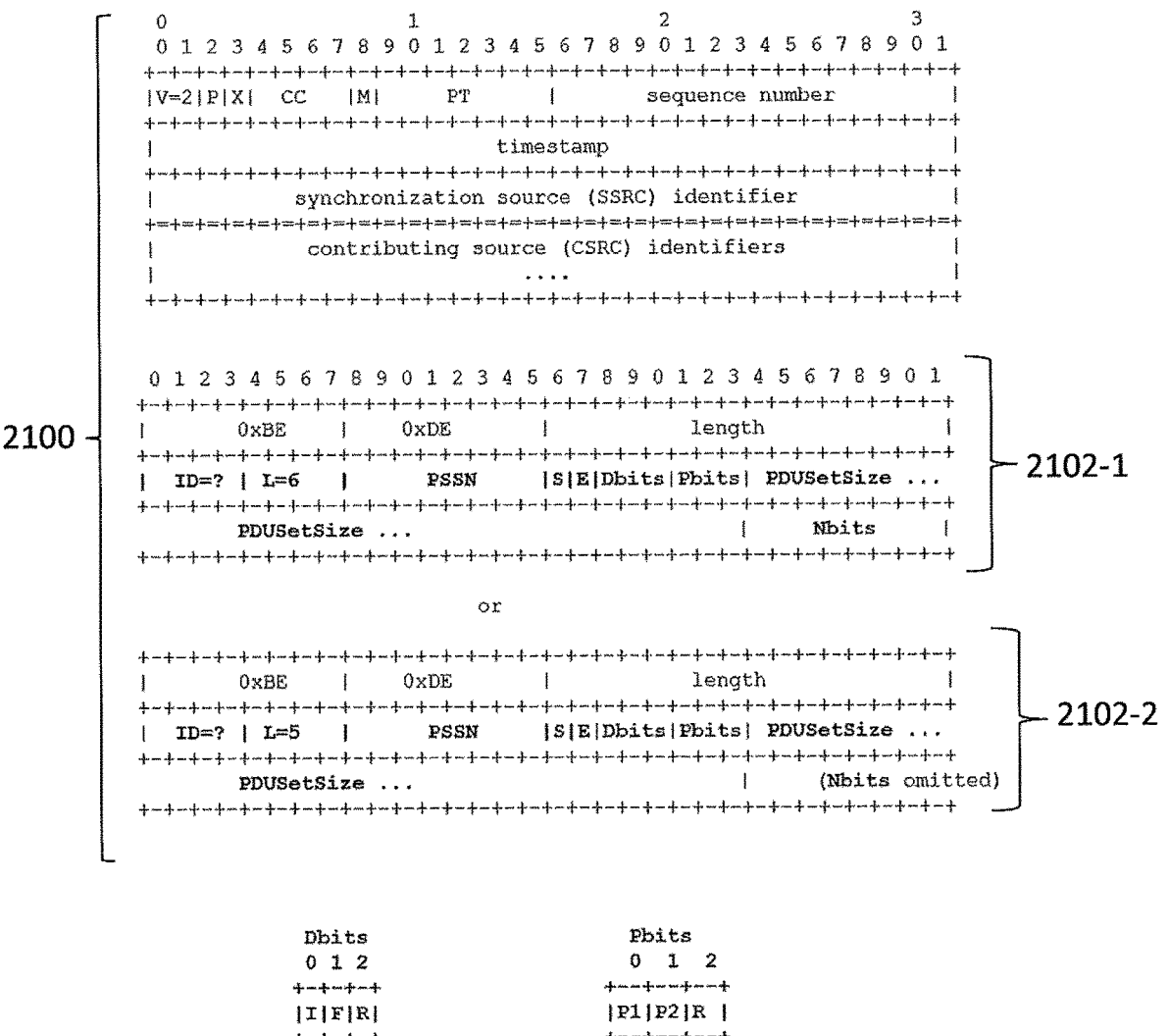
FIG. 21 shows two examples of a one-byte header extension when the extension (X) bit in the RTP header is set to 1.
Figure 22:
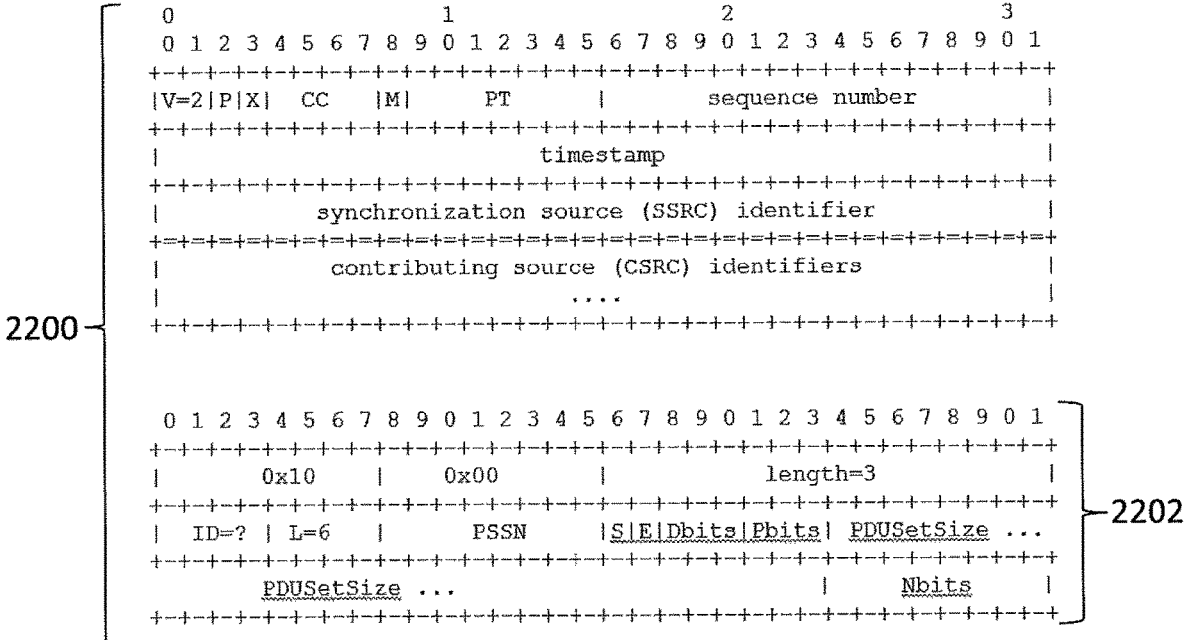
FIG. 22 depicts another example of a one-byte header extension.

In another example implementation embodiment, a RTP header extension (two types of RTP header extensions are shown, 2102-1 and 2102-2) of an RTP header 2100 for signaling PDU set dependency information and PDU set priority is illustrated in FIG. 21, and a similar RTP header extension 2202 of an RTP header 2200 is shown in FIG. 22. The RTP header extensions (2102-1, 2102-2, 2202) have the following semantics.

ID: identifier of the one-byte extension element. This identifier shall be negotiated using the SDP extmap attribute. In another embodiment, a value for ID is fixed, and the value cannot be negotiated with a network element using SDP. Different ID values may be used for identifying a H.264 RTP header extension versus this extension when both the extensions are present in the RTP packet.

L: length minus one of the extension element. This value may be set to 14. 15 bytes of data may not be needed. In FIG. 22, L is set to 6.

PSSN corresponds to position rearranged: the sequence number of the PDU set to which the current PDU belongs. This value wraps around at 255, however, using the RTP packet sequence number and PSSN pair may be used to uniquely distinguish PDU sets. More bits may be used for signalling the PSSN.

S: this flag shall be set to one for the first PDU of the PDU set.

E: this flag shall be set to one for the last PDU of the PDU set.

Dbits: this field indicates the discardability or retainablity of the current PDU.

Pbits: this field indicates the priority of the PDU when the network experiences a delay or loss of packets.

PSSize corresponds to PDUSetSize: the size in bytes of all PDUs of the PDU set, excluding RTP headers and header extensions, effectively conveying the size of the media data of that PDU Set. If unknown, the PSSize field shall be set to 0. In an embodiment, PDUSetSize is an optional field, to be present only when S bit is set 1. If not optional then it should be set to 0 for all other PDUs of the PDU set. Alternatively the PSSize may indicate the number of bytes still to come in the PDU set in which case PSSize will indicate the remaining bytes of the PDU set. In an embodiment, the size of the PSSize field is 3 bytes (range is 0 to 16,777,215) or 4 bytes (range is 0 to 4,294,967,295). If the PSSize field is fixed then the semantics can vary based on the setting of the bits (S) and (E) above. When S=1 then the PSSize field gives the PDUSetSize. When S=0 then the PSSize field gives the count of PDUs to come in the current PDU Set. In this case there is no need of having E bit as the count value gives the remaining PDU count and then for the last PDU in the PDU set the value will be 0. If the field E is kept then when E=1 then the PSSize field shall be set to 0 or any value of this field should be ignored. Thus, PSSize is the same set of bytes that either represents the PDU set size in bytes (when S=1) or the number of PDUs remaining in the current PDU set (when S=0).

Nbits: this is a one byte field and the bits of this field is set by the network element based on the analysis of the RTP packet and/or payload. The default value of this field is zero. This field may be optionally present in the RTP header extension. The presence or absence of this field is based on the value of the L field.

The solution(s) offered by the examples described herein provide the following advantages and technical effects: 1) the solution is media and codec agnostic, 2) the solution is agnostic of the application and use cases, and 3) the solution allows for uniform handling of the PDU set information by the network.

Figure 23:
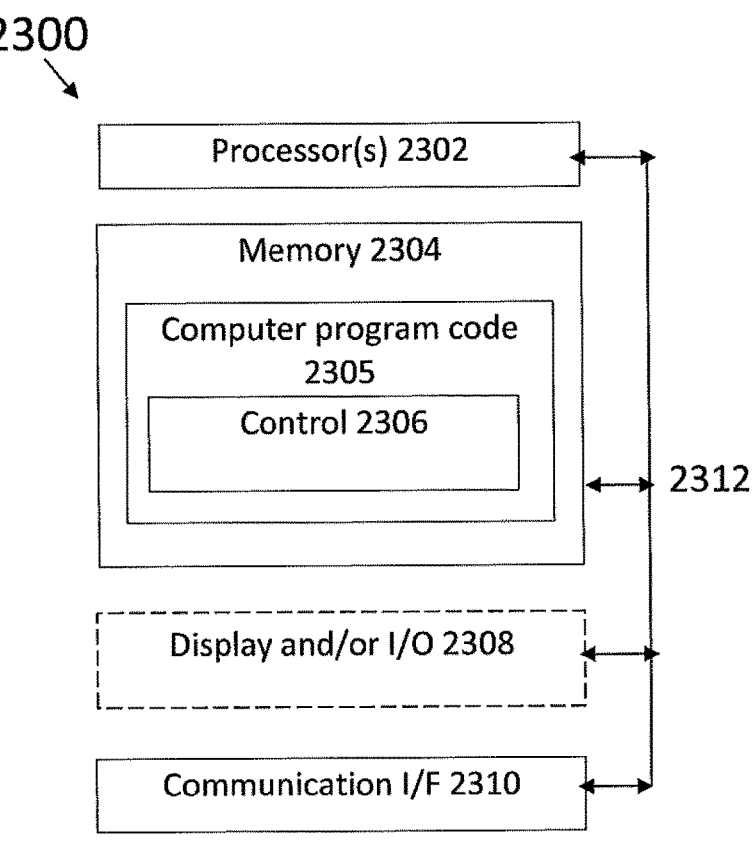
FIG. 23 is an example apparatus configured to implement the examples described herein.

FIG. 23 is an example apparatus 2300, which may be implemented in hardware, configured to implement the examples described herein. The apparatus 2300 comprises at least one processor 2302 (e.g. an FPGA and/or CPU), at least one memory 2304 including computer program code 2305, the computer program code 2305 having instructions, wherein the at least one memory 2304 and the computer program code 2305 are configured to, with the at least one processor 2302, cause the apparatus 2300 to implement circuitry, a process, component, module, or function (collectively control 2306) to implement the examples described herein, including a method, apparatus, and computer program product for PDUs and PDU set handling. The memory 2304 may be a non-transitory memory, a transitory memory, a volatile memory (e.g. RAM), or a non-volatile memory (e.g. ROM).

The apparatus 2300 optionally includes a display and/or I/O interface 2308 that may be used to display aspects or a status of the methods described herein (e.g., as one of the methods is being performed or at a subsequent time), or to receive input from a user such as with using a keypad, camera, touchscreen, touch area, receive area, microphone, biometric recognition, one or more sensors, etc. The apparatus 2300 includes one or more communication e.g. network (N/W) interfaces (I/F(s)) 2310. The communication I/F(s) 2310 may be wired and/or wireless and communicate over the Internet/other network(s) via any communication technique. The communication I/F(s) 2310 may comprise one or more transmitters and one or more receivers. The communication I/F(s) 2310 may comprise standard well-known components such as an amplifier, filter, frequency-converter, (de)modulator, and encoder/decoder circuitries and one or more antennas.

The apparatus 2300 to implement the functionality of control 2306 may be UE 110, RAN node 170 (e.g. gNB), or network element(s) 190. Thus, processor 2302 may correspond to processor(s) 120, processor(s) 152 and/or processor(s) 175, memory 2304 may correspond to memory(ies) 125, memory(ies) 155 and/or memory(ies) 171, computer program code 2305 may correspond to computer program code 123, module 140-1, module 140-2, and/or computer program code 153, module 150-1, module 150-2, and/or computer program code 173, and communication I/F(s) 2310 may correspond to transceiver 130, antenna(s) 128, transceiver 160, antenna(s) 158, N/W I/F(s) 161, and/or N/W I/F(s) 180. Alternatively, apparatus 2300 may not correspond to either of UE 110, RAN node 170, or network element(s) 190, as apparatus 2300 may be part of a self-organizing/optimizing network (SON) node, such as in a cloud. Apparatus 2300 may also correspond to any of UPF 810, SMF 812, PCT 814, or AF 816.

The apparatus 2300 may also be distributed throughout the network (e.g. 100) including within and between apparatus 2300 and any network element (such as a network control element (NCE) 190 and/or the RAN node 170 and/or the UE 110).

Interface 2312 enables data communication between the various items of apparatus 2300, as shown in FIG. 23. For example, the interface 2312 may be one or more buses such as address, data, or control buses, and may include any interconnection mechanism, such as a series of lines on a motherboard or integrated circuit, fiber optics or other optical communication equipment, and the like. Computer program code (e.g. instructions) 2305, including control

2306 may comprise object-oriented software configured to pass data or messages between objects within computer program code 2305. The apparatus 2300 need not comprise each of the features mentioned, or may comprise other features as well.

Figure 24:
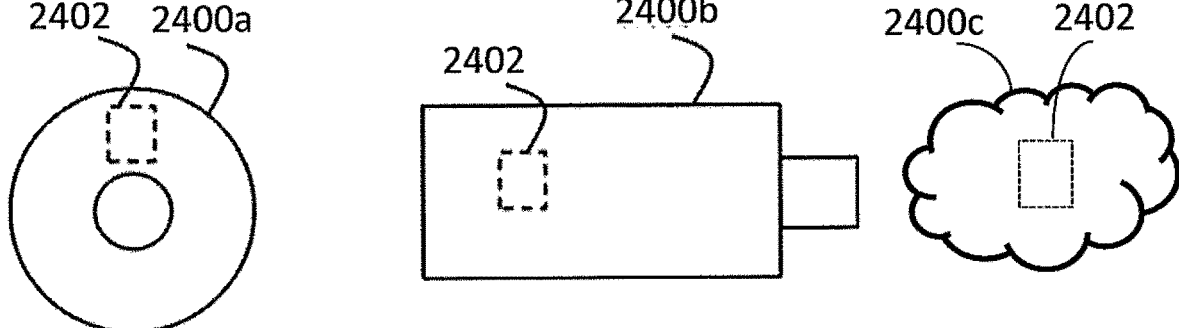
FIG. 24 shows a representation of an example of non-volatile memory media.

FIG. 24 shows a schematic representation of non-volatile memory media 2400*a* (e.g. computer/compact disc (CD) or digital versatile disc (DVD)) and 2400*b* (e.g. universal serial bus (USB) memory stick) and 2400*c* (e.g. cloud storage for downloading instructions and/or parameters 2402 or receiving emailed instructions and/or parameters 2402) storing instructions and/or parameters 2402 which when executed by a processor allows the processor to perform one or more of the steps of the methods described herein. Instructions and/or parameters 2402 may represent a non-transitory computer readable medium.

FIG. 25 is an example method 2500 to implement the example embodiments described herein. At 2510, the method includes producing a protocol data unit set containing one or more protocol data units. At 2520, the method includes wherein the one or more protocol data units carry one or more dependency information. At 2530, the method includes wherein the one or more dependency information comprises first dependency information between one or more protocol data units of a given protocol data unit set. At 2540, the method includes wherein the one or more dependency information comprises second dependency information, wherein the second dependency information is between one or more protocol data units of different protocol data unit sets of the same stream, and wherein the second dependency information is between one or more protocol data units of different protocol data unit sets of another stream. At 2550, the method includes encoding the protocol data unit set into or along a bitstream. Method 2500 may be performed with a sender apparatus, such as UE 110, peer 214-1, peer 214-2, apparatus 2300, or transmitting apparatus 2980.

FIG. 26 is an example method 2600 to implement the example embodiments described herein. At 2610, the method includes receiving as input a protocol data unit set containing one or more protocol data units. At 2620, the method includes wherein the one or more protocol data units carry one or more dependency information. At 2630, the method includes wherein the one or more dependency information comprises first dependency information between one or more protocol data units of a given protocol data unit set. At 2640, the method includes wherein the one or more dependency information comprises second dependency information, wherein the second dependency information is between one or more protocol data units of different protocol data unit sets of the same stream, and wherein the second dependency information is between one or more protocol data units of different protocol data unit sets of another stream. At 2650, the method includes producing as output cither: an output protocol data unit set containing one or more protocol data units, or a full discarding of the input protocol data unit set, based on the one or more dependency information carried by the one or more protocol data units of the input protocol data unit set. Method 2600 may be performed with a receiver apparatus, such as UE 110, peer 214-1, peer 214-2, apparatus 2300, or receiving apparatus 2982.

FIG. 27 is an example method 2700 to implement the example embodiments described herein. At 2710, the method includes producing a protocol data unit set containing one or more protocol data units. At 2720, the method includes wherein the one or more protocol data units carry one or more levels of priority information. At 2730, the method includes wherein the one or more levels of priority information comprises first priority information that is to be used when there is a delay in delivery of the protocol data unit set, and when the delay is higher than a threshold. At 2740, the method includes wherein the one or more levels of priority information comprises second priority information that is to be used when the protocol data unit set is to be discarded. At 2750, the method includes encoding the protocol data unit set into or along a bitstream. Method 2700 may be performed with a sender apparatus, such as UE 110, peer 214-1, peer 214-2, apparatus 2300, or transmitting apparatus 2980.

FIG. 28 is an example method 2800 to implement the example embodiments described herein. At 2810, the method includes receiving as input a protocol data unit set containing one or more protocol data units. At 2820, the method includes wherein the one or more protocol data units carry one or more levels of priority information. At 2830, the method includes wherein the one or more levels of priority information comprises first priority information that is to be used when there is a delay in delivery of the protocol data unit set, and when the delay is higher than a threshold. At 2840, the method includes wherein the one or more levels of priority information comprises second priority information that is to be used when the protocol data unit set is to be discarded. At 2850, the method includes producing as output either: an output protocol data unit set containing one or more protocol data units delayed in delivery to an end receiver or user equipment, or an output protocol data unit set containing one or more protocol data units, or a full discarding of the input protocol data unit set, based on the one or more priority information carried by the one or more protocol data units of the input protocol data unit set. Method 2800 may be performed with a receiver apparatus, such as UE 110, peer 214-1, peer 214-2, apparatus 2300, or receiving apparatus 2982.

Figure 29:
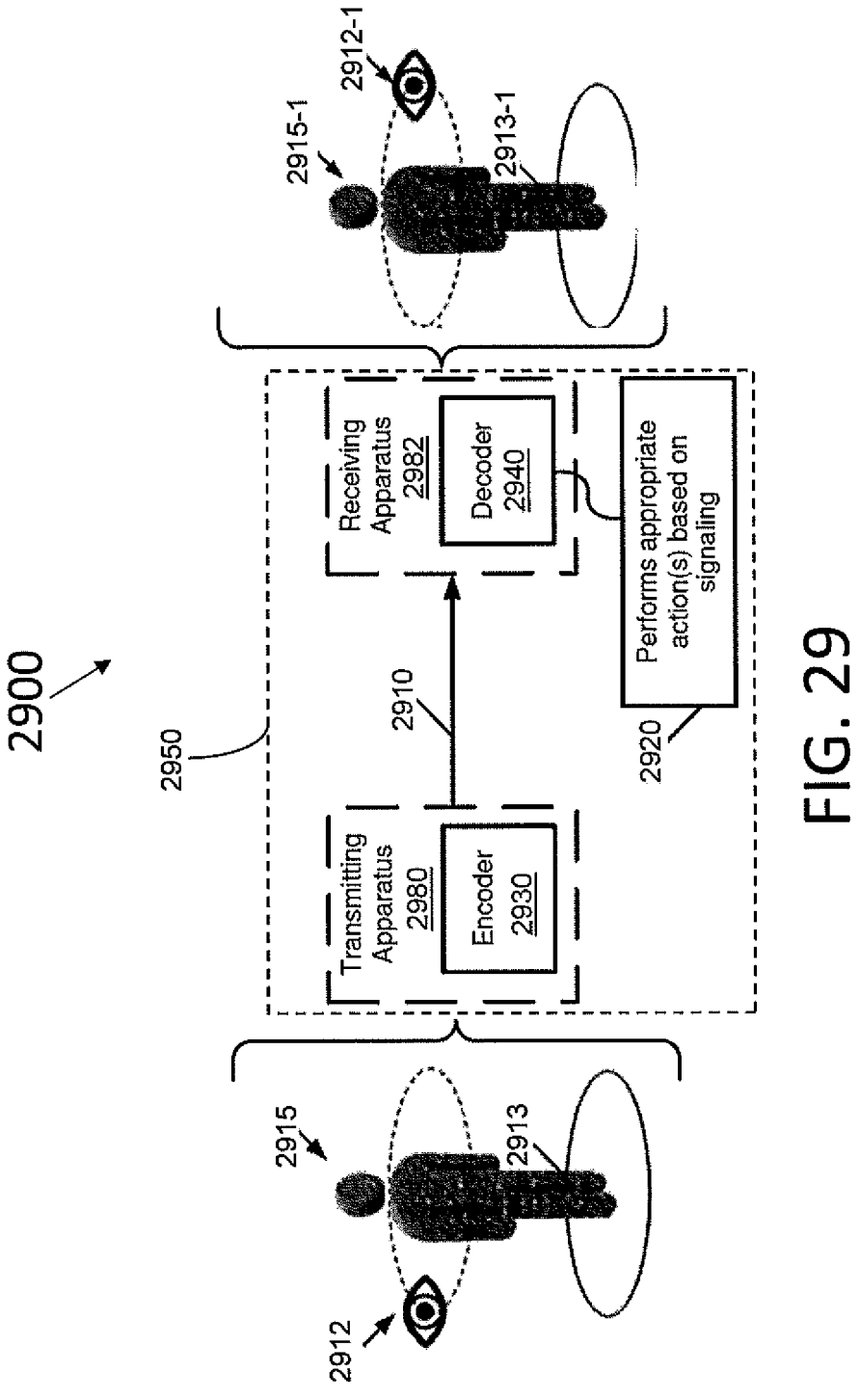
FIG. 29 is a block diagram illustrating a system in accordance with an example.

FIG. 29 is a block diagram illustrating a system 2900 in accordance with an example. In the example, the encoder 2930 is used to encode video from the scene 2915, and the encoder 2930 is implemented in a transmitting apparatus 2980. The encoder 2930 produces a bitstream 2910 comprising signaling that is received by the receiving apparatus 2982, which implements a decoder 2940. The encoder 2930 sends the bitstream 2910 that comprises the herein described signaling. The decoder 2940 forms the video for the scene 2915-1, and the receiving apparatus 2982 would present this to the user, e.g., via a smartphone, television, or projector among many other options.

In some examples, the transmitting apparatus 2980 and the receiving apparatus 2982 are at least partially within a common apparatus, and for example are located within a common housing 2950. In other examples the transmitting apparatus 2980 and the receiving apparatus 2982 are at least partially not within a common apparatus and have at least partially different housings. Therefore in some examples, the encoder 2930 and the decoder 2940 are at least partially within a common apparatus, and for example are located within a common housing 2950. For example the common apparatus comprising the encoder 2930 and decoder 2940 implements a codec. In other examples the encoder 2930 and the decoder 2940 are at least partially not within a common apparatus and have at least partially different housings, but when together still implement a codec.

3D media from the capture (e.g., volumetric capture) at a viewpoint 2912 of the scene 2915, which includes a person 2913) is converted via projection to a series of 2D representations with occupancy, geometry, and attributes. Additional atlas information is also included in the bitstream to enable inverse reconstruction. For decoding, the received bitstream 2910 is separated into its components with atlas information; occupancy, geometry, and attribute 2D representations. A 3D reconstruction is performed to reconstruct the scene 2915-1 created looking at the viewpoint 2912-1 with a "reconstructed" person 2913-1. The "-1" are used to indicate that these are reconstructions of the original. As indicated at 2920, the decoder 2940 performs an action or actions based on the received signaling.

Figure 30:
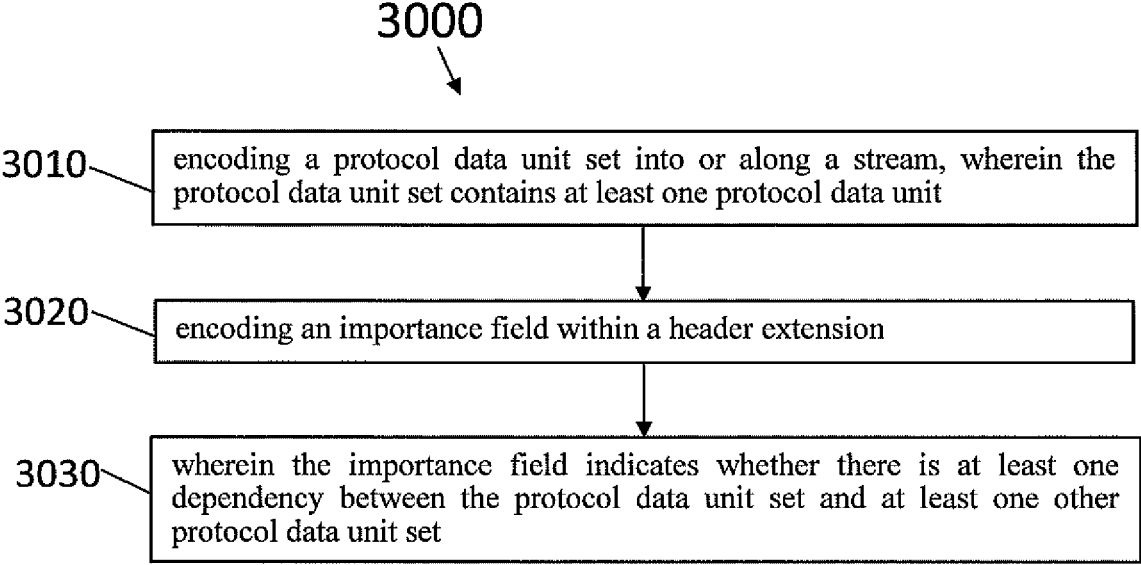
FIG. 30 is an example method implementing the examples described herein.

FIG. 30 is an example method 3000 implementing the examples described herein. At 3010, the method includes encoding a protocol data unit set into or along a stream, wherein the protocol data unit set contains at least one protocol data unit. At 3020, the method includes encoding an importance field within a header extension. At 3030, the method includes wherein the importance field indicates whether there is at least one dependency between the protocol data unit set and at least one other protocol data unit set. Method 3000 may be performed with UE 110, peer 214-1, peer 214-2, apparatus 2300, or transmitting apparatus 2980.

Figure 31:
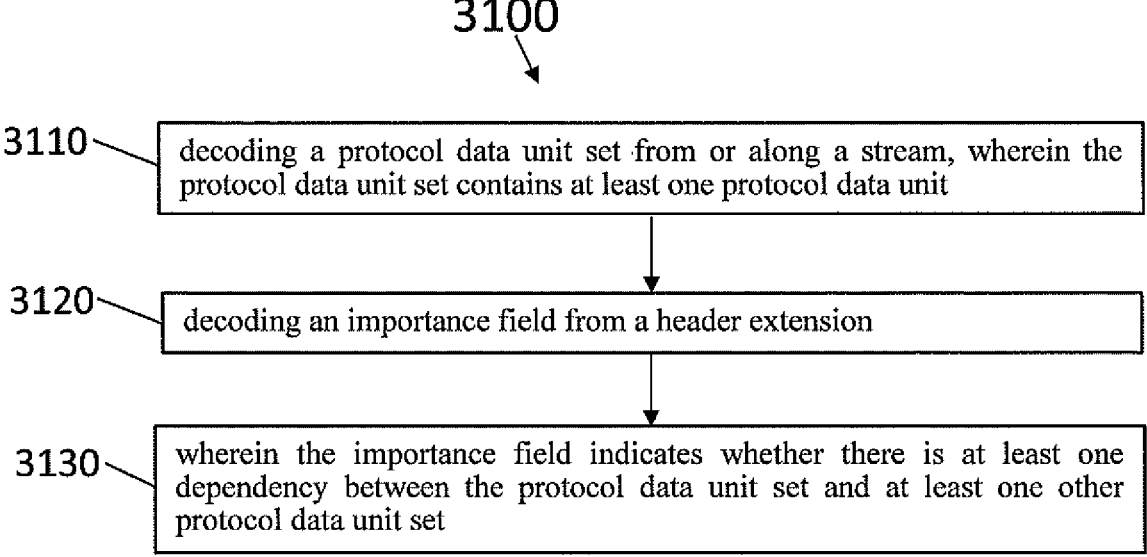
FIG. 31 is an example method implementing the examples described herein.

FIG. 31 is an example method 3100 implementing the examples described herein. At 3100, the method includes decoding a protocol data unit set from or along a stream, wherein the protocol data unit set contains at least one protocol data unit. At 3110, the method includes decoding an importance field from a header extension. At 3120, the method includes wherein the importance field indicates whether there is at least one dependency between the protocol data unit set and at least one other protocol data unit set. Method 3100 may be performed with UE 110, peer 214-1, peer 214-2, apparatus 2300, or receiving apparatus 2982.

The following examples are provided and described herein.

Example 1. An apparatus includes: at least one processor; and at least one memory storing instructions that, when executed by the at least one processor, cause the apparatus at least to: produce a protocol data unit set containing one or more protocol data units; wherein the one or more protocol data units carry one or more dependency information; wherein the one or more dependency information comprises first dependency information between one or more protocol data units of a given protocol data unit set; wherein the one or more dependency information comprises second dependency information, wherein the second dependency information is between one or more protocol data units of different protocol data unit sets of the same stream, and wherein the second dependency information is between one or more protocol data units of different protocol data unit sets of another stream; and encode the protocol data unit set into or along a bitstream.

Example 2. The apparatus of example 1, wherein the apparatus comprises a user equipment.

Example 3. An apparatus includes: at least one processor; and at least one memory storing instructions that, when executed by the at least one processor, cause the apparatus at least to: receive as input a protocol data unit set containing one or more protocol data units; wherein the one or more protocol data units carry one or more dependency information; wherein the one or more dependency information comprises first dependency information between one or more protocol data units of a given protocol data unit set; wherein the one or more dependency information comprises second dependency information, wherein the second dependency information is between one or more protocol data units of different protocol data unit sets of the same stream, and wherein the second dependency information is between one or more protocol data units of different protocol data unit sets of another stream; and produce as output either: an output protocol data unit set containing one or more protocol data units, or a full discarding of the input protocol data unit set, based on the one or more dependency information carried by the one or more protocol data units of the input protocol data unit set.

Example 4. The apparatus of example 3, wherein without discarding, the one or more protocol data units of the output protocol data unit set is the same as the one or more protocol data units of the input protocol data unit set.

Example 5. The apparatus of any of examples 3 to 4, wherein with partial discarding, at least one of one or more protocol data units of the input protocol data unit set are discarded based on the dependency information.

Example 6. The apparatus of any of examples 3 to 5, wherein the apparatus comprises a network element within a wireless communication system.

Example 7. An apparatus includes: at least one processor; and at least one memory storing instructions that, when executed by the at least one processor, cause the apparatus at least to: produce a protocol data unit set containing one or more protocol data units; wherein the one or more protocol data units carry one or more levels of priority information; wherein the one or more levels of priority information comprises first priority information that is to be used when there is a delay in delivery of the protocol data unit set, and when the delay is higher than a threshold; wherein the one or more levels of priority information comprises second priority information that is to be used when the protocol data unit set is to be discarded; and encode the protocol data unit set into or along a bitstream.

Example 8. The apparatus of example 7, wherein the apparatus comprises a user equipment.

Example 9. The apparatus of any of examples 7 to 8, wherein at least one of the one or more protocol data units are at a relatively lower priority than at least one other of the one or more protocol data units due to late delivery of the at least one of the one or more protocol data units having a relatively lower impact on user experience.

Example 10. The apparatus of example 9, wherein the at least one of the one or more protocol data units at the relatively lower priority are part of a stream prioritized to avoid packet loss.

Example 11. The apparatus of example 10, wherein the at least one of the one or more protocol data units at the relatively lower priority comprise metadata.

Example 12. The apparatus of any of examples 7 to 11, wherein at least one of the one or more protocol data units are at a relatively higher priority than at least one other of the one or more protocol data units to prioritize timely delivery.

Example 13. The apparatus of example 12, wherein discarding the at least one of the one or more protocol data units are at the relatively higher priority has a lower impact.

Example 14. The apparatus of example 13, wherein the at least one of the one or more protocol data units at the relatively higher priority comprise video packets.

Example 15. An apparatus includes: at least one processor; and at least one memory storing instructions that, when executed by the at least one processor, cause the apparatus at least to: receive as input a protocol data unit set containing one or more protocol data units; wherein the one or more protocol data units carry one or more levels of priority information; wherein the one or more levels of priority information comprises first priority information that is to be used when there is a delay in delivery of the protocol data unit set, and when the delay is higher than a threshold; wherein the one or more levels of priority information comprises second priority information that is to be used when the protocol data unit set is to be discarded; and produce as output either: an output protocol data unit set containing one or more protocol data units delayed in delivery to an end receiver or user equipment, or an output protocol data unit set containing one or more protocol data units, or a full discarding of the input protocol data unit set, based on the one or more priority information carried by the one or more protocol data units of the input protocol data unit set.

Example 16. The apparatus of example 15, wherein without discarding or without delay, the one or more protocol data units of the output protocol data unit set is the same as the one or more protocol data units of the input protocol data unit set.

Example 17. The apparatus of any of examples 15 to 16, wherein with partial discarding, at least one of one or more protocol data units of the input protocol data unit set are discarded based on the priority information.

Example 18. The apparatus of any of examples 15 to 17, wherein the apparatus comprises a network element within a wireless communication system.

Example 19. The apparatus of any of examples 15 to 18, wherein at least one of the one or more protocol data units are at a relatively lower priority than at least one other of the one or more protocol data units due to late delivery of the at least one of the one or more protocol data units having a relatively lower impact on user experience.

Example 20. The apparatus of example 19, wherein the at least one of the one or more protocol data units at the relatively lower priority are part of a stream prioritized to avoid packet loss.

Example 21. The apparatus of example 20, wherein the at least one of the one or more protocol data units at the relatively lower priority comprise metadata.

Example 22. The apparatus of any of examples 15 to 21, wherein at least one of the one or more protocol data units are at a relatively higher priority than at least one other of the one or more protocol data units to prioritize timely delivery.

Example 23. The apparatus of example 22, wherein discarding the at least one of the one or more protocol data units are at the relatively higher priority has a lower impact.

Example 24. The apparatus of example 23, wherein the at least one of the one or more protocol data units at the relatively higher priority comprise video packets.

Example 25. A method includes: producing a protocol data unit set containing one or more protocol data units; wherein the one or more protocol data units carry one or more dependency information; wherein the one or more dependency information comprises first dependency information between one or more protocol data units of a given protocol data unit set; wherein the one or more dependency information comprises second dependency information, wherein the second dependency information is between one or more protocol data units of different protocol data unit sets of the same stream, and wherein the second dependency information is between one or more protocol data units of different protocol data unit sets of another stream; and encoding the protocol data unit set into or along a bitstream.

Example 26. A method includes: receiving as input a protocol data unit set containing one or more protocol data units; wherein the one or more protocol data units carry one or more dependency information; wherein the one or more dependency information comprises first dependency information between one or more protocol data units of a given protocol data unit set; wherein the one or more dependency information comprises second dependency information, wherein the second dependency information is between one or more protocol data units of different protocol data unit sets of the same stream, and wherein the second dependency information is between one or more protocol data units of different protocol data unit sets of another stream; and producing as output either: an output protocol data unit set containing one or more protocol data units, or a full discarding of the input protocol data unit set, based on the one or more dependency information carried by the one or more protocol data units of the input protocol data unit set.

Example 27. A method includes: producing a protocol data unit set containing one or more protocol data units; wherein the one or more protocol data units carry one or more levels of priority information; wherein the one or more levels of priority information comprises first priority information that is to be used when there is a delay in delivery of the protocol data unit set, and when the delay is higher than a threshold; wherein the one or more levels of priority information comprises second priority information that is to be used when the protocol data unit set is to be discarded; and encoding the protocol data unit set into or along a bitstream.

Example 28. A method includes: receiving as input a protocol data unit set containing one or more protocol data units; wherein the one or more protocol data units carry one or more levels of priority information; wherein the one or more levels of priority information comprises first priority information that is to be used when there is a delay in delivery of the protocol data unit set, and when the delay is higher than a threshold; wherein the one or more levels of priority information comprises second priority information that is to be used when the protocol data unit set is to be discarded; and producing as output either: an output protocol data unit set containing one or more protocol data units delayed in delivery to an end receiver or user equipment, or an output protocol data unit set containing one or more protocol data units, or a full discarding of the input protocol data unit set, based on the one or more priority information carried by the one or more protocol data units of the input protocol data unit set.

Example 29. An apparatus includes: means for producing a protocol data unit set containing one or more protocol data units; wherein the one or more protocol data units carry one or more dependency information; wherein the one or more dependency information comprises first dependency information between one or more protocol data units of a given protocol data unit set; wherein the one or more dependency information comprises second dependency information, wherein the second dependency information is between one or more protocol data units of different protocol data unit sets of the same stream, and wherein the second dependency information is between one or more protocol data units of different protocol data unit sets of another stream; and means for encoding the protocol data unit set into or along a bitstream.

Example 30. An apparatus includes: means for receiving as input a protocol data unit set containing one or more protocol data units; wherein the one or more protocol data units carry one or more dependency information; wherein the one or more dependency information comprises first dependency information between one or more protocol data units of a given protocol data unit set; wherein the one or more dependency information comprises second dependency information, wherein the second dependency information is between one or more protocol data units of different protocol data unit sets of the same stream, and wherein the second dependency information is between one or more protocol data units of different protocol data unit sets of another stream; and means for producing as output either: an output protocol data unit set containing one or more protocol data units, or a full discarding of the input protocol data unit set, based on the one or more dependency information carried by the one or more protocol data units of the input protocol data unit set.

Example 31. An apparatus includes: means for producing a protocol data unit set containing one or more protocol data units; wherein the one or more protocol data units carry one or more levels of priority information; wherein the one or more levels of priority information comprises first priority information that is to be used when there is a delay in delivery of the protocol data unit set, and when the delay is higher than a threshold; wherein the one or more levels of priority information comprises second priority information that is to be used when the protocol data unit set is to be discarded; and means for encoding the protocol data unit set into or along a bitstream.

Example 32. An apparatus includes: means for receiving as input a protocol data unit set containing one or more protocol data units; wherein the one or more protocol data units carry one or more levels of priority information; wherein the one or more levels of priority information comprises first priority information that is to be used when there is a delay in delivery of the protocol data unit set, and when the delay is higher than a threshold; wherein the one or more levels of priority information comprises second priority information that is to be used when the protocol data unit set is to be discarded; and means for producing as output either: an output protocol data unit set containing one or more protocol data units delayed in delivery to an end receiver or user equipment, or an output protocol data unit set containing one or more protocol data units, or a full discarding of the input protocol data unit set, based on the one or more priority information carried by the one or more protocol data units of the input protocol data unit set.

Example 33. A non-transitory program storage device readable by a machine, tangibly embodying a program of instructions executable by the machine for performing operations, the operations including: producing a protocol data unit set containing one or more protocol data units; wherein the one or more protocol data units carry one or more dependency information; wherein the one or more dependency information comprises first dependency information between one or more protocol data units of a given protocol data unit set; wherein the one or more dependency information comprises second dependency information, wherein the second dependency information is between one or more protocol data units of different protocol data unit sets of the same stream, and wherein the second dependency information is between one or more protocol data units of different protocol data unit sets of another stream; and encoding the protocol data unit set into or along a bitstream.

Example 34. A non-transitory program storage device readable by a machine, tangibly embodying a program of instructions executable by the machine for performing operations, the operations including: receiving as input a protocol data unit set containing one or more protocol data units; wherein the one or more protocol data units carry one or more dependency information; wherein the one or more dependency information comprises first dependency information between one or more protocol data units of a given protocol data unit set; wherein the one or more dependency information comprises second dependency information, wherein the second dependency information is between one or more protocol data units of different protocol data unit sets of the same stream, and wherein the second dependency information is between one or more protocol data units of different protocol data unit sets of another stream; and producing as output either: an output protocol data unit set containing one or more protocol data units, or a full discarding of the input protocol data unit set, based on the one or more dependency information carried by the one or more protocol data units of the input protocol data unit set.

Example 35. A non-transitory program storage device readable by a machine, tangibly embodying a program of instructions executable by the machine for performing operations, the operations including: producing a protocol data unit set containing one or more protocol data units; wherein the one or more protocol data units carry one or more levels of priority information; wherein the one or more levels of priority information comprises first priority information that is to be used when there is a delay in delivery of the protocol data unit set, and when the delay is higher than a threshold; wherein the one or more levels of priority information comprises second priority information that is to be used when the protocol data unit set is to be discarded; and encoding the protocol data unit set into or along a bitstream.

Example 36. A non-transitory program storage device readable by a machine, tangibly embodying a program of instructions executable by the machine for performing operations, the operations including: receiving as input a protocol data unit set containing one or more protocol data units; wherein the one or more protocol data units carry one or more levels of priority information; wherein the one or more levels of priority information comprises first priority information that is to be used when there is a delay in delivery of the protocol data unit set, and when the delay is higher than a threshold; wherein the one or more levels of priority information comprises second priority information that is to be used when the protocol data unit set is to be discarded; and producing as output either: an output protocol data unit set containing one or more protocol data units delayed in delivery to an end receiver or user equipment, or an output protocol data unit set containing one or more protocol data units, or a full discarding of the input protocol data unit set, based on the one or more priority information carried by the one or more protocol data units of the input protocol data unit set.

Example 37. An apparatus including: means for encoding a protocol data unit set into or along a stream, wherein the protocol data unit set contains at least one protocol data unit; and means for encoding an importance field within a header extension; wherein the importance field indicates whether there is at least one dependency between the protocol data unit set and at least one other protocol data unit set.

Example 38. The apparatus of example 37, wherein the importance field indicates that the protocol data unit set is considered not necessary for the processing of any other protocol data unit set.

Example 39. The apparatus of example 37, wherein the importance field indicates that the protocol data unit set is necessary for processing of some protocol data unit sets of the stream to which the protocol data unit set belongs.

Example 40. The apparatus of example 37, wherein the importance field indicates that the protocol data unit is necessary for processing all other protocol data unit sets of the stream to which the protocol data unit set belongs.

Example 41. The apparatus of example 37, wherein the importance field indicates: that the protocol data unit set is necessary for processing of some protocol data unit sets of the stream to which the protocol data unit set belongs, and that the protocol data unit set is necessary for processing of some protocol data unit sets of some other streams to which the protocol data unit set does not belong.

Example 42. The apparatus of example 37, wherein the importance field indicates: that the protocol data unit set is necessary for processing of all protocol data unit sets of the stream to which the protocol data unit set belongs, and that the protocol data unit set is necessary for processing of some other streams to which the protocol data unit set does not belong.

Example 43. The apparatus of example 37, wherein the importance field indicates: that the protocol data unit set is necessary for processing of all protocol data unit sets of all streams.

Example 44. The apparatus of example 37, wherein the importance field indicates one of: the protocol data unit set is considered not necessary for the processing of any other protocol data unit set, and the importance field comprises a first value, or the protocol data unit set is necessary for processing of some protocol data unit sets of the stream to which the protocol data unit set belongs, and the importance field comprises a second value, or the protocol data unit is necessary for processing all other protocol data unit sets of the stream to which the protocol data unit set belongs, and the importance field comprises a third value, or the protocol data unit set is necessary for processing of some protocol data unit sets of the stream to which the protocol data unit set belongs, and the protocol data unit set is necessary for processing of some protocol data unit sets of some other streams to which the protocol data unit set does not belong, and the importance field comprises a fourth value, or the protocol data unit set is necessary for processing of all protocol data unit sets of the stream to which the protocol data unit set belongs, and the protocol data unit set is necessary for processing of some other streams to which the protocol data unit set does not belong, and the importance field comprises a fifth value, or the protocol data unit set is necessary for processing of all protocol data unit sets of all streams, and the importance field comprises a sixth value.

Example 45. The apparatus of example 44, wherein the first value is larger than the second value, the second value is larger than the third value, the third value is larger than the fourth value, the fourth value is larger than the fifth value, and the fifth value is larger than the sixth value.

Example 46. The apparatus of any of examples 37 to 45, further including: means for encoding another protocol unit set into or along another stream; wherein the protocol data unit set is encoded into or along the stream as part of a quality of service flow, and the another protocol data unit set is encoded into or along the another stream as part of the quality of service flow.

Example 47. The apparatus of any of examples 37 to 46, wherein the importance field indicates an importance of the protocol data unit set relative to the at least one other protocol data unit set.

Example 48. The apparatus of any of examples 37 to 47, wherein the importance field comprises a value.

Example 49. The apparatus of example 48, wherein lower values for the value of the importance field are associated with a higher importance of the protocol data unit set.

Example 50. The apparatus of any of examples 48 to 49, wherein: the value of the importance field being a first value indicates that the protocol data unit set has a first importance; and the value of the importance field being a second value lower than the first value indicates that the protocol data unit set has a second importance that is higher than the first importance of the protocol data unit set.

Example 51. The apparatus of any of examples 37 to 50, wherein the header extension within which the importance field is encoded comprises a real time transport protocol header extension.

Example 52. An apparatus including: means for decoding a protocol data unit set from or along a stream, wherein the protocol data unit set contains at least one protocol data unit; and means for decoding an importance field from a header extension; wherein the importance field indicates whether there is at least one dependency between the protocol data unit set and at least one other protocol data unit set.

Example 53. The apparatus of example 52, wherein the importance field indicates that the protocol data unit set is considered not necessary for the processing of any other protocol data unit set.

Example 54. The apparatus of example 52, wherein the importance field indicates that the protocol data unit set is necessary for processing of some protocol data unit sets of the stream to which the protocol data unit set belongs.

Example 55. The apparatus of example 52, wherein the importance field indicates that the protocol data unit is necessary for processing all other protocol data unit sets of the stream to which the protocol data unit set belongs.

Example 56. The apparatus of example 52, wherein the importance field indicates: that the protocol data unit set is necessary for processing of some protocol data unit sets of the stream to which the protocol data unit set belongs, and that the protocol data unit set is necessary for processing of some protocol data unit sets of some other streams to which the protocol data unit set does not belong.

Example 57. The apparatus of example 52, wherein the importance field indicates: that the protocol data unit set is necessary for processing of all protocol data unit sets of the stream to which the protocol data unit set belongs, and that the protocol data unit set is necessary for processing of some other streams to which the protocol data unit set does not belong.

Example 58. The apparatus of example 52, wherein the importance field indicates: that the protocol data unit set is necessary for processing of all protocol data unit sets of all streams.

Example 59. The apparatus of example 52, wherein the importance field indicates one of: the protocol data unit set is considered not necessary for the processing of any other protocol data unit set, and the importance field comprises a first value, or the protocol data unit set is necessary for processing of some protocol data unit sets of the stream to which the protocol data unit set belongs, and the importance field comprises a second value, or the protocol data unit is necessary for processing all other protocol data unit sets of the stream to which the protocol data unit set belongs, and the importance field comprises a third value, or the protocol data unit set is necessary for processing of some protocol data unit sets of the stream to which the protocol data unit set belongs, and the protocol data unit set is necessary for processing of some protocol data unit sets of some other streams to which the protocol data unit set does not belong, and the importance field comprises a fourth value, or the protocol data unit set is necessary for processing of all protocol data unit sets of the stream to which the protocol data unit set belongs, and the protocol data unit set is necessary for processing of some other streams to which the protocol data unit set does not belong, and the importance field comprises a fifth value, or the protocol data unit set is necessary for processing of all protocol data unit sets of all streams, and the importance field comprises a sixth value.

Example 60. The apparatus of example 59, wherein the first value is larger than the second value, the second value is larger than the third value, the third value is larger than the fourth value, the fourth value is larger than the fifth value, and the fifth value is larger than the sixth value.

Example 61. The apparatus of any of examples 52 to 60, further including: means for decoding another protocol data unit set from or along another stream; wherein the protocol data unit set is decoded from or along the stream from a quality of service flow, and the another protocol data unit set is decoded from or along the another stream from the quality of service flow.

Example 62. The apparatus of any of examples 52 to 61, wherein the importance field indicates an importance of the protocol data unit set relative to the at least one other protocol data unit set.

Example 63. The apparatus of any of examples 52 to 62, wherein the importance field comprises a value.

Example 64. The apparatus of example 63, wherein lower values for the value of the importance field are associated with a higher importance of the protocol data unit set.

Example 65. The apparatus of any of examples 63 to 64, wherein: the value of the importance field being a first value indicates that the protocol data unit set has a first importance; and the value of the importance field being a second value lower than the first value indicates that the protocol data unit set has a second importance that is higher than the first importance of the protocol data unit set.

Example 66. The apparatus of any of examples 52 to 65, wherein the header extension from which the importance field is decoded comprises a real time transport protocol header extension.

Example 67. A method including: encoding a protocol data unit set into or along a stream, wherein the protocol data unit set contains at least one protocol data unit; and encoding an importance field within a header extension; wherein the importance field indicates whether there is at least one dependency between the protocol data unit set and at least one other protocol data unit set.

Example 68. A method including: decoding a protocol data unit set from or along a stream, wherein the protocol data unit set contains at least one protocol data unit; and decoding an importance field from a header extension; wherein the importance field indicates whether there is at least one dependency between the protocol data unit set and at least one other protocol data unit set.

Example 69. A computer readable medium including instructions stored thereon for performing at least the following: encoding a protocol data unit set into or along a stream, wherein the protocol data unit set contains at least one protocol data unit; and encoding an importance field within a header extension; wherein the importance field indicates whether there is at least one dependency between the protocol data unit set and at least one other protocol data unit set.

Example 70. A computer readable medium including instructions stored thereon for performing at least the following: decoding a protocol data unit set from or along a stream, wherein the protocol data unit set contains at least one protocol data unit; and decoding an importance field from a header extension; wherein the importance field indicates whether there is at least one dependency between the protocol data unit set and at least one other protocol data unit set.

Example 71. An apparatus including: at least one processor; and at least one memory storing instructions that, when executed by the at least one processor, cause the apparatus at least to: encode a protocol data unit set into or along a stream, wherein the protocol data unit set contains at least one protocol data unit; and encode an importance field within a header extension; wherein the importance field indicates whether there is at least one dependency between the protocol data unit set and at least one other protocol data unit set.

Example 72. The apparatus of example 71, wherein the importance field indicates that the protocol data unit set is considered not necessary for the processing of any other protocol data unit set.

Example 73. The apparatus of example 71, wherein the importance field indicates that the protocol data unit set is necessary for processing of some protocol data unit sets of the stream to which the protocol data unit set belongs.

Example 74. The apparatus of example 71, wherein the importance field indicates that the protocol data unit is necessary for processing all other protocol data unit sets of the stream to which the protocol data unit set belongs.

Example 75. The apparatus of example 71, wherein the importance field indicates: that the protocol data unit set is necessary for processing of some protocol data unit sets of the stream to which the protocol data unit set belongs, and that the protocol data unit set is necessary for processing of some protocol data unit sets of some other streams to which the protocol data unit set does not belong.

Example 76. The apparatus of example 71, wherein the importance field indicates: that the protocol data unit set is necessary for processing of all protocol data unit sets of the stream to which the protocol data unit set belongs, and that the protocol data unit set is necessary for processing of some other streams to which the protocol data unit set does not belong.

Example 77. The apparatus of example 71, wherein the importance field indicates: that the protocol data unit set is necessary for processing of all protocol data unit sets of all streams.

Example 78. The apparatus of example 71, wherein the importance field indicates one of: the protocol data unit set is considered not necessary for the processing of any other protocol data unit set, and the importance field comprises a first value, or the protocol data unit set is necessary for processing of some protocol data unit sets of the stream to which the protocol data unit set belongs, and the importance field comprises a second value, or the protocol data unit is necessary for processing all other protocol data unit sets of the stream to which the protocol data unit set belongs, and the importance field comprises a third value, or the protocol data unit set is necessary for processing of some protocol data unit sets of the stream to which the protocol data unit set belongs, and the protocol data unit set is necessary for processing of some protocol data unit sets of some other streams to which the protocol data unit set does not belong, and the importance field comprises a fourth value, or the protocol data unit set is necessary for processing of all protocol data unit sets of the stream to which the protocol data unit set belongs, and the protocol data unit set is necessary for processing of some other streams to which the protocol data unit set does not belong, and the importance field comprises a fifth value, or the protocol data unit set is necessary for processing of all protocol data unit sets of all streams, and the importance field comprises a sixth value.

Example 79. The apparatus of example 78, wherein the first value is larger than the second value, the second value is larger than the third value, the third value is larger than the fourth value, the fourth value is larger than the fifth value, and the fifth value is larger than the sixth value.

Example 80. The apparatus of any of examples 71 to 79, wherein the instructions, when executed by the at least one processor, cause the apparatus at least to: encode another protocol unit set into or along another stream; wherein the protocol data unit set is encoded into or along the stream as part of a quality of service flow, and the another protocol data unit set is encoded into or along the another stream as part of the quality of service flow.

Example 81. The apparatus of any of examples 71 to 80, wherein the importance field indicates an importance of the protocol data unit set relative to the at least one other protocol data unit set.

Example 82. The apparatus of any of examples 71 to 81, wherein the importance field comprises a value.

Example 83. The apparatus of example 82, wherein lower values for the value of the importance field are associated with a higher importance of the protocol data unit set.

Example 84. The apparatus of any of examples 82 to 83, wherein: the value of the importance field being a first value indicates that the protocol data unit set has a first importance; and the value of the importance field being a second value lower than the first value indicates that the protocol data unit set has a second importance that is higher than the first importance of the protocol data unit set.

Example 85. The apparatus of any of examples 71 to 84, wherein the header extension within which the importance field is encoded comprises a real time transport protocol header extension.

Example 86. An apparatus including at least one processor; and at least one memory storing instructions that, when executed by the at least one processor, cause the apparatus at least to: decode a protocol data unit set from or along a stream, wherein the protocol data unit set contains at least one protocol data unit; and decode an importance field from a header extension; wherein the importance field indicates whether there is at least one dependency between the protocol data unit set and at least one other protocol data unit set.

Example 87. The apparatus of example 86, wherein the importance field indicates that the protocol data unit set is considered not necessary for the processing of any other protocol data unit set.

Example 88. The apparatus of example 86, wherein the importance field indicates that the protocol data unit set is necessary for processing of some protocol data unit sets of the stream to which the protocol data unit set belongs.

Example 89. The apparatus of example 86, wherein the importance field indicates that the protocol data unit is necessary for processing all other protocol data unit sets of the stream to which the protocol data unit set belongs.

Example 90. The apparatus of example 86, wherein the importance field indicates: that the protocol data unit set is necessary for processing of some protocol data unit sets of the stream to which the protocol data unit set belongs, and that the protocol data unit set is necessary for processing of some protocol data unit sets of some other streams to which the protocol data unit set does not belong.

Example 91. The apparatus of example 86, wherein the importance field indicates: that the protocol data unit set is necessary for processing of all protocol data unit sets of the stream to which the protocol data unit set belongs, and that the protocol data unit set is necessary for processing of some other streams to which the protocol data unit set does not belong.

Example 92. The apparatus of example 86, wherein the importance field indicates: that the protocol data unit set is necessary for processing of all protocol data unit sets of all streams.

Example 93. The apparatus of example 86, wherein the importance field indicates one of: the protocol data unit set is considered not necessary for the processing of any other protocol data unit set, and the importance field comprises a first value, or the protocol data unit set is necessary for processing of some protocol data unit sets of the stream to which the protocol data unit set belongs, and the importance field comprises a second value, or the protocol data unit is necessary for processing all other protocol data unit sets of the stream to which the protocol data unit set belongs, and the importance field comprises a third value, or the protocol data unit set is necessary for processing of some protocol data unit sets of the stream to which the protocol data unit set belongs, and the protocol data unit set is necessary for processing of some protocol data unit sets of some other streams to which the protocol data unit set does not belong, and the importance field comprises a fourth value, or the protocol data unit set is necessary for processing of all protocol data unit sets of the stream to which the protocol data unit set belongs, and the protocol data unit set is necessary for processing of some other streams to which the protocol data unit set does not belong, and the importance field comprises a fifth value, or the protocol data unit set is necessary for processing of all protocol data unit sets of all streams, and the importance field comprises a sixth value.

Example 94. The apparatus of example 93, wherein the first value is larger than the second value, the second value is larger than the third value, the third value is larger than the fourth value, the fourth value is larger than the fifth value, and the fifth value is larger than the sixth value.

Example 95. The apparatus of any of examples 86 to 94, wherein the instructions, when executed by the at least one processor, cause the apparatus at least to: decode another protocol data unit set from or along another stream; wherein the protocol data unit set is decoded from or along the stream from a quality of service flow, and the another protocol data unit set is decoded from or along the another stream from the quality of service flow.

Example 96. The apparatus of any of examples 86 to 95, wherein the importance field indicates an importance of the protocol data unit set relative to the at least one other protocol data unit set.

Example 97. The apparatus of any of examples 86 to 96, wherein the importance field comprises a value.

Example 98. The apparatus of example 97, wherein lower values for the value of the importance field are associated with a higher importance of the protocol data unit set.

Example 99. The apparatus of any of examples 97 to 98, wherein: the value of the importance field being a first value indicates that the protocol data unit set has a first importance; and the value of the importance field being a second value lower than the first value indicates that the protocol data unit set has a second importance that is higher than the first importance of the protocol data unit set.

Example 100. The apparatus of any of examples 86 to 99, wherein the header extension from which the importance field is decoded comprises a real time transport protocol header extension.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and one or more memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In the figures, arrows and lines between individual blocks represent operational couplings there-between, and arrows represent direction of data flows on those couplings.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended with each other or with other characters using e.g. a dash, hyphen, or number):

2D two dimensional
3D three dimensional
3GPP third generation partnership project
4G fourth generation
5G fifth generation
5GC 5G core network
5GS 5G system
5QI 5G QoS identifier
AAC advanced audio coding
AF application function
AMF access and mobility management function
AMR adaptive multi-rate
AOMedia Alliance for Open Media
AP application protocol API application programming interface
AR augmented reality
ARP address resolution protocol
AS application server
ASIC application-specific integrated circuit
AV1 AOMedia Video 1
AVC advanced video coding
AVP audio/video profile
CC CSRC count
CD compact/computer disc
CDRX connected mode discontinuous reception
CPU central processing unit
CR carriage return
CRA clean random access
CSRC contributing source
CU central unit or centralized unit
D discardable frame or delay sensitive
DASH-IF dynamic adaptive streaming over HTTP industry forum
DL downlink
DPI deep packet inspection
DSP digital signal processor
DVD digital versatile disc
E end (e.g. end bit)
EDGAR EDGe-Dependent augmented reality
eNB evolved Node B (e.g., an LTE base station)
EN-DC E-UTRAN new radio—dual connectivity
en-gNB node providing NR user plane and control plane protocol terminations towards the UE, and acting as a secondary node in EN-DC
E-UTRA evolved universal terrestrial radio access, i.e., the LTE radio access technology
E-UTRAN E-UTRA network
EVS enhanced voice services
F forbidden zero bit
FB feedback
F1 interface between the CU and the DU
FCI feedback control information
FEC forward error correction
FMT feedback message type
FPGA field-programmable gate array
FU fragmentation unit
GDR gradual decoding refresh
GOP group of pictures
GPRS general packet radio service
GRA gradual random access
GTP-U GPRS Tunnelling protocol user plane
gNB base station for 5G/NR, i.e., a node providing NR user plane and gNB control plane protocol terminations towards the UE, and connected via the NG interface to the 5GC
H.264 advanced video coding, or MPEG-4 Part 10
H.265 high efficiency video coding, or MPEG-H Part 2
H.266 versatile video coding, or MPEG-I Part 3
H.26x video coding family, x variable
H.323 protocol providing audio-visual communication sessions on any packet network
HDRLL high data rate low latency
HE header extension
HEVC high efficiency video coding
HTTP hypertext transfer protocol
I independent frame
IAB integrated access and backhaul
IANA internet assigned numbers authority
ID identifier
IDR instantaneous decoder refresh
IETF internet engineering task force I/F interface
I-Frame intra coded frame
I/O input/output
iOS iPhone operating system
IP internet protocol
IPv4 internet protocol version 4
L length
LF line feed
LMF location management function
LS liaison statement
LTE long term evolution (4G)
M marker
MAC medium access control
MAC CE medium access control control element
MME mobility management entity
MPEG moving picture experts group
MPEG-H MPEG high efficiency
MPEG-I MPEG immersive
MRO mobility robustness optimization
N4 interface providing the bridge between the control plane and the user plane
N6 interface between the data network and the UPF
NAL network abstraction layer
NALU network abstraction layer unit
NAT network address translation
NCE network control element
NEF network exposure function
ng or NG new generation
ng-eNB new generation eNB
NG-RAN new generation radio access network
Nnef service-based interface exhibited by NEF (network exposure function). Defined in 3GPP TS 23.501.
NR new radio
NRI network abstraction layer reference identification or indication (nal_ref_idc)
NTP network time protocol
N/W network
OBU open bitstream unit
P padding e.g. FIG. 3, FIG. 11, FIG. 12, FIG. 13, FIG. 14,
P priority, e.g. FIG. 17D
PCC policy and charging control
PCF policy control function
PCMU pulse code modulation u-law
PDA personal digital assistant
PDB packet delay budget
PDCP packet data convergence protocol
PDU protocol data unit
PER packet error rate
P-Frame predicted frame
PHY physical layer
PHP hypertext preprocessor
PIR progressive intra refresh
POC picture order count
PPS picture parameter set
Pri priority
Prio/prio/PRIO priority
PSDB PDU set delay budget
PSN PDU sequence number
PSSize PDU set size
PSSN PDU set sequence number
PT payload type
Q quarter (e.g. Q1/Q2)
QOE quality of experience
QOS quality of service
R reserved (e.g. reserved bit)
RAM random access memory
RAN radio access network RASL random access skipped leading
RB recovery bit
Rel release
RES reserved
REST representational state transfer
RFC request for comments
RLC radio link control
ROM read-only memory
RRC radio resource control
RTCP real-time transport control protocol
RTP real time transport protocol
RTSP real time streaming protocol
RTT round trip time
RU radio unit
Rx or RX receiver or reception
S start (e.g. start bit)
SA system aspects
SDP session description protocol
SEI supplemental enhancement information
SGW serving gateway
SIP session initiation protocol
SMF session management function
SN sequence number
SON self-organizing/optimizing network
SPS sequence parameter set
SRTP secure RTP
SSRC synchronization source
STAR standalone augmented reality
STUN session traversal utilities for network address translators
Tdoc technical document
TR technical report
TRAIL trailing picture or subpicture
TRP transmission reception point
TS technical specification
TTL time to live
TURN traversal using relays around NAT
Tx or TX transmitter or transmission
UAV unmanned aerial vehicle
UDP user datagram protocol
UE user equipment (e.g., a wireless, typically mobile device)
UPF user plane function
URI uniform resource identifier
urn uniform resource name
USB universal serial bus
UTF-8 unicode (or universal coded character set) transformation format—8-bit
V version
V3C visual volumetric video-based coding
VCL video coding layer
VP video partition structured video codecs (e.g. VP8, VP9)
VPS video parameter set
VR virtual reality
VVC versatile video coding
W3C world wide web consortium
WB wideband
WebRTC web real-time communication
WG working group
X extension
X2 network interface between RAN nodes and between RAN and the core network
Xn network interface between NG-RAN nodes
XR extended reality
XRM XR and media
What is claimed is:

1. An apparatus comprising:

at least one processor; and at least one memory storing instructions that, when executed by the at least one processor, cause the apparatus at least to:

encode a protocol data unit set into or along a stream, wherein the protocol data unit set contains at least one protocol data unit; and encode an importance field within a header extension;

wherein the importance field indicates whether there is at least one dependency between the protocol data unit set and at least one other protocol data unit set;

wherein the at least one dependency between the protocol data unit set and the at least one other protocol data unit set indicated by the importance field relates to whether the protocol data unit set is necessary for processing the at least one other protocol data unit set;

wherein the importance field is 4 bits and comprises a value, lower values for the value of the importance field are associated with a higher importance of the protocol data unit set, and the protocol data unit set comprises at least one protocol data unit comprising information related to a frame of video or a slice of video;

wherein when the importance field indicates that the protocol data unit set is considered not necessary for the processing of any other protocol data unit set, the importance field comprises a first value, and when the importance field indicates that the protocol data unit set is necessary for processing of some protocol data unit sets of the stream to which the protocol data unit set belongs, the importance field comprises a second value that is lower than the first value.

2. The apparatus of claim 1, wherein the importance field indicates that the protocol data unit set is considered not necessary for the processing of any other protocol data unit set.

3. The apparatus of claim 1, wherein the importance field indicates that the protocol data unit set is necessary for processing of some protocol data unit sets of the stream to which the protocol data unit set belongs.

4. The apparatus of claim 1, wherein the importance field indicates that the protocol data unit is necessary for processing all other protocol data unit sets of the stream to which the protocol data unit set belongs.

5. The apparatus of claim 1, wherein the importance field indicates: that the protocol data unit set is necessary for processing of some protocol data unit sets of the stream to which the protocol data unit set belongs, and that the protocol data unit set is necessary for processing of some protocol data unit sets of some other streams to which the protocol data unit set does not belong.

6. The apparatus of claim 1, wherein the importance field indicates: that the protocol data unit set is necessary for processing of all protocol data unit sets of the stream to which the protocol data unit set belongs, and that the protocol data unit set is necessary for processing of some other streams to which the protocol data unit set does not belong.

7. The apparatus of claim 1, wherein the importance field indicates: that the protocol data unit set is necessary for processing of all protocol data unit sets of all streams.

8. The apparatus of claim 1, wherein when the importance field indicates that the protocol data unit set is necessary for processing all other protocol data unit sets of the stream to which the protocol data unit set belongs, the importance field comprises a third value that is lower than the second value.

9. The apparatus of claim 8, wherein when the importance field indicates that the protocol data unit set is necessary for processing of some protocol data unit sets of the stream to which the protocol data unit set belongs, and the protocol data unit set is necessary for processing of some protocol data unit sets of some other streams to which the protocol data unit set does not belong, the importance field comprises a fourth value that is lower than the third value.

10. The apparatus of claim 1, wherein the instructions, when executed by the at least one processor, cause the apparatus at least to:

encode another protocol unit set into or along another stream;

wherein the protocol data unit set is encoded into or along the stream as part of a quality of service flow, and the another protocol data unit set is encoded into or along the another stream as part of the quality of service flow.

11. The apparatus of claim 1, wherein the importance field indicates an importance of the protocol data unit set relative to the at least one other protocol data unit set.

12. The apparatus of claim 9, wherein when the importance field indicates that the protocol data unit set is necessary for processing of all protocol data unit sets of the stream to which the protocol data unit set belongs, and the protocol data unit set is necessary for processing of some other streams to which the protocol data unit set does not belong, the importance field comprises a fifth value that is lower than the fourth value, and when the importance field indicates that the protocol data unit set is necessary for processing of all protocol data unit sets of all streams, the importance field comprises a sixth value that is lower than the fifth value.

13. The apparatus of claim 12, wherein the importance field is indicated using a network abstraction layer unit type field.

14. The apparatus of claim 1, wherein:

the value of the importance field being a first predetermined value indicates that the protocol data unit set has a first importance, and the value of the importance field being a second predetermined value lower than the first predetermined value indicates that the protocol data unit set has a second importance that is higher than the first importance of the protocol data unit set.

15. The apparatus of claim 1, wherein the header extension within which the importance field is encoded comprises a real time transport protocol header extension.

16. An apparatus comprising:

at least one processor; and at least one memory storing instructions that, when executed by the at least one processor, cause the apparatus at least to:

decode a protocol data unit set from or along a stream, wherein the protocol data unit set contains at least one protocol data unit; and decode an importance field from a header extension;

wherein the importance field indicates whether there is at least one dependency between the protocol data unit set and at least one other protocol data unit set;

wherein the at least one dependency between the protocol data unit set and the at least one other protocol data unit set indicated by the importance field relates to whether the protocol data unit set is necessary for processing the at least one other protocol data unit set;

wherein the importance field is 4 bits and comprises a value, lower values for the value of the importance field are associated with a higher importance of the protocol data unit set, and the protocol data unit set comprises at least one protocol data unit comprising information related to a frame of video or a slice of video;

wherein when the importance field indicates that the protocol data unit set is considered not necessary for the processing of any other protocol data unit set, the importance field comprises a first value, and when the importance field indicates that the protocol data unit set is necessary for processing of some protocol data unit sets of the stream to which the protocol data unit set belongs, the importance field comprises a second value that is lower than the first value.

17. The apparatus of claim 16, wherein the importance field indicates that the protocol data unit set is considered not necessary for the processing of any other protocol data unit set.

18. The apparatus of claim 16, wherein the importance field indicates that the protocol data unit set is necessary for processing of some protocol data unit sets of the stream to which the protocol data unit set belongs.

19. The apparatus of claim 16, wherein the importance field indicates that the protocol data unit is necessary for processing all other protocol data unit sets of the stream to which the protocol data unit set belongs.

20. The apparatus of claim 16, wherein the importance field indicates: that the protocol data unit set is necessary for processing of some protocol data unit sets of the stream to which the protocol data unit set belongs, and that the protocol data unit set is necessary for processing of some protocol data unit sets of some other streams to which the protocol data unit set does not belong.

21. The apparatus of claim 16, wherein the importance field indicates: that the protocol data unit set is necessary for processing of all protocol data unit sets of the stream to which the protocol data unit set belongs, and that the protocol data unit set is necessary for processing of some other streams to which the protocol data unit set does not belong.

22. The apparatus of claim 16, wherein the importance field indicates: that the protocol data unit set is necessary for processing of all protocol data unit sets of all streams.

23. The apparatus of claim 16, wherein when the importance field indicates that the protocol data unit set is necessary for processing all other protocol data unit sets of the stream to which the protocol data unit set belongs, the importance field comprises a third value that is lower than the second value.

24. The apparatus of claim 23, wherein when the importance field indicates that the protocol data unit set is necessary for processing of some protocol data unit sets of the stream to which the protocol data unit set belongs, and the protocol data unit set is necessary for processing of some protocol data unit sets of some other streams to which the protocol data unit set does not belong, the importance field comprises a fourth value that is lower than the third value.

25. The apparatus of claim 16, wherein the instructions, when executed by the at least one processor, cause the apparatus at least to:

decode another protocol data unit set from or along another stream;

wherein the protocol data unit set is decoded from or along the stream from a quality of service flow, and the another protocol data unit set is decoded from or along the another stream from the quality of service flow.

26. The apparatus of claim 16, wherein the importance field indicates an importance of the protocol data unit set relative to the at least one other protocol data unit set.

27. The apparatus of claim 24, wherein when the importance field indicates that the protocol data unit set is necessary for processing of all protocol data unit sets of the stream to which the protocol data unit set belongs, and the protocol data unit set is necessary for processing of some other streams to which the protocol data unit set does not belong, the importance field comprises a fifth value that is lower than the fourth value.

28. The apparatus of claim 27, wherein when the importance field indicates that the protocol data unit set is necessary for processing of all protocol data unit sets of all streams, the importance field comprises a sixth value that is lower than the fifth value.

29. The apparatus of claim 16, wherein:

the value of the importance field being a first predetermined value indicates that the protocol data unit set has a first importance, and the value of the importance field being a second predetermined value lower than the first predetermined value indicates that the protocol data unit set has a second importance that is higher than the first importance of the protocol data unit set.

30. The apparatus of claim 16, wherein the header extension from which the importance field is decoded comprises a real time transport protocol header extension.

31. A method comprising:

encoding a protocol data unit set into or along a stream, wherein the protocol data unit set contains at least one protocol data unit; and encoding an importance field within a header extension;

wherein the importance field indicates whether there is at least one dependency between the protocol data unit set and at least one other protocol data unit set;

wherein the at least one dependency between the protocol data unit set and the at least one other protocol data unit set indicated by the importance field relates to whether the protocol data unit set is necessary for processing the at least one other protocol data unit set;

wherein the importance field is 4 bits and comprises a value, lower values for the value of the importance field are associated with a higher importance of the protocol data unit set, and the protocol data unit set comprises at least one protocol data unit comprising information related to a frame of video or a slice of video;

wherein when the importance field indicates that the protocol data unit set is considered not necessary for the processing of any other protocol data unit set, the importance field comprises a first value, and when the importance field indicates that the protocol data unit set is necessary for processing of some protocol data unit sets of the stream to which the protocol data unit set belongs, the importance field comprises a second value that is lower than the first value.

* * * * *